US012187960B2

(12) United States Patent
Goual et al.

(10) Patent No.: US 12,187,960 B2
(45) Date of Patent: Jan. 7, 2025

(54) QUANTUM DOT NANOFLUIDS

(71) Applicant: UNIVERSITY OF WYOMING, Laramie, WY (US)

(72) Inventors: Lamia Goual, Laramie, WY (US); Kaustubh Shriram Rane, Laramie, WY (US); Bingjun Zhang, Laramie, WY (US)

(73) Assignee: UNIVERSITY OF WYOMING, Laramie, WY (US)

( * ) Notice: Subject to any disclaimer, the term of this patent is extended or adjusted under 35 U.S.C. 154(b) by 0 days.

(21) Appl. No.: 17/516,275

(22) Filed: Nov. 1, 2021

(65) Prior Publication Data

US 2022/0145165 A1    May 12, 2022

Related U.S. Application Data

(63) Continuation-in-part of application No. 17/324,532, filed on May 19, 2021, now abandoned.
(Continued)

(51) Int. Cl.
*C09K 8/584* (2006.01)
*C09K 8/594* (2006.01)
(Continued)

(52) U.S. Cl.
CPC .............. *C09K 8/584* (2013.01); *C09K 8/594* (2013.01); *E21B 43/168* (2013.01); *B82Y 30/00* (2013.01); *B82Y 40/00* (2013.01); *C09K 2208/10* (2013.01)

(58) Field of Classification Search
CPC ..... C09K 8/584; C09K 2208/10; E21B 43/16; B82Y 30/00
See application file for complete search history.

(56) References Cited

U.S. PATENT DOCUMENTS

2011/0260111 A1    10/2011    Nie et al.
2012/0181019 A1*    7/2012    Saini ..................... C09K 8/602
166/305.1
(Continued)

FOREIGN PATENT DOCUMENTS

WO    2016/064718 A1    4/2016

OTHER PUBLICATIONS

International Search Report and Written Opinion for International Application No. PCT/US21/57610 dated Mar. 2, 2022.
(Continued)

*Primary Examiner* — Aiqun Li
(74) *Attorney, Agent, or Firm* — Patterson + Sheridan, LLP

(57) ABSTRACT

In one embodiment, a method for recovery of an oil from a porous medium comprises contacting the porous medium with an aqueous nanofluid, solubilizing oil from the porous medium via the nanoparticles to form a dispersion comprising the oil and the aqueous nanofluid, and collecting at least some of the dispersion. The aqueous nanofluid may contain a combination of amphiphilic quantum dots and hydrophilic quantum dots, in a continuous phase. At least 90% of the quantum dot nanoparticles may have an aspect ratio of from 1:1 to 1:6. In another embodiment, a method for recovery of an oil from a porous medium includes adding quantum dots to foaming surfactants to enhance foam lamella stability under reservoir conditions and provide conformance and mobility control in porous media and hydraulic fractures.

18 Claims, 40 Drawing Sheets

Related U.S. Application Data

(60) Provisional application No. 63/027,638, filed on May 20, 2020.

(51) Int. Cl.
*E21B 43/16* (2006.01)
*B82Y 30/00* (2011.01)
*B82Y 40/00* (2011.01)

(56) References Cited

U.S. PATENT DOCUMENTS

| | | | |
|---|---|---|---|
| 2015/0233222 A1 | 8/2015 | Teklu et al. | |
| 2017/0022804 A1* | 1/2017 | Gupta | E21B 47/11 |
| 2017/0369602 A1 | 12/2017 | Leyrer et al. | |
| 2018/0251678 A1* | 9/2018 | Saikia | C01B 32/15 |
| 2019/0016943 A1* | 1/2019 | Ren | C09K 8/602 |
| 2019/0048251 A1 | 2/2019 | Agrawal et al. | |
| 2020/0347756 A1 | 11/2020 | Matthias et al. | |
| 2021/0269702 A1* | 9/2021 | Zhou | C09K 8/584 |

OTHER PUBLICATIONS

Office Action for Colombia Application No. NC2023/0017216 dated Dec. 20, 2023.
Invitation to Pay Additional Fees And, Where Applicable, Protest Fee dated Jan. 23, 2023 for Application No. PCT/US22/48459.

* cited by examiner

QUANTUM DOT NANOFLUIDS

CROSS-REFERENCE TO RELATED APPLICATIONS

This application is a continuation-in-part of U.S. application Ser. No. 17/324,532, filed May 19, 2021, which claims the benefit of priority to U.S. Provisional Patent Application No. 63/027,638, filed May 20, 2020, each of which is hereby incorporated by reference in its entirety.

GOVERNMENT RIGHTS

This invention was made with government support under Award Number CBET1351296 awarded by the National Science Foundation and Award Number DE-FE0031787 awarded by the U.S. Department of Energy. The government has certain rights in the invention.

BACKGROUND

The development of nanomaterials that promote the multiphase flow and transport of fluids in naturally occurring and man-made porous media is important for a wide range of applications, including enhanced oil from subsurface formations, hydraulic fracturing, and chemical remediation of oil-contaminated aquifers. Specifically, the injection of nanoparticle (NP) suspensions in water can alter the wettability of mineral surfaces from oil-wet to water-wet and hence decrease the capillary forces responsible for trapping oil inside the pores. The mechanism of wettability alteration is triggered by nanoparticle adsorption on the rock and their ability to displace oil from the rock surface due to the structural disjoining pressure.

The primary challenges of these recovery processes are ensuring that NPs remain in colloidal suspension and controlling their adsorption on the rock surface. In hydrocarbon reservoirs where water salinities approach or even exceed those of seawater, traditional metal oxide NPs (including $SiO_x$) tend to agglomerate due to electrical double layer compression which leads to potential formation damage. Surfactants are usually introduced as dispersing agents but add to the overall cost and complexity of these processes.

Gas-assisted enhanced oil recovery (EOR) is one of the most popular methods for oil recovery in light oil reservoirs. However, gas EOR often ends up with poor sweep efficiencies due to high mobility and low density of gas relative to the oil. Foam flooding can be utilized for such EOR, however, foam formed by surfactants can destabilize easily under harsh conditions like high salinity, high temperatures, etc. The collapse of foam can thus reduce its effectiveness.

Accordingly, what is needed in the art are improved methods and materials for EOR. More specifically, what is needed in the art are quantum dot nanofluids.

SUMMARY

The present disclosure relates to carbonaceous nanofluids comprising nanometer-sized graphene quantum dots. In some embodiments, the quantum dots may be amphiphilic graphene quantum dots. In other embodiments, the quantum dots may be used with foaming surfactants to provide conformance and mobility control in natural and man-made porous media. The nanofluids may be useful for improving the recovery or cleanup of crude oil from subsurface geological formations and/or for the remediation of oil-contaminated aquifers.

In one embodiment, coal-derived quantum dots are employed as a new environmentally-friendly source of carbonaceous nanoparticles for enhanced oil recovery and aquifer remediation. The QDs are partially functionalized with alkyl chains to increase their ability to stabilize Pickering emulsions. The procedure may entail adsorbing QDs on starch microspheres while their exposed carboxylic acids are reacted with an alkylamine. After selective functionalization of the quantum dots with the amine, amphiphilic quantum dots (sometimes referred to herein as engineered quantum dots (EQD)) are obtained by breaking the hydrogen bonding and releasing them from the starch surface.

The interfacial activity of amphiphilic quantum dots is enhanced upon mixing with QDs due to synergistic interactions that allow them to re-arrange at the oil/brine interface and form more compact layers. As a result, the IFT is reduced from 19.6 mN/m (brine) to 5.4 mN/m (EQD) to 0.9 mN/m (QD:EQD=1:1).

While amphiphilic quantum dots have a negligible effect on wettability, QDs exhibit a distinct behavior on rock surfaces. They significantly adsorb on carbonates due to their negative surface charge, altering wettability to water-wet state, and causing pore plugging. As a result, only 9.6 vol % of incremental oil recovery is achieved with Edwards carbonate compared to base brine.

The performance of QDs is significantly better in sandstones than in carbonates. They adsorb moderately on quartz through hydrogen bonding, leading to wettability alteration to weakly water-wet state. When EQDs are added in equal amount, the QD:EQD=1:1 nanofluid provides mixed-wet conditions that, together with IFT reduction, results in 21 vol % of incremental oil recovery in Berea sandstone.

In one embodiment, a method for recovery of an oil from a porous medium includes flowing an aqueous nanofluid through the porous medium, in response to the flowing step forming a stabilized dispersion (sometimes referred to herein as an emulsion) comprising the oil and the aqueous nanofluid, and removing the stabilized dispersion from the porous medium. The aqueous nanofluid may contain quantum dot nanoparticles in a continuous phase. At least 90% of the quantum dot nanoparticles may have an aspect ratio of from 1:1 to 6:1. The stabilized dispersion comprising the oil and the aqueous nanofluid may be stabilized via the nanoparticles. In one embodiment, the stabilized dispersion is an emulsion.

In one embodiment, a method for recovery of an oil from a porous medium includes contacting the porous medium with an aqueous nanofluid, wherein the aqueous nanofluid contains quantum dot nanoparticles in a continuous phase, wherein at least 90% of the quantum dot nanoparticles have an aspect ratio of 1:1 to 6:1, in response to the contacting step, solubilizing oil from the porous medium via the nanoparticles, thereby forming a dispersion comprising the oil and the aqueous nanofluid, and collecting at least some of the dispersion.

In one embodiment, the nanoparticles in the aqueous nanofluid include hydrophilic quantum dot nanoparticles. In one embodiment, the nanoparticles in the aqueous nanofluid include amphiphilic quantum dot nanoparticles, and each amphiphilic quantum dot includes at least one hydrophobic functional group.

In one embodiment, the nanoparticles in the aqueous nanofluid include hydrophilic quantum dot nanoparticles and amphiphilic quantum dot nanoparticles. The step of forming a dispersion may include creating a closely-packed interfacial layer around each of a plurality of oil droplets, wherein each closely-packed layer comprises hydrophilic quantum dot nanoparticles interspersed between the amphiphilic quantum dot nanoparticles.

Without wishing to be bound by theory, it is believed that when the amphiphilic quantum dot nanoparticles are present in the nanofluid, close-packing of the amphiphilic quantum dot nanoparticles on the surface of oil droplets is hindered due to steric effects of the long hydrophobic functional groups on the amphiphilic quantum dots. It has been found that the addition of hydrophilic quantum dot nanoparticles, which are free of long functional groups, may allow the hydrophilic quantum dot nanoparticles to intersperse in spaces created by the steric effects of hydrophobic functional groups on the amphiphilic quantum dots; thus, the packing of quantum dot nanoparticles on the surface of the oil droplets may be improved via nanofluids that comprise a comparable number of hydrophilic quantum dot nanoparticles as compared to amphiphilic quantum dot nanoparticles.

For example, in one embodiment, the nanoparticles in the aqueous nanofluid comprise 20 to 80 wt % hydrophilic quantum dot nanoparticles and 20 to 80 wt % amphiphilic quantum dot nanoparticles. In one embodiment, the nanoparticles in the aqueous nanofluid include 40 to 60 wt % hydrophilic quantum dot nanoparticles and 40 to 60 wt % amphiphilic quantum dot nanoparticles. In one embodiment, the nanoparticles in the aqueous nanofluid include 45 to 55 wt % hydrophilic quantum dot nanoparticles and 45 to 55 wt % amphiphilic quantum dot nanoparticles. In one embodiment, the nanoparticles in the aqueous nanofluid comprise about 50 wt % hydrophilic quantum dot nanoparticles and about 50 wt % amphiphilic quantum dot nanoparticles.

In one embodiment, the method includes the operation of solubilizing the adsorbed oil and modifying the wettability of the porous medium, in response to the contacting step. In one embodiment, the modifying comprises altering the wettability of porous medium from oil-wet to mixed-wet or water-wet. In one embodiment, the method may include the step of mobilizing the oil through the porous medium by reducing the interfacial tension between the oil and the aqueous nanofluid, in response to the flowing step.

In one embodiment, the method includes separating the oil from the dispersion. In some embodiments, separating the oil may include breaking an emulsion. In some embodiments, the oil and aqueous fluid are separated by heating at 55° C. for 48 hours.

In one embodiment, the method includes decreasing capillary forces responsible for trapping the oil in capillaries of the porous medium, in response to the contacting step. In one embodiment, the porous medium is a silicate-rich rock and/or a carbonate-rich rock. In one embodiment, the oil is crude oil.

In one embodiment, at least one hydrophobic functional group includes a hydrocarbon chain. In one embodiment, the hydrocarbon chain has 3 to 30 carbons. In one embodiment, the hydrocarbon chain has 5 to 20 carbons. In one embodiment, the hydrocarbon chain has 7 to 15 carbons. In one embodiment, the hydrophobic functional group comprises an alkylamine.

In one embodiment, the nanoparticles have a specific surface area of 10,000 m$^2$/g to 40,000 m$^2$/g. In one embodiment, the nanoparticles have a molecular weight of from 700 to 900 amu.

In one embodiment, the aqueous nanofluid contains 0.001 wt % to 10 wt % nanoparticles. In one embodiment, the aqueous nanofluid contains 0.01 wt % to 1 wt % nanoparticles. In one embodiment, the aqueous nanofluid contains 0.05 wt % to 0.5 wt % nanoparticles. In one embodiment, the aqueous nanofluid contains about 0.1 wt % nanoparticles. In one embodiment, at least 90% of the nanoparticles have a diameter between 1.5 to 5.5 nm.

In one embodiment, a method of making amphiphilic quantum dot nanoparticles includes providing a coal-based starting material, intercalating the starting material with an oxidizing agent to form graphene oxide, forming quantum dots from the graphene oxide; adsorbing the quantum dots onto solid microspheres, via hydrogen bonding, in the presence of water; contacting the adsorbed quantum dots with a reactant to add a hydrophobic functional group to the adsorbed quantum dots, and removing the functionalized quantum dots from the solid microspheres, thereby liberating amphiphilic quantum dot nanoparticles.

In one embodiment, the operation of forming quantum dots includes sonicating the graphene oxide and heating the graphene oxide. In one embodiment, the method includes lyophilizing the amphiphilic quantum dot nanoparticles. In one embodiment, the method includes filtering the quantum dots from the oxidizing agent. In one embodiment, the oxidizing agent includes hydrogen peroxide.

In one embodiment, a quantum dot nanosphere formulation comprises 20 to 80 wt % hydrophilic quantum dot nanoparticles and 20 to 80 wt % amphiphilic quantum dot nanoparticles, wherein each amphiphilic quantum dot comprises at least one hydrophobic functional group. In one embodiment, at least 90% of the quantum dot nanoparticles have an aspect ratio of 1:1 to 6:1. In one embodiment, at least 90% of the quantum dot nanoparticles have an aspect ratio of 1:1 to 4:1. In one embodiment, at least 90% of the quantum dot nanoparticles have an aspect ratio of 1:1 to 3:1. In one embodiment, at least 90% of the quantum dot nanoparticles have a diameter between 1.5 to 5.5 nm.

In one embodiment, the hydrophilic quantum dot nanoparticles and amphiphilic quantum dot nanoparticles are derived from coal. In addition to coal, the starting material or precursor may include coal by-products (such as tar, pitch) and graphite.

In one embodiment, a quantum dot nanoparticle comprises only one or a few layers of graphene oxide, wherein said graphene oxide comprises at least one hydrophilic oxygen-rich functional group located on the edges and the faces of the graphene planes, wherein said quantum dot is a hydrophilic nanoparticle.

In one embodiment, an amphiphilic quantum dot nanoparticle includes oxygen-rich functional groups linked to a hydrophobic species except on one edge side. In one embodiment, the edge side contains unmodified oxygen-rich functional groups.

In some embodiments, the nanoparticles are spherical. In some embodiments, quantum dot nanoparticles have a diameter between 2 nm and 4 nm, with an average of 3 nm. In one embodiment, the quantum dot nanoparticles have a thickness between 0.8 nm and 3 nm. In some embodiments, the amphiphilic quantum dot nanoparticles are asymmetrical. In some embodiments, the quantum dot nanoparticles have a density of about 0.1 to 0.3 g/cm$^3$.

Systems and methods for gas-assisted recovery of an oil from a porous medium are also disclosed. The stability of such foams may be improved via inclusion of quantum dot nanoparticles. In one embodiment, a method for gas-assisted recovery of an oil from a porous medium includes contacting the porous medium with a foam, in response to the contacting step, mobilizing oil from the porous medium, and collecting at least some of the mobilized oil. The foam may include a dispersion of gas bubbles in a surfactant and quantum dot nanoparticles.

In one embodiment, the quantum dot nanoparticles have an aspect ratio of 1:1 to 6:1. In one embodiment, at least 90% of the quantum dot nanoparticles have a diameter between 1.5 to 5.5 nm. In one embodiment, the nanoparticles in the aqueous nanofluid are hydrophilic quantum dot nanoparticles. In one embodiment, the nanoparticles have a specific surface area of 10,000 $m^2/g$ to 40,000 $m^2/g$. In one embodiment, the nanoparticles have a molecular weight of from 700 to 900 amu.

In one embodiment, a foam for gas-assisted oil recovery comprises a dispersion of gas bubbles in a surfactant, and quantum dot nanoparticles, wherein the quantum dot nanoparticles are concentrated at a lamella of the foam. In one embodiment, at least 90% of the quantum dot nanoparticles have an aspect ratio of 1:1 to 6:1. In one embodiment, at least 90% of the quantum dot nanoparticles have a diameter between 1.5 to 5.5 nm. In one embodiment, the foam has a gas fraction of 70 to 90%. In one embodiment, the quantum dot nanoparticles are derived from coal.

STATEMENTS REGARDING CHEMICAL COMPOUNDS AND NOMENCLATURE

Figure 1:
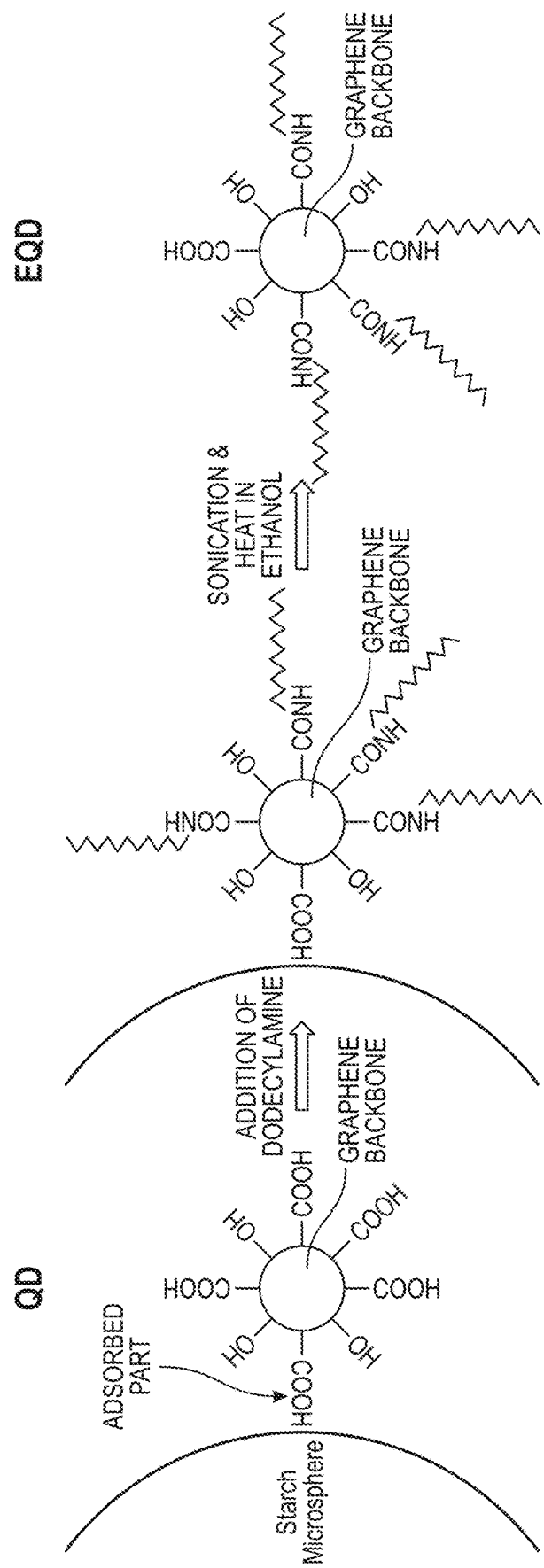
FIG. 1 shows a schematic of EQD synthesis.

In general, the terms and phrases used herein have their art-recognized meaning, which can be found by reference to standard texts, journal references and contexts known to those skilled in the art. The following definitions are provided to clarify their specific use in the context of the disclosure.

In an embodiment, a composition or compound of the disclosure, such as an alloy or precursor to an alloy, is isolated or substantially purified. In an embodiment, an isolated or purified compound is at least partially isolated or substantially purified as would be understood in the art. In an embodiment, a substantially purified composition, compound or formulation of the disclosure has a chemical purity of 95%, optionally for some applications 99%, optionally for some applications 99.9%, optionally for some applications 99.99%, and optionally for some applications 99.999% pure.

DETAILED DESCRIPTION OF THE DISCLOSURE

In the following description, numerous specific details of the devices, device components, and methods of the present disclosure are set forth in order to provide a thorough explanation of the precise nature of the disclosure. It will be apparent, however, to those of skill in the art that the disclosure can be practiced without these specific details.

To meet the projected world growing demand for fossil fuels and the increasing challenges in exploring and developing new oil fields, novel and cost-effective carbonaceous nanofluids were developed and are described below.

In one embodiment, a nanofluid includes (a) hydrophilic graphene quantum dots; (b) amphiphilic graphene quantum dots; and (c) brine. In one embodiment, the weight ratio of hydrophilic quantum dots and amphiphilic quantum dots in the nanofluid is about 1:1.

The nanofluid formulations of the disclosure may be particularly effective in silicate-rich rocks. It has been discovered that they possess dual properties of surfactants and nanoparticles with minimum retention in sandstones.

Quantum dots are produced from coal by a liquid exfoliation method with an average yield of 62 wt % (310 mg of QD out of 500 mg of coal). The amorphous carbon within the coal structure is relatively easy to oxidize, resulting in nanometer-sized graphene quantum dots (average diameter of 3 nm) with oxygen-rich active edge sites. They have an average density of 0.176 g/ml, molecular weight between 700 and 900 amu, specific surface area from about 15,000 to 38,000 $m^2/g$. They are almost spherical with an aspect ratio of 1:1. QDs are soluble in brine of various salinities and stable at elevated temperatures.

As used herein, "hydrophilic quantum dots" (sometimes referred to herein simply as quantum dots (QD)) are high mobility carbonaceous nanoparticles with the ability to alter wettability by adsorbing on the surface of rocks. Because of their negative surface charge, their application may be more suitable in sandstones, where they adsorb moderately through hydrogen bonding.

As used herein, "amphiphilic quantum dots" (sometimes referred to herein simply as engineered quantum dots (EQD)) are quantum dots whose surface has been at least partially functionalized. In one embodiment, the amphiphilic quantum dots are functionalized with alkylamines using a solid template, in order to confer them with amphiphilic properties of surfactants. The side of amphiphilic quantum dots that is protected by the template remains hydrophilic due to the presence of oxygen-rich groups, whereas the other side that reacts with the alkylamine becomes hydrophobic. As a result, amphiphilic quantum dots contain 86% less oxygen than hydrophilic quantum dots.

Amphiphilic quantum dots can lower the oil/brine interfacial tension and stabilize Pickering emulsions but have a negligible impact on rock wettability due to the steric hindrance caused by the aliphatic chains in their hydrophobic side.

Nanofluids containing mixtures of hydrophilic quantum dots and amphiphilic quantum dots display synergistic effects at oil/brine interfaces. Hydrophilic quantum dot molecules help reduce the repulsive forces between neighboring amphiphilic quantum dot molecules by positioning themselves in between. The optimum interface configuration is obtained when equal amounts of hydrophilic quantum dots and amphiphilic quantum dots are used in the nanofluid.

Nanofluids containing hydrophilic quantum dots and amphiphilic quantum dots at a weight ratio of 1:1 provide mixed-wet conditions that, together with IFT reduction, result in effective mobilization and solubilization of oil in porous media.

The amount of nanofluid to be injected into oil reservoirs is based on a variety of factors, including the type and composition of a subsurface geological formation; the amount of oil; and the brine chemistry. Thus, the amount of nanofluid to be used for enhanced oil recovery or aquifer remediation may vary but is usually low.

Brine is a solution of one or several salts in water. Brine may include sodium chloride (NaCl), sodium bromide (NaBr), sodium iodide (NaI), potassium chloride (KCl), potassium bromide (KBr), potassium iodide (KI), calcium chloride ($CaCl_2$)), magnesium chloride ($MgCl_2$), calcium bromide ($CaBr_2$), and calcium iodide ($CaI_2$). In certain embodiments, brine includes sodium chloride (NaCl) and/or calcium chloride ($CaCl_2$)). The brine may also include $MgSO_4$, $NaHCO_3$, and other salts. The salt concentration may vary from 10 ppm to fully saturated brine. The density of the brine may vary from 1.0 g/cm$^3$ to 2.4 g/cm$^3$.

The disclosure can be further understood by the following non-limiting examples.

Example 1—Synthesis, Characterization, and Testing of Aqueous Nanofluids as EOR Agents Synthesis of Quantum Dots Graphene Quantum Dots were synthesized from Wyoming Powder River Basin (PRB) coal using a liquid exfoliation method. The coal was intercalated using hydrogen peroxide solution (30 wt % $H_2O_2$ in water), which is an oxidizing agent that helps break the large coal molecules into smaller quantum dots. 500 mg of coal was added to 100 mL of $H_2O_2$ and sonicated for 2 hours in a water bath sonicator. The mixture was transferred to a round bottom flask and heated to 80° C. for 2 hours with reflux and continuous stirring. The color of the solution turned from black/brown to bright yellow, indicating the formation of the hydrophilic quantum dots. The hydrophilic quantum dots were filtered through a 0.2 μm Teflon filter paper. They were kept overnight in a freezer at −30° C. then freeze-dried at −82° C. and 0.003 bar vacuum for three days. The yield of the quantum dots was about 310 mg, which constituted 62 wt % of the coal precursor. The hydrophilic quantum dots were dispersed in distilled water at 0.1 wt % concentration using a Q-Sonica probe sonicator with 15 second on-off pulses.

Synthesis of Amphiphilic Quantum Dots

The synthesis procedure for amphiphilic quantum dots is illustrated in FIG. 1. The quantum dots were functionalized by dodecylamine or DDA (>99.5%, Sigma Aldrich) using soluble starch (Sigma Aldrich) as a solid template. More specifically, 100 cm$^3$ of QD dispersion (1 mg/ml) were added to a mixture of 20 g soluble starch in 250 cm$^3$ DI water. This mixture was stirred for 12 hours to enable the QD to adsorb on the starch microspheres by hydrogen bonding. The starch microspheres were then filtered with an 8 μm filter paper to remove the unabsorbed QD. It was further washed with 100 cm$^3$ ethanol (Sigma Aldrich). The starch microspheres were then re-dispersed in 250 cm$^3$ ethanol. 300 mg of DDA in 50 cm$^3$ ethanol solution was added to the starch, and the mixture was stirred for 20 hours to enable the amine to react with the exposed side of QD. This mixture was then filtered with 8 μm filter paper and washed with an excess of ethanol to remove the unreacted DDA. The QD-DDA coated starch microspheres were then subjected to heating (60° C.) and sonication cycles to detach the QD-DDA from the starch microspheres. This fluid system separated into two phases overnight, for example, between about 6 hours and about 16 hours. The starch microspheres settled in the bottom while the amphiphilic quantum dots remained dispersed in ethanol in the top layer.

The dispersion was separated and dried to obtain the amphiphilic quantum dots nanoparticles. This approach was inspired by a previous study on amphiphilic Janus nanosheets (AJN). However, unlike AJN, which are sheet-like, amphiphilic quantum dots are almost spherical.

Characterization

Figure 2:
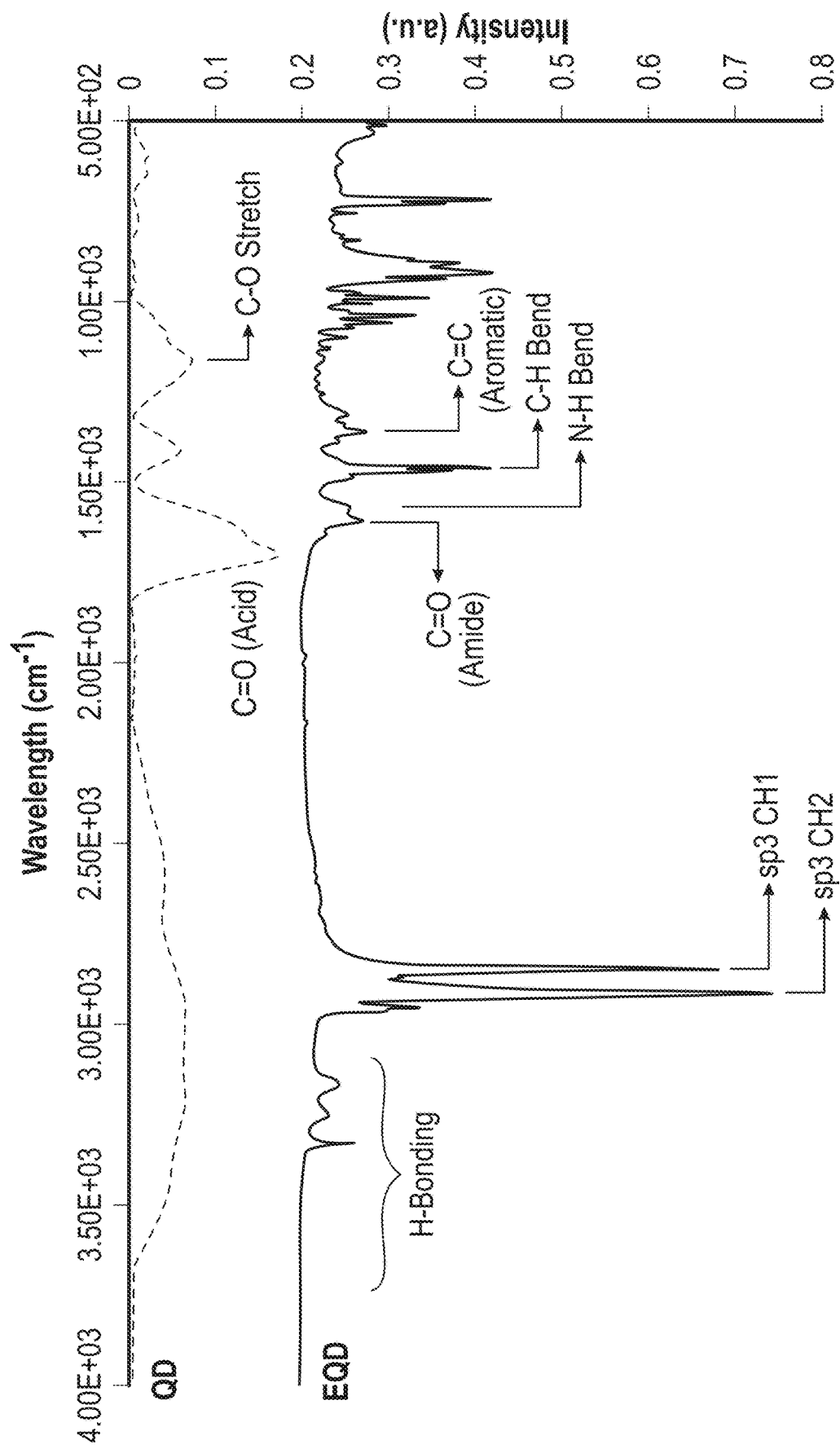
FIG. 2 shows FTIR spectra for QD and EQD.

Fourier-transform infrared spectroscopy (FTIR) was first adopted to characterize the QDs and amphiphilic quantum dots using Nicolet IS-50 spectroscope. FIG. 2 shows that the QD mostly consists of C═C (aromatic), as suggested by the peak at 1410 cm$^{-1}$, thus confirming the graphitic backbone. The oxidative exfoliation of coal to quantum dots helps eliminate most of the aliphatic chains present in coal molecules. However, the amphiphilic quantum dots exhibit substantial C—H stretch peaks at 2850 cm$^{-1}$ and 2920 cm$^{-1}$ due to the presence of dodecyl chains. These chains also create C—H bending peaks at 1460 cm$^{-1}$. The carbonyl groups in QD are due to carboxylic acids, as confirmed by the carbonyl peak at 1700 cm$^{-1}$. On the other hand, the carbonyl peak in amphiphilic quantum dots is mainly due to the presence of amide groups and thus is blue-shifted to about 1600 cm$^{-1}$. A small N—H bending peak can be seen at 1560 cm$^{-1}$, thus further confirming the amide bond formation. In addition to the C═C aromatic and carbonyl peak (carbonylic acid), the QD shows a C—O stretch peak at 1160 cm$^{-1}$ suggesting the presence of alcohol. QD shows H-Bonding in the 2500 cm$^{-1}$ to 3500 cm$^{-1}$ region, but the H-bonding is suppressed in amphiphilic quantum dots due to the long dodecyl chains.

Figure 3:
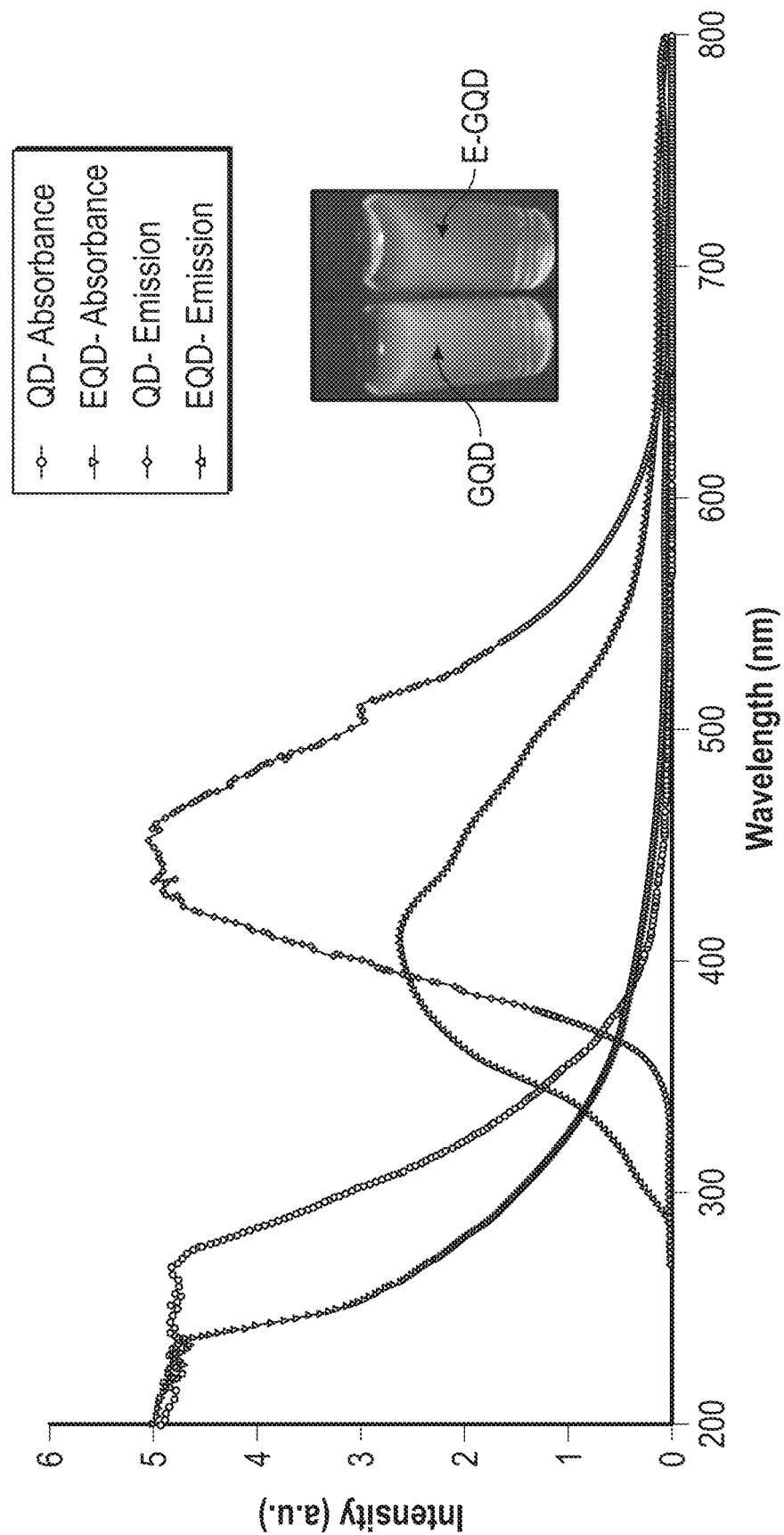
FIG. 3 shows absorption and emission spectra for QD and EQD. Inset: Sample images under UV light.

The absorption spectra for QD and amphiphilic quantum dots are provided in FIG. 3 using Agilent CARY 4000 UV-Vis spectroscope. The intensities are comparable, given the same concentration of 0.1 wt %. Both nanofluids absorbed ultraviolet light between 200 nm and 300 nm, which can be assigned to the non-bonding to π* transitions of the C═O bonds. The peaks at 271 nm and 237 nm for QD and amphiphilic quantum dots, respectively, are due to the π to π* transitions caused by the C═C bonds. The high delocalization of electrons in the graphitic backbone and carbonyl bonds make QD absorb at a relatively high wavelength. On the other hand, the addition of the dodecyl chains in the case of amphiphilic quantum dots lowers the delocalization of electrons in the molecule. The amphiphilic quantum dots emitted at a lower wavelength of about 405 nm, compared to 455 nm with QD, which explains their blue color under UV light.

Figure 4A:
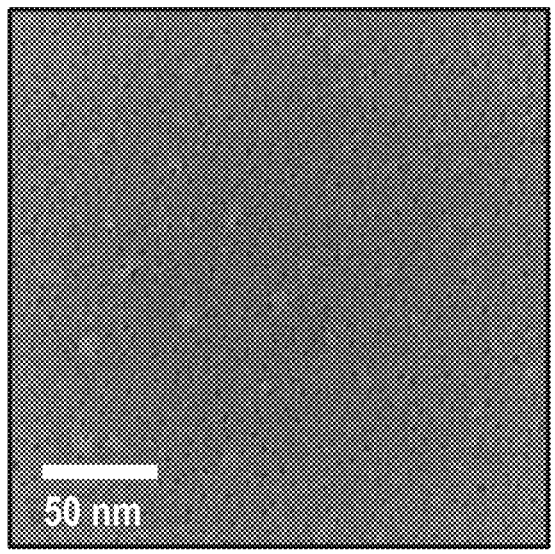
FIG. 4A is a TEM micrograph of QD.
Figure 4B:
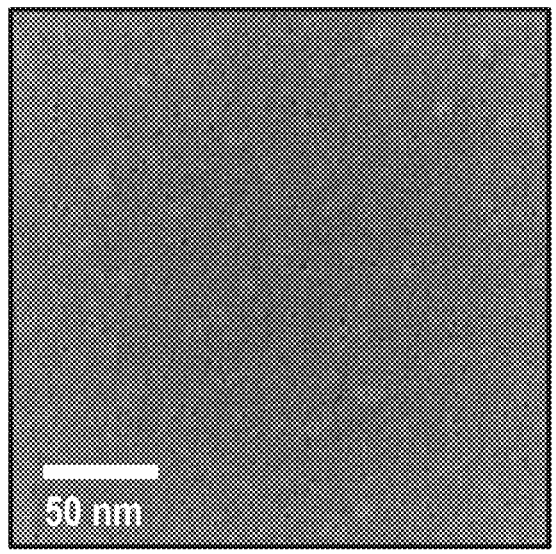
FIG. 4B is a TEM micrograph of EQD.
Figure 4C:
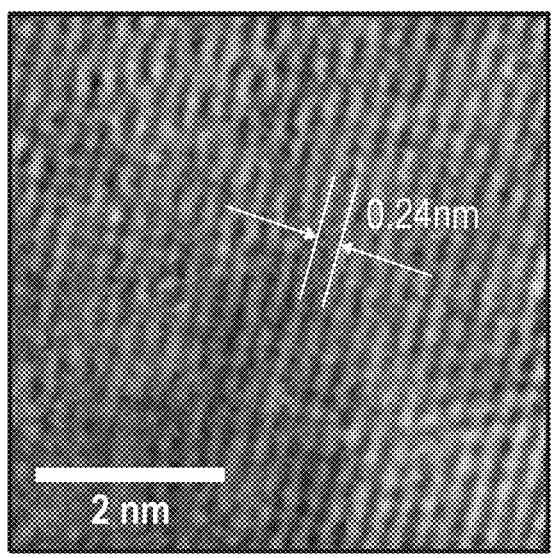
FIG. 4C is a HRTEM micrograph of QD.
Figure 4D:
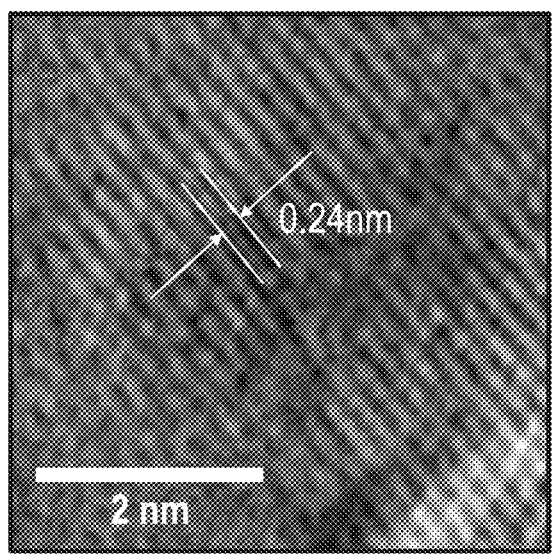
FIG. 4D is a HRTEM micrograph of EQD.
Figure 4E:
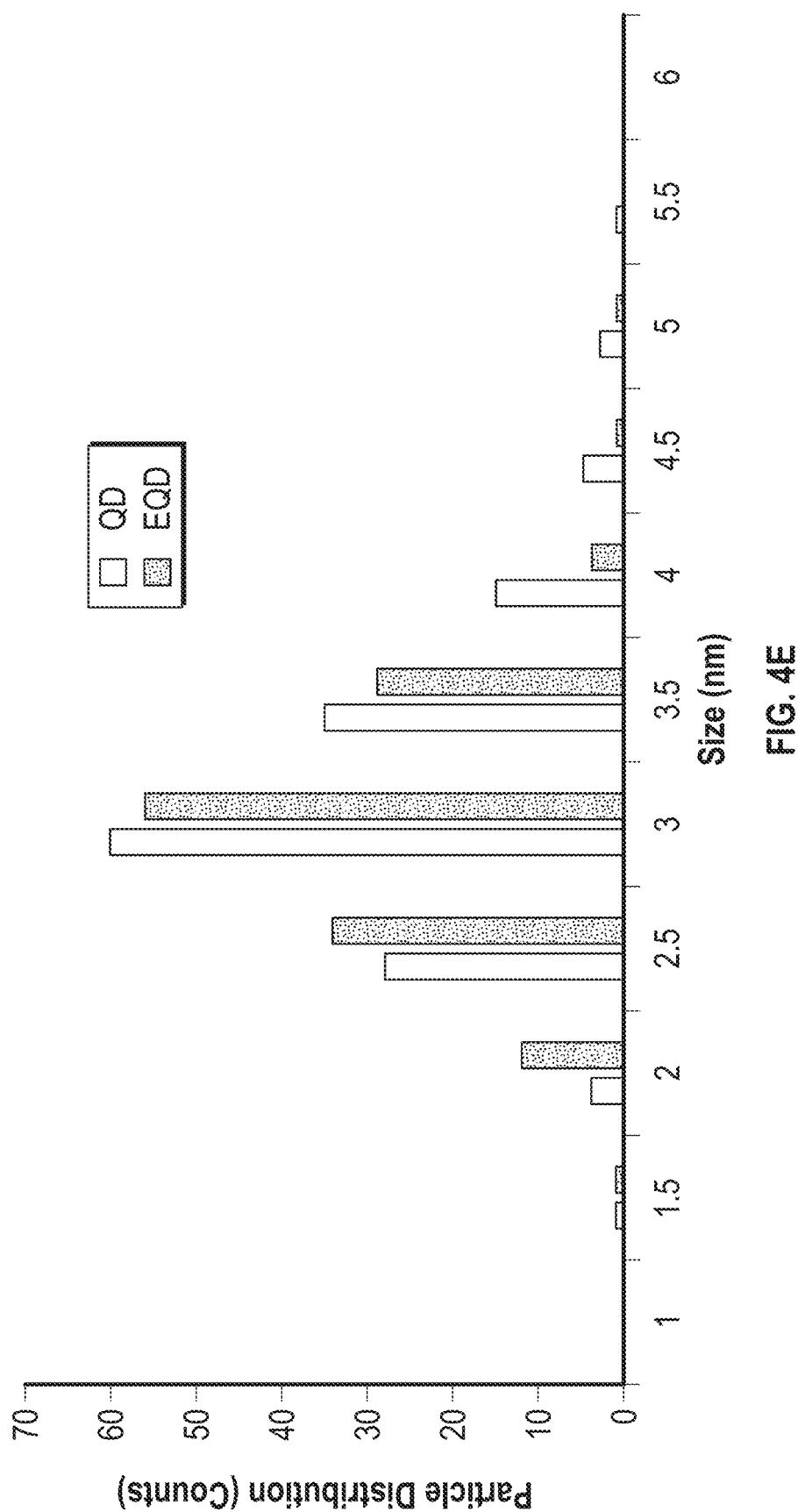
FIG. 4E shows the particle size distribution of QD and EQD.

FIGS. 4A and 4B represent the TEM micrographs for QD and amphiphilic quantum dots, respectively, obtained from FEI Titan Environmental Transmission Microscope (E-TEM). Lattice fringes under higher resolution (HR) indicate the crystalline nature of the samples (FIGS. 4C and 4D). The lattice spacing distance in both QD and amphiphilic quantum dots is about 0.24 nm ascribed to the (1120) plane. The QD are very rich with oxygen and nanoscale in size. Due to these reasons, the QD burn very quickly within a few minutes due to the strong electron beam, making it difficult to obtain a diffraction pattern. From the images, the QD and amphiphilic quantum dots appear to be spherical in shape with similar sizes of a few nanometers. The particle size distribution, as shown in FIG. 4E was obtained from about 150 particles of QD and amphiphilic quantum dots. Both the QD and the amphiphilic quantum dots have a narrow size distribution, with most particles of about 2.5 nm to 3.5 nm in size, which confirms that the addition of dodecyl chains for amphiphilic quantum dots does not significantly increase the size of the quantum dots.

The elemental composition of QD and amphiphilic quantum dots was obtained using CE Elantech Flash Smart elemental analyzer and is listed in Table 1. The QD are mostly composed of carbon and oxygen, with 4 wt % hydrogen. The small quantity of hydrogen indicates that the QD are highly aromatic whereas the high amount of oxygen-containing groups are responsible for their stability in high salinity water. The trace amounts of nitrogen and sulfur are inherited from the parent coal. After the reaction with dodecylamine, we can see an increase in carbon, hydrogen, and nitrogen content in the amphiphilic quantum dots with a marked reduction in the amount of oxygen. This confirms the modification of the QD to amphiphilic quantum dots. However, the graphitic backbone is still preserved.

TABLE 1

Elemental composition of QD and EQD

| Sample | Nitrogen | Carbon | Hydrogen | Sulfur | Oxygen |
|---|---|---|---|---|---|
| QD | 1.36 | 43.22 | 4.00 | 0.87 | 50.54 |
| EQD | 5.04 | 74.47 | 12.89 | 0.13 | 7.47 |

Density, an intrinsic property of the QD, was measured by weighing QD in a 1 cm³ volumetric flask. The QD were packed tightly in the flask to minimize the amount of air. The density was measured to be 0.176 g/cm³.

Figure 5:
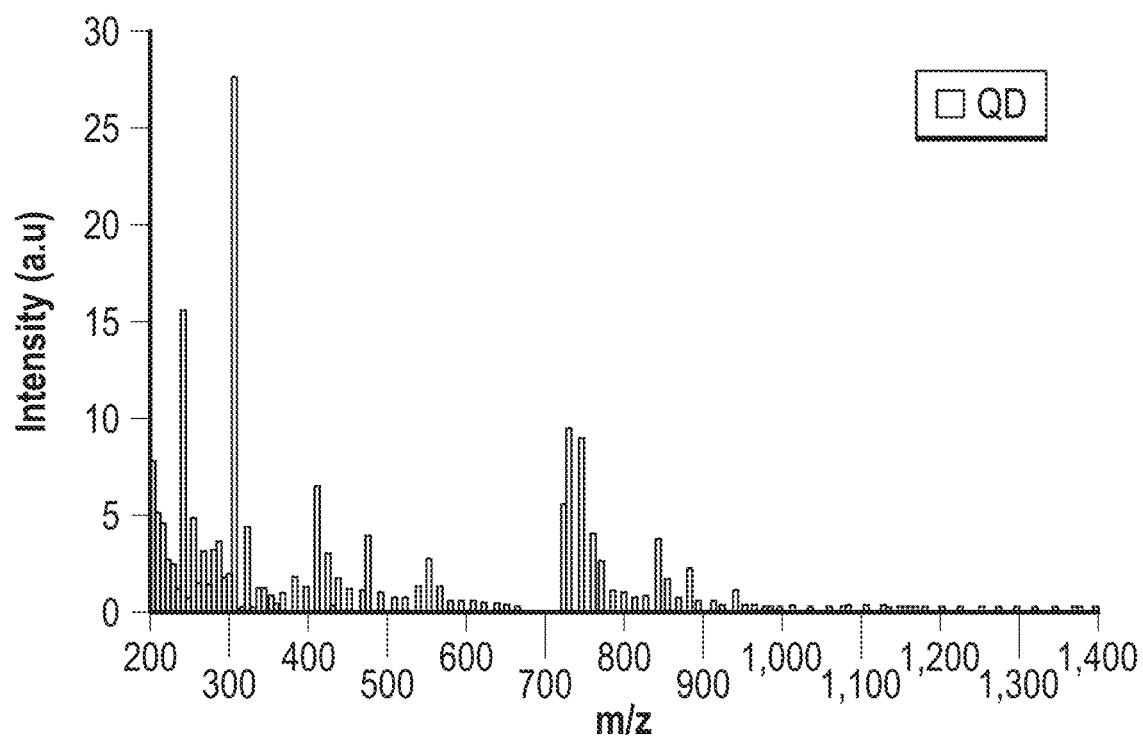
FIG. 5 shows MALDI-TOF mass spectra for QD (top) and EQD (bottom).
Figure 5:
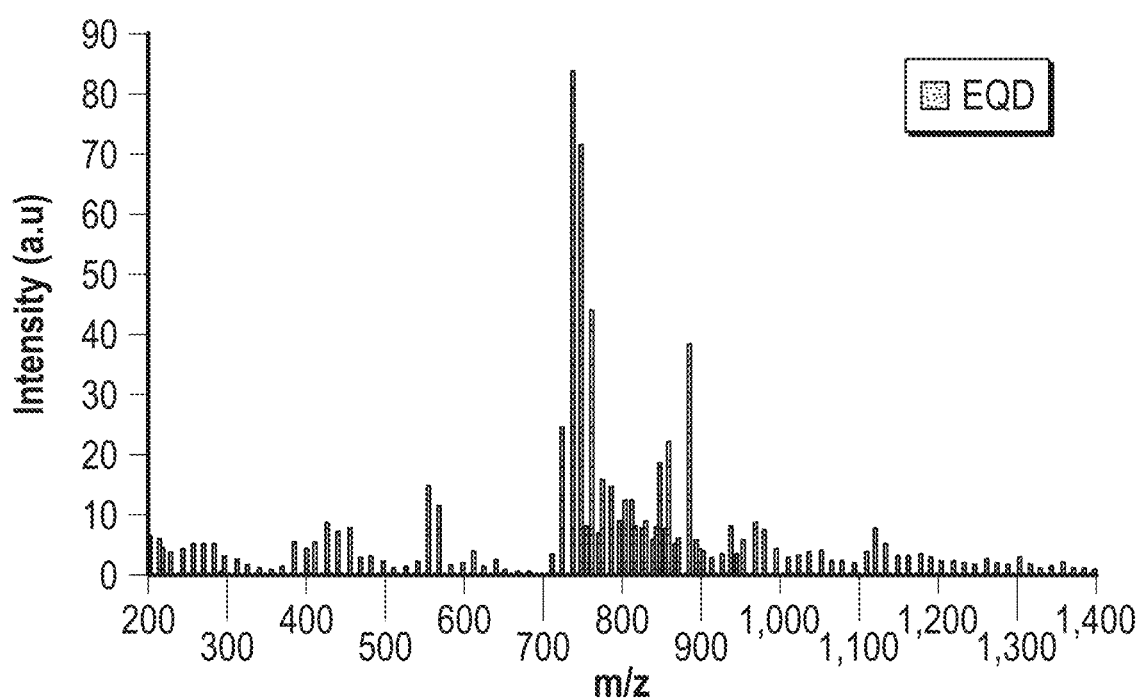

The molecular weight of the QD and amphiphilic quantum dots was measured by Shimadzu Matrix-Assisted Laser Desorption/Ionization-Time of Flight (MALDI-TOF). The amphiphilic quantum dots samples were run with and without the α-cyano-4-hydroxycinnamic acid (CHCA) matrix. However, no significant changes were observed in the data. Hence no matrix was used in the measurements. FIG. 5 shows the MALDI-TOF mass spectra for QD and amphiphilic quantum dots. Both have prominent peaks around 740 amu, which may represent the majority of the molecules. The spectrum of QD has some peaks at low mass to charge ratios, which correspond to fragmented or smaller moieties. The amphiphilic quantum dots exhibit higher intensity of masses around 700-900 amu, as compared to that of the QD. It is likely that the amphiphilic quantum dots are fragmented during the ionization process, losing the dodecyl chains.

Surface Properties

The surface properties of QD were predicted using the known values of molecular weight and structure shape analysis from TEM. Assuming a cylindrical shape and knowing the average diameter and molecular weight, surface area, specific surface area (SSA), an aspect ratio can be calculated for varying thicknesses using the following equations:

$$\text{Surface Area} = 2\pi r h + 2\pi r^2$$

$$\text{Specific Surface Area} = \frac{\text{Surface Area}}{\text{Molecular Weight}/N_A}$$

$$\text{Aspect Ratio} = \frac{\text{Diameter}}{\text{Height}}$$

Previous studies revealed that the thickness of QD varies between 0.5 nm to 3 nm. Table 2 shows the calculated surface properties for QD for varied thicknesses. Due to the small size, the QD have a large surface area ranging from 18 nm² to 47 nm². The nano-size also endows the QD with a large specific surface area of about 15000 m²/g to 38000 m²/g. Also, as the thickness increases, the aspect ratio decreases. In the cases where the diameter is equal to the thickness, the particles may look spherical due to an aspect ratio of 1:1.

TABLE 2

Surface properties of QD

| Diameter (nm) | Thickness (nm) | Surface Area (nm²) | Specific Surface Area (m²/g) | Aspect Ratio |
|---|---|---|---|---|
| 3 | 0.5 | 18.85 | 15383.03 | 6 |
| 3 | 1 | 23.56 | 19228.78 | 3 |
| 3 | 1.5 | 28.27 | 23074.54 | 2 |
| 3 | 2 | 32.99 | 26920.3 | 1.5 |
| 3 | 2.5 | 37.70 | 30766.06 | 1.22 |
| 3 | 3 | 42.41 | 34611.81 | 1 |
| 3 | 3.5 | 47.13 | 38457.57 | 0.85 |

The zeta potential of QD, amphiphilic quantum dots, and their mixtures was measured in water with NanoBrook Omni analyzer (Brookhaven Instruments) to estimate the surface charge on each nanoparticle. From Table 3, it can be seen that QD is negatively charged due to the carboxylic acid and hydroxyl groups. Conversely, the surface charge of amphiphilic quantum dots is highly positive following the addition of the long-chained amides. The surface charge of the mixtures falls between those of QD and amphiphilic quantum dots, with QD:EQD=1:1 being almost neutral.

TABLE 3

Zeta potential of QD, amphiphilic quantum dots, and their mixtures

| Sample | Zeta Potential (mV) |
|---|---|
| QD | −14.76 |
| QD:EQD = 4:1 | −4.11 |
| QD:EQD = 1:1 | 1.64 |
| QD:EQD = 1:4 | 8.92 |
| EQD | 58.85 |

Interfacial Tension

Figure 6:
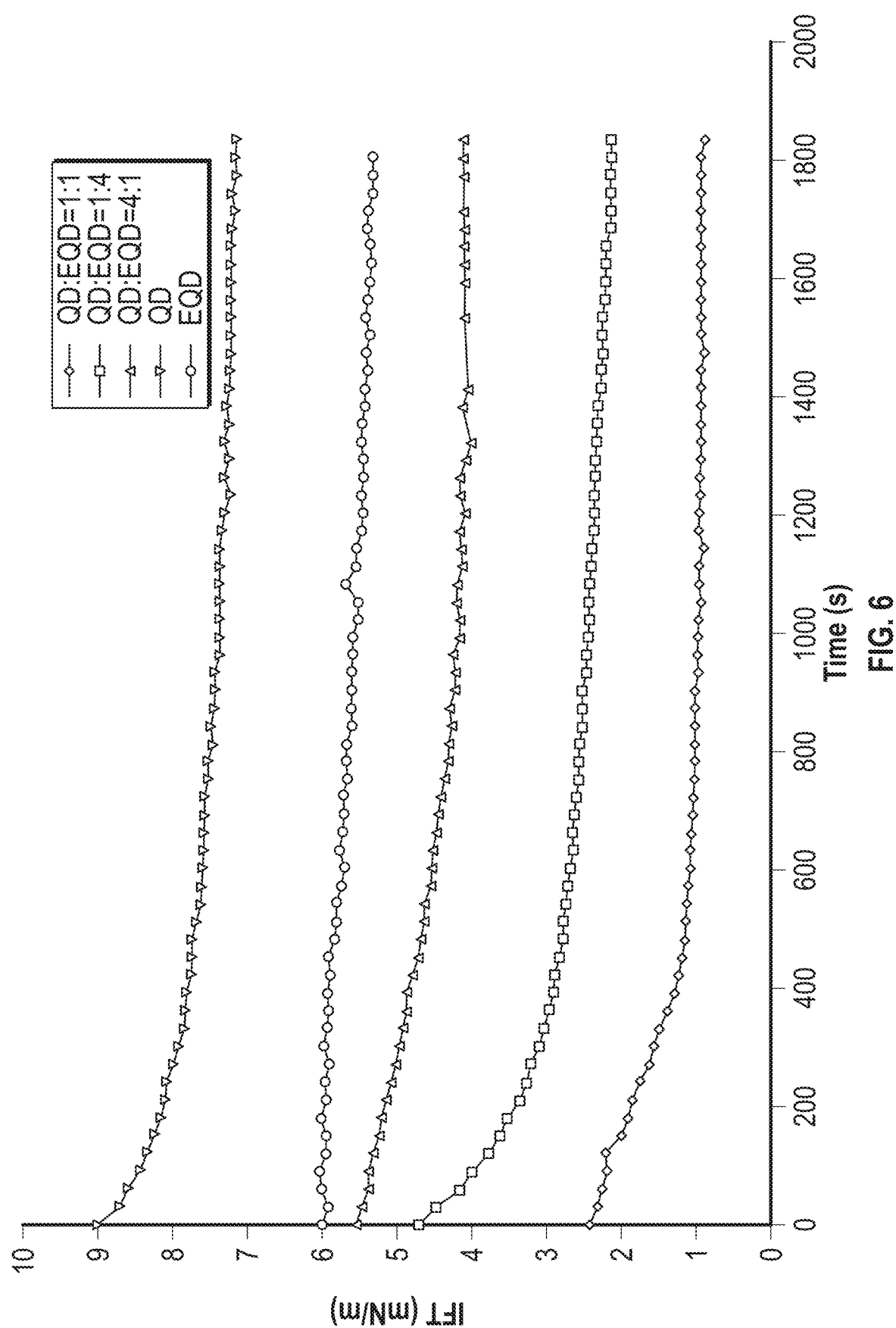
FIG. 6 shows the variation of oil/brine IFT with different ratios of QD and EQD.
Figure 7:
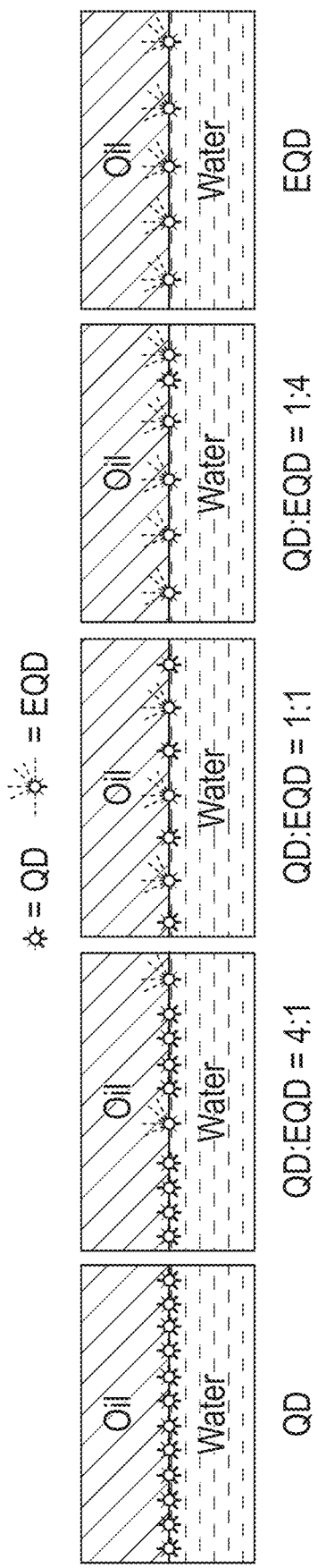
FIG. 7 is an illustration of the interfacial behavior of nanofluids with different ratios of QD and EQD.
Figure 8C:
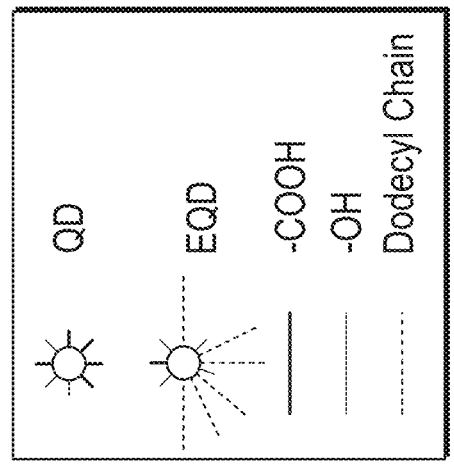
FIG. 8C is a schematic of the Interfacial film test: Hydrophobic side of EQD on a substrate.
Figure 8C:
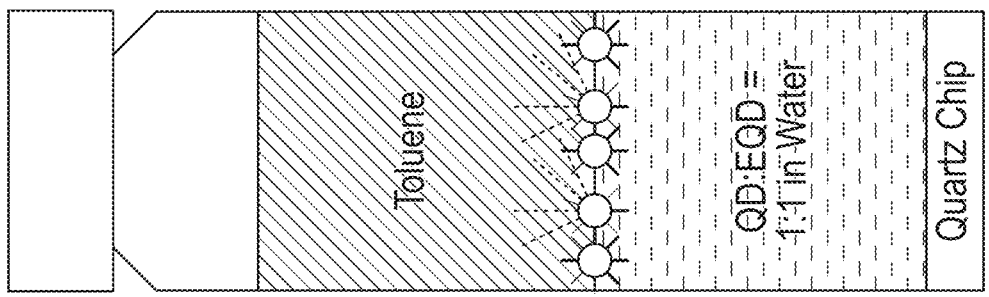
Figure 8B:
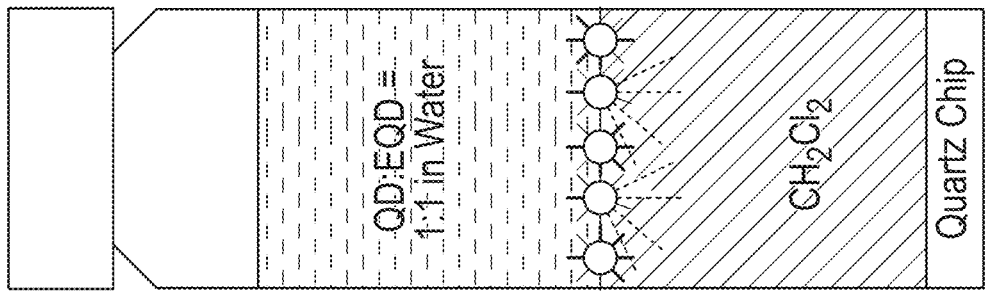
FIG. 8B is a schematic of the Interfacial film test: Hydrophilic side of EQD on a substrate.
Figure 8A:
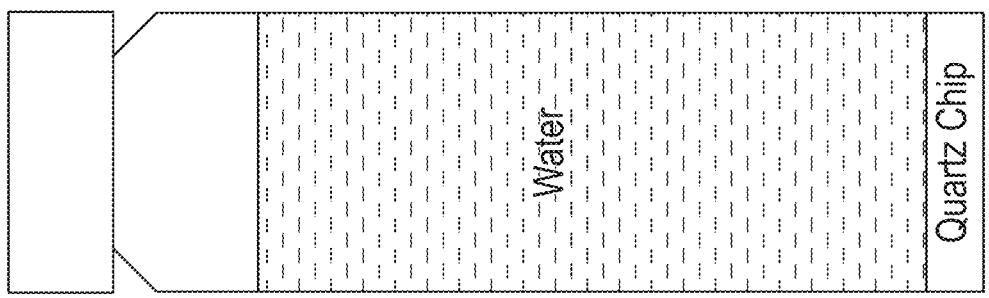
FIG. 8A is a schematic of the Interfacial film test: Reference water.

Interfacial tension measurements were conducted using a Krüss spinning drop tensiometer to observe the impact of these mixtures on IFT between crude oil and water. Gibbs crude oil from the Minnelusa formation in Wyoming was used as the oil phase in all the experiments. The properties of this oil can be found elsewhere. FIG. 6 shows that the highly hydrophilic QDs were able to lower the IFT between water and oil from 19.6 mN/m to about 7 mN/m, whereas the EQDs reduced it to about 4.9 mN/m. The amphiphilic quantum dots were better at reducing IFT because of their amphiphilic nature; however, the steric repulsion caused by the long chains forced them to continuously re-arrange at the interface. As a result, the IFT took a long time to stabilize. All mixtures reduced the IFT to a lower extent than QD and amphiphilic quantum dots because of synergistic effects between the two components. More specifically, QD molecules helped reduce the repulsive forces between neighboring EQD molecules by positioning themselves in between. In the case of QD:EQD=1:1, the QD and amphiphilic quantum dots arrange themselves in an ordered alternating fashion to minimize the repulsive forces between the chains and maximize IFT reduction, as seen in the schematic of FIG. 7. This arrangement led to the formation of an in-situ surfactant-like film at the interface. The dodecyl tails from the EQD served as the hydrophobic part, while the carboxyl and hydroxyl groups from QD served as the hydrophilic part. Due to its neutral surface charge and lowest IFT, QD:EQD=1:1 mixture was selected for further investigation and core flooding experiments.

Interfacial Test

The amphiphilic nature of QD:EQD=1:1 mixture was investigated using the interfacial film test displayed in FIG. 8. Quartz chips were placed at the bottom of three vials: A, B and, C. Vial A was filled with dichloromethane and DI water. Vial C was filled with Toluene and DI water. Dichloromethane and toluene were used as the oil phase. Dichloromethane is denser than water and stays at the bottom of the vial, whereas toluene is lighter than water and stays on top of the water. Vial B was filled with DI water as a reference. 5 mL of 0.1% concentration of QD:EQD=1:1 dispersion was injected into the DI water phase in vials A and C.

The nanofluid showed affinity to the interface due to the presence of both hydrophilic and hydrophobic functional groups in the molecules. This interfacial film could then be isolated and tested for amphiphilicity. For the test, three vials were used. Each vial had a clean quartz substrate placed in the bottom. Vial 1 had only water as a reference. Vial 2 had water as the aqueous phase and dichloromethane as the oil phase. Since dichloromethane is denser than water, the water stayed on the top while the dichloromethane stayed at the bottom. Vial 3 had toluene as the oil phase and water as the aqueous phase. Since toluene is lighter, it remained on top of the water. The QD:EQD=1:1 mixture was injected into vials 2 and 3 and allowed to sit overnight. Both QDs and amphiphilic quantum dots have interfacial properties and migrated to the interface where they arranged themselves in almost an alternating pattern to form an interfacial amphiphilic film, as seen in FIG. 8. This amphiphilic interfacial film had its hydrophilic side towards the aqueous phase and hydrophobic side towards the oil phase. Thus, the hydrophilic and hydrophobic sides are facing upwards in vials 2 and 3, respectively. The films were carefully collected with the quartz substrate preplaced inside the vials and dried with air.

Figure 9C:
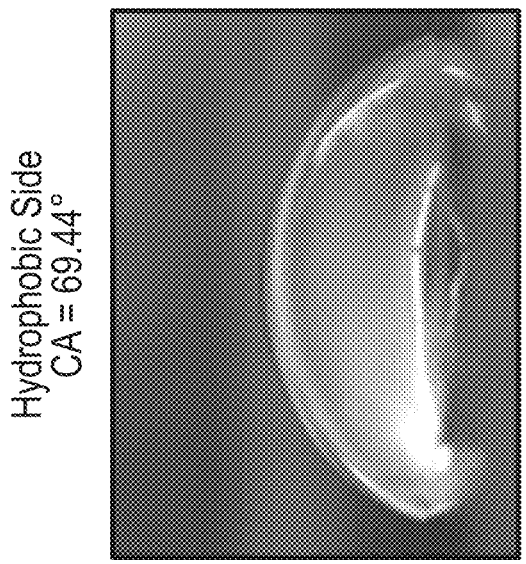
FIG. 9C shows the contact angle between a water drop and quartz substrate from an interfacial film test: Hydrophobic side of EQD on a substrate.
Figure 9B:
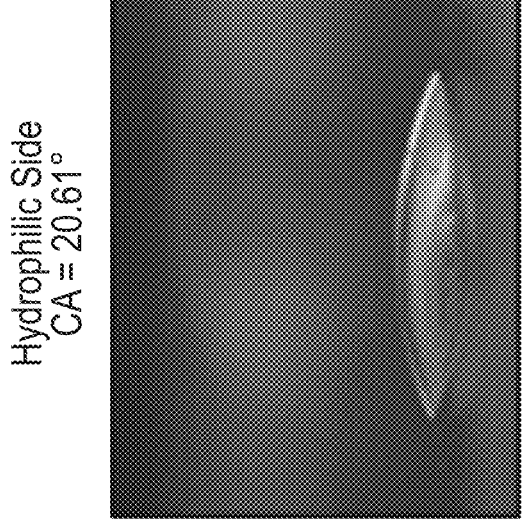
FIG. 9B shows the contact angle between a water drop and quartz substrate from an interfacial film test: Hydrophilic side of EQD on a substrate.
Figure 9A:
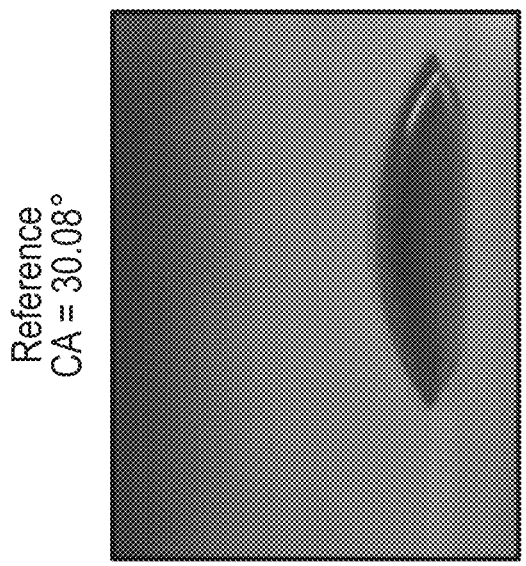
FIG. 9A shows the contact angle between a water drop and quartz substrate from an interfacial film test: Reference water.

The contact angles between a water drop and the quartz substrates collected from the interfacial film test were measured and are presented in FIG. 9. The angle for the reference case (vial 1) was 30.08°, indicating the wettability of the pure quartz surface. The contact angle on the hydrophilic side of the film (vial 2) was measured to be 20.61°, while that on the hydrophobic side (vial 3) was 69.44°. The hydrophilic side had a contact angle lower than the reference case, while the hydrophobic side had a contact angle higher than the reference case. This confirmed that the film formed at the interface was amphiphilic in nature and is responsible for the IFT reduction.

Wettability Alteration

Figure 10:
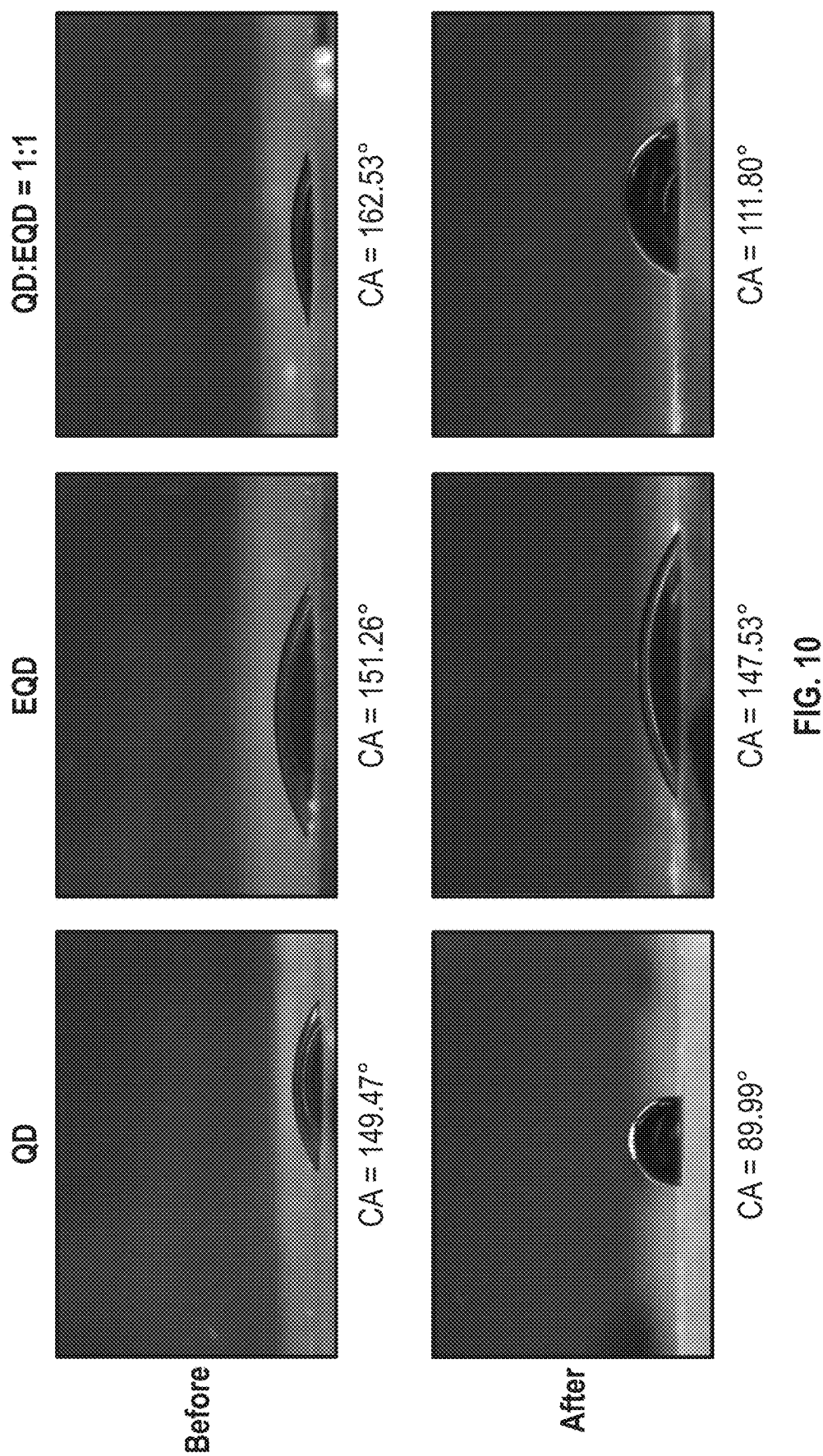
FIG. 10 shows the contact angle between an oil drop and quartz substrate before and after nanofluid treatment.
Figure 11:
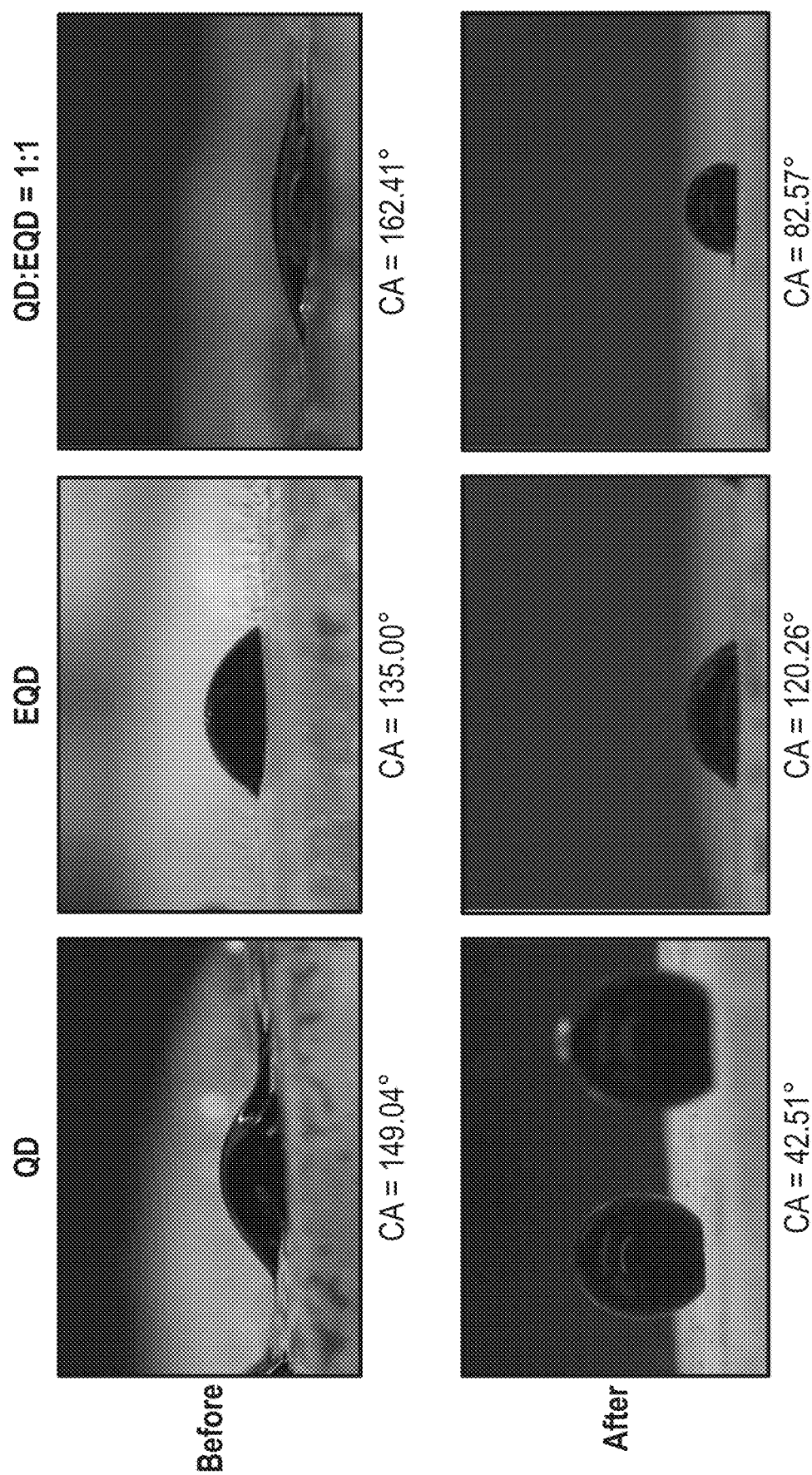
FIG. 11 shows the contact angle between an oil drop and calcite substrate before and after nanofluid treatment.

The effect of QD, amphiphilic quantum dots, and QD:EQD=1:1 mixture on wettability alteration was tested using quartz and calcite chips to mimic sandstone and carbonate surfaces. The chips were first aged for one week in oil at 90° C. to become oil-wet. The contact angle of an oil drop in brine was measured on these chips. Thereafter, the chips were immersed in the QD-based nanofluids for 24 hours at 50° C., and the contact angle measurements were repeated after nanofluid treatment. FIGS. 10 and 11 show these angles before and after nanofluid treatment, and reveal that oil interacted differently with both surfaces. On quartz, QD reduced the contact angle from 149.47° to 89.99°, whereas amphiphilic quantum dots hardly changed it. The QD:EQD=1:1 mixture provided a contact angle between the previous two values, with a change from 162.53° to 111.80°. Calcite surface displayed a similar trend and wettability alteration with all three nanofluids. QD significantly reduced the contact angle from 149.04° to 42.51°, amphiphilic quantum dots slightly altered it, and the QD:EQD=1:1 mixture lowered it by about 80°.

The amphiphilic quantum dots had little effect on wettability because of their hydrophobic dodecyl groups, which provided steric hindrance towards the mineral surfaces. The QDs, on the other hand, showed the highest wettability alteration towards the water-wet state on quartz and calcite. Although the trends were similar on both surfaces, the mechanism of wettability alteration is different. On quartz, the driving factor for wettability alteration is hydrogen bonding between the silanol groups of quartz and the hydroxyl and carboxyl groups of QD. The mixture showed a neutral-wet state due to the presence of both components. In the case of calcite, adsorption is likely due to electrostatic interactions between negatively charged QDs and positively calcite surface. The neutrally charged mixture of QD and amphiphilic quantum dots showed a change in wettability but to a lower extent than the pure QD.

Adsorption

Dynamic flow tests of nanofluids on quartz and calcite substrates were performed to qualitatively evaluate their adsorption. The tests were conducted by flowing the nanofluid over quartz and calcite substrates at ambient conditions. In all experiments, quartz and calcite chips were placed in a closed flow chamber. Distilled water was first injected to wash the surfaces of the substrates. Thereafter, the nanofluid was injected at a flow rate of 0.1 mL/min. Substrates were collected after nanofluid injection, dried under vacuum, and then imaged using a FEI Helios Nanolab 600 Scanning Electron Microscope (SEM). Through the Lens Detector (TLD) was selected to get enough contrast. The beam voltage and current were deliberately adjusted at 15 kV and 50 pA, respectively, to strike a subtle balance between achieving enough resolution and avoiding beam damage.

Figure 12B:
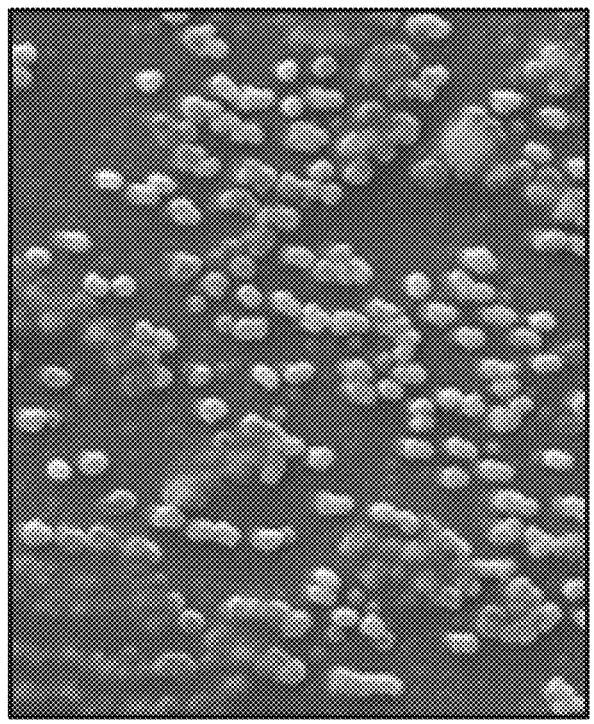
FIG. 12B is a SEM image of adsorbed nanofluid on a calcite substrate.
Figure 12A:
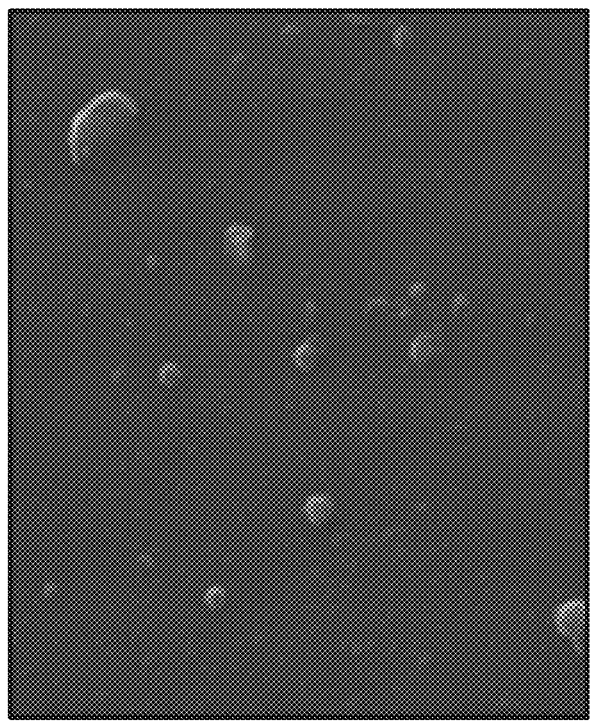
FIG. 12A is a SEM image of adsorbed nanofluid on a quartz substrate.

SEM images of substrates collected after the tests (FIG. 12) showed a much higher nanofluid adsorption on calcite due to stronger electrostatic attractive forces as compared to hydrogen bonding in the case of quartz. SEM-EDX analysis (Table 4) of adsorbed particles on calcite revealed the presence of carbon and calcium (mainly from calcite) as well as oxygen. The absence of nitrogen suggests that the adsorbed particles are QDs and not amphiphilic quantum dots, in agreement with our wettability measurements. On the quartz substrate, the EDX analysis showed the presence of carbon, oxygen, and silicon due to the adsorbed particles and the silica backbone. The amount of nitrogen was negligible, indicating that most of the particles adsorbed are QDs.

TABLE 4

SEM-EDX of adsorbed nanoparticles on quartz and calcite substrates

| | Atoms (%) | |
|---|---|---|
| Element | Quartz | Calcite |
| Carbon | 58.51 | 49.19 |
| Oxygen | 31.91 | 1.61 |
| Nitrogen | 0.04 | 0.00 |
| Silicon | 9.54 | 0.86 |
| Calcium | 0.00 | 15.51 |

Macroscale Core Flooding

Figure 13:
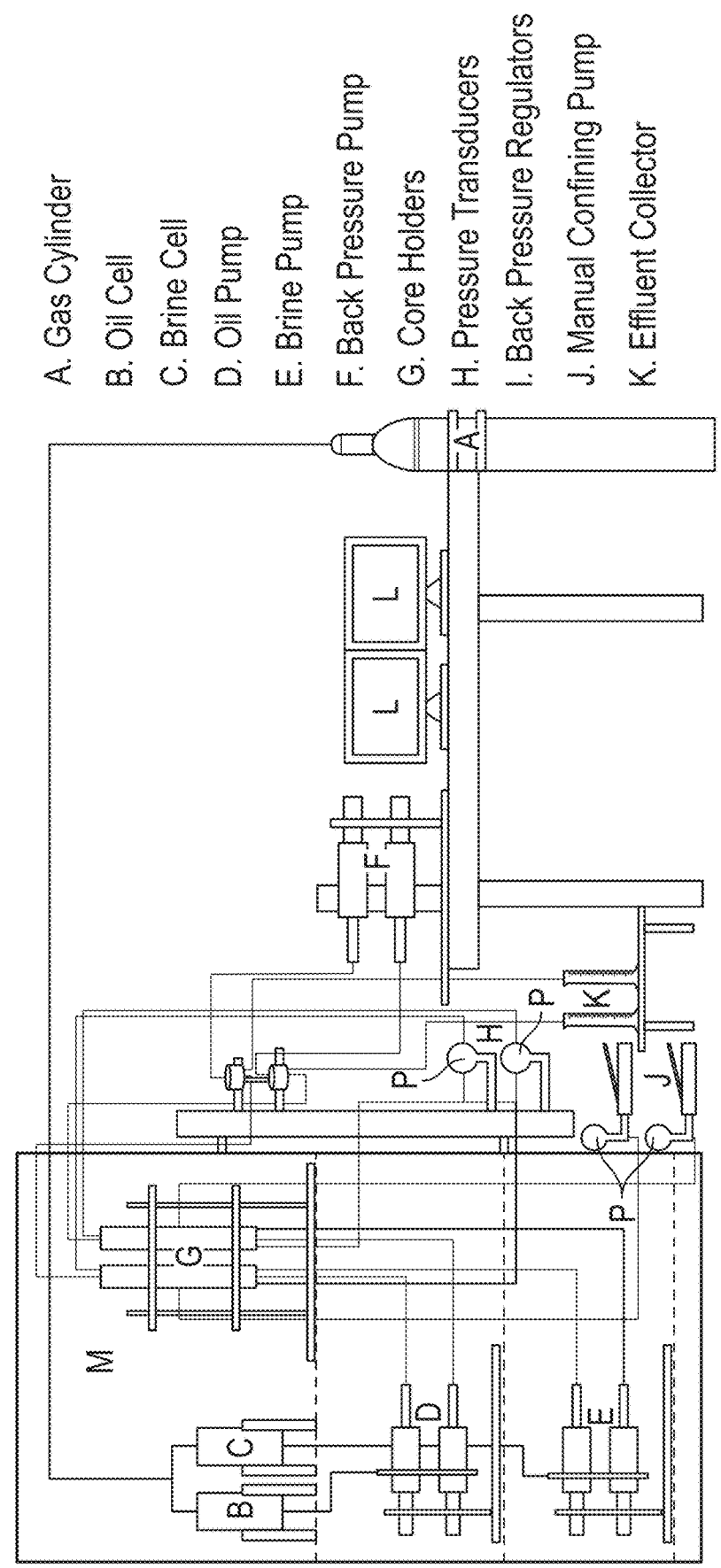
FIG. 13 is a schematic diagram of the experimental core flooding setup.

Core flooding experiments were conducted on Berea sandstone and Edwards limestone to test the efficiency of the selected nanofluid. Cylindrical cores of 1.5" in diameter and 6" in length were drilled and cut from parent blocks. The cores were thoroughly washed with DI water and dried for 48 hours at 110° C. before usage. The petrophysical properties of the cores are listed in Table 5. The micro-CT images, mineralogy, and composition of the Berea and Edwards outcrops can be found elsewhere. A schematic of the experimental setup is provided in FIG. 13. The cores were saturated with Gibbs crude oil and dynamically aged for 4 weeks to alter the wettability of the rocks to oil-wet conditions. The aqueous phase (brine/nanofluid) was injected at 0.6 cm³/min into the aged core, maintaining the flow rate in the capillary-dominated flow regime. The recovered effluent was heated to 55° C. to separate the oil and water phases.

TABLE 5

Petrophysical properties of Edwards limestone and Berea sandstone cores

| Property | Edwards | | Berea | |
| --- | --- | --- | --- | --- |
| | Brine flooding | Nanofluid flooding | Brine flooding | Nanofluid flooding |
| Length (inch) | 5.98 | 6.48 | 5.97 | 5.94 |
| Diameter (inch) | 1.49 | 1.50 | 1.49 | 1.48 |
| Porosity (%) | 22.4 | 24.2 | 20.1 | 19.7 |
| Average Permeability (mD) | 18.6 | 18.1 | 172.3 | 168.4 |

Figure 14A:
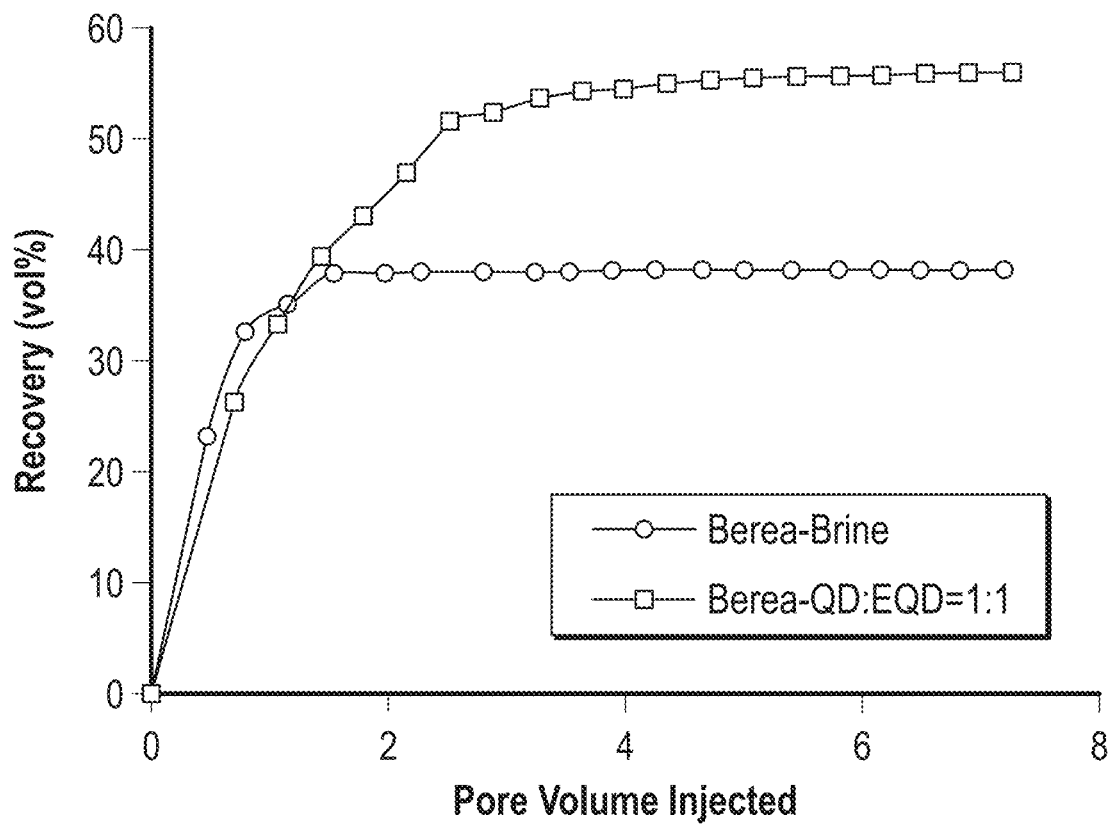
FIG. 14A shows recovery curves for Berea sandstone after brine and nanofluid flooding.
Figure 14B:
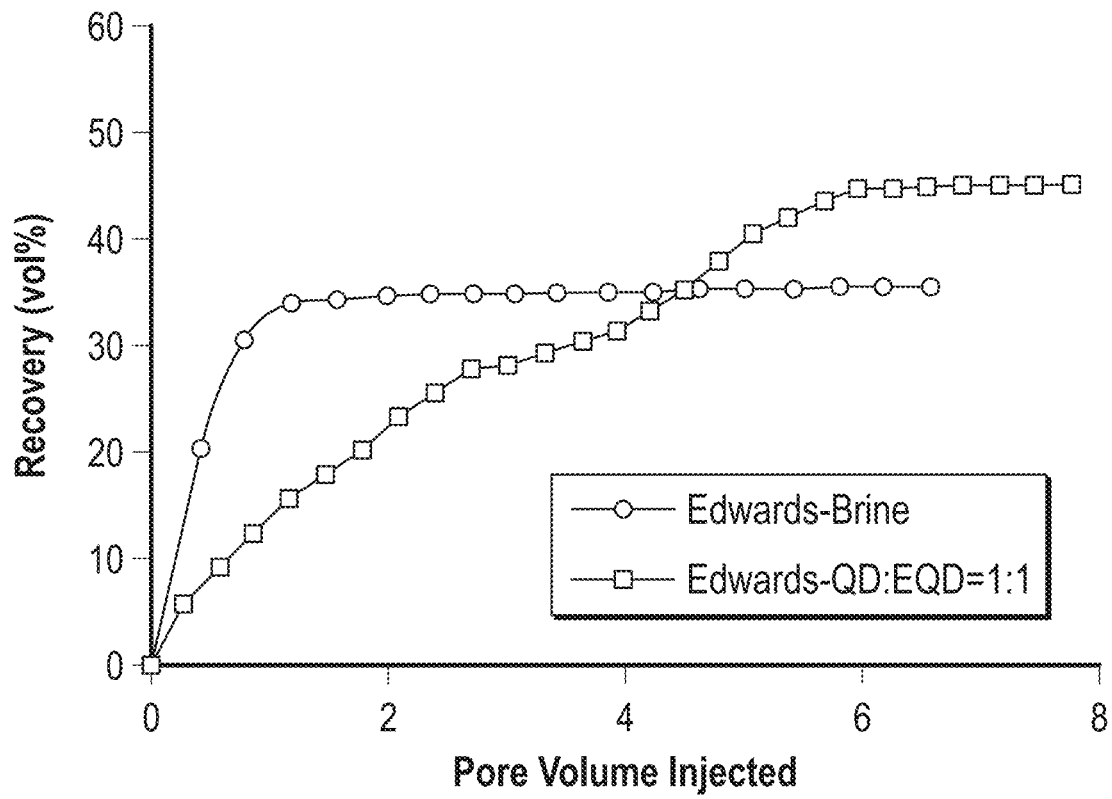
FIG. 14B shows recovery curves for Edwards carbonate after brine and nanofluid flooding.
Figure 14C:
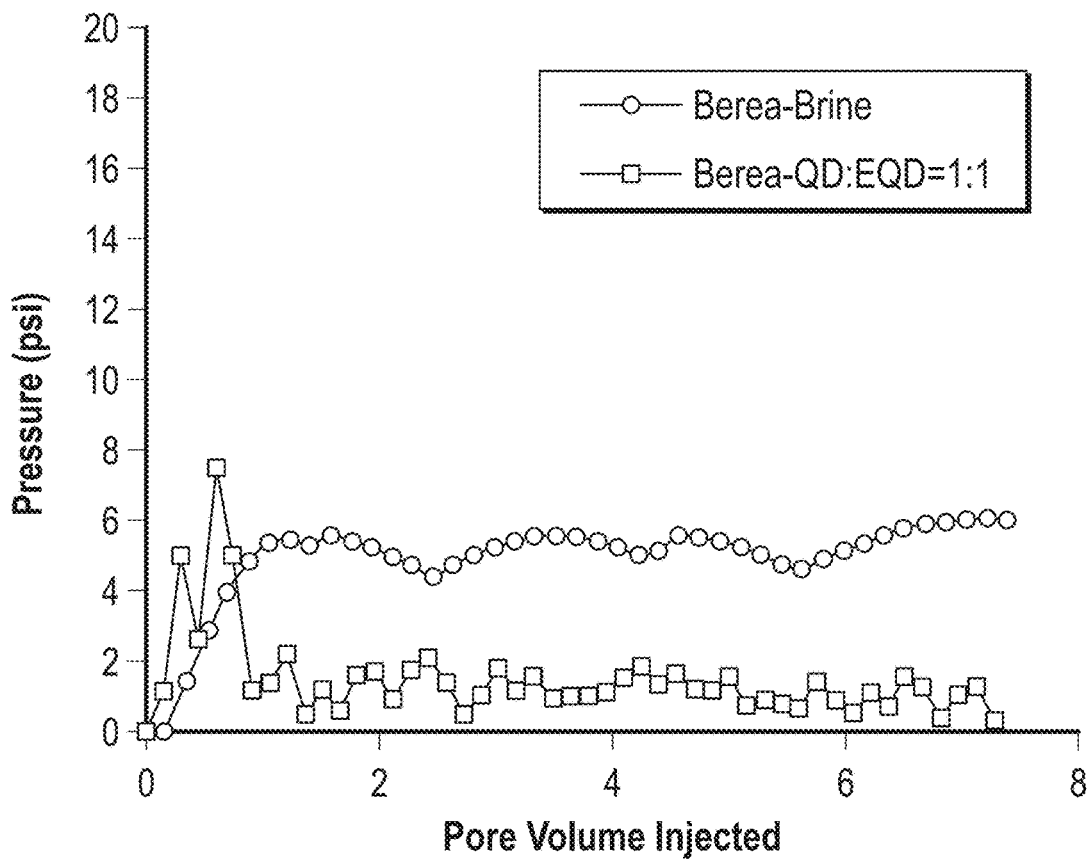
FIG. 14C shows a pressure drop across Berea sandstone after brine and nanofluid flooding.
Figure 14D:
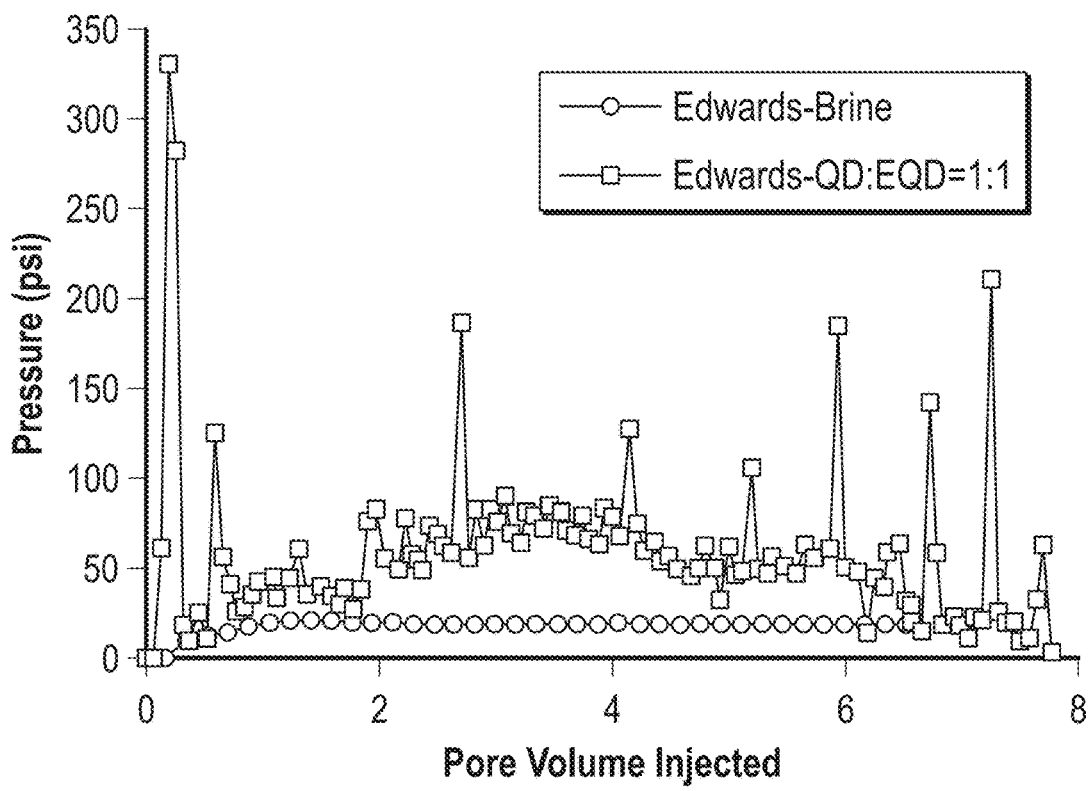
FIG. 14D shows a pressure drop across Edwards carbonate after brine and nanofluid flooding.

The data in FIG. 14A indicates that 0.1 wt % concentration of QD:EQD=1:1 mixture in brine increased oil recovery to about 56 vol %, compared to 35.7 vol % with base brine. The nanofluid recorded a much lower pressure drop ($\Delta P$) compared to brine alone due to its ability to lower the IFT and contact angle, and thus the local capillary pressure needed to invade the pores, as seen in FIG. 14C. In the case of Edwards carbonate, the nanofluid showed a slow and steady recovery before stabilizing at six pore volumes. This trend was due to the large adsorption of QDs on the carbonate surface (FIG. 12B), resulting in pore plugging and a large $\Delta P$ across the core. The pressure spikes in FIG. 14D indicates that this blockage redirected the nanofluid into a new uninvaded path, leading to a drop in $\Delta P$. The combined effect of IFT reduction, wettability alteration, and pore plugging increased oil recovery by about 9.6 vol % as compared to base brine (FIG. 14B). Thus, the application of such nanofluids is more suitable in silicate-rich oil reservoirs or aquifers where rock retention is minimum.

Figure 15:
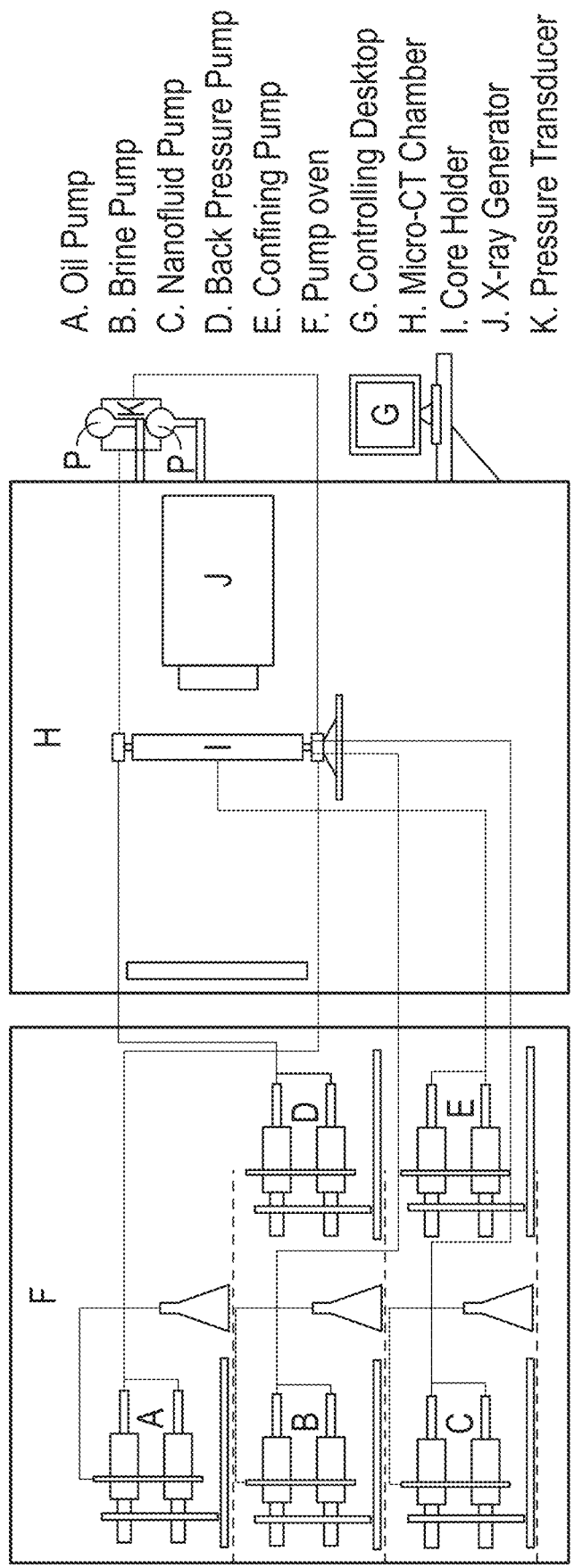
FIG. 15 shows the experimental setup for the micro-CT core flooding.
Figure 16:
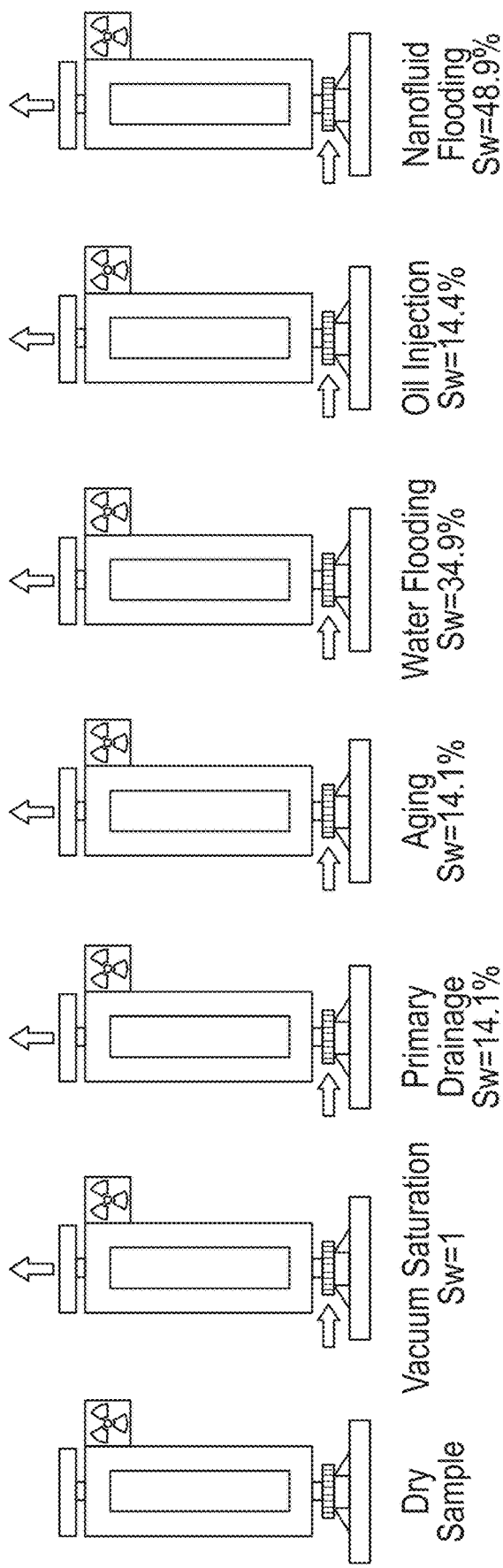
FIG. 16 is a schematic diagram of the micro-CT core flooding procedure.

Example 2—Pore-Scale Displacement Mechanism of Aqueous Nanofluids Using X-Ray Micro-Computed Tomography Micro-CT Core Flooding Microscale core flooding experiments using X-ray micro-computed tomography (micro-CT) technique integrated with a miniature core flooding system. This method sheds light on the pore-scale displacement physics inside the porous medium. The experimental setup of the system is shown in FIG. 15, and the experimental procedure is shown in FIG. 16. Dual cylinder Quizix pumps were used to inject fluids (Milne Point oil, brine, aqueous nanofluid) and to apply a net confining pressure (200 psi) and a back pressure (300 psi). A heterogeneous Arkose aquifer core sample (5 mm in diameter and 4.6 cm in length) from the Fountain formation was used in this experiment. The dry rock sample was scanned to obtain the rock properties and grain map of the rock. The rock was divided into its constituent minerals (quartz, carbonate, and feldspar) based on the intensities of minerals from the dry scan. The rock sample was then vacuum saturated with brine, and subsequent primary drainage was performed with Milne Point crude oil to establish initial water saturation (Swi). The core was then dynamically aged for four weeks at 60° C. Base brine (1M NaCl) flooding was conducted as a reference recovery process. Since the brine could not alter the wettability, the initial saturation conditions were re-established to make sure that the starting conditions remained the same. Thereafter, the core was flooded with the nanofluid (QD:EQD=1:1 in 1M NaCl). The core was scanned using the micro-CT scanner (Versa-XRM50) at different stages (1PV, 3PV, 8PV, and 20PV) during each of the flooding steps (brine and nanofluid). Saturation profiles and in-situ contact angles were analyzed from the scanned images by Avizo 9.4 software. More details on the rock and fluid samples and the experimental procedures can be found elsewhere.[39,40,41]

Figure 17A:
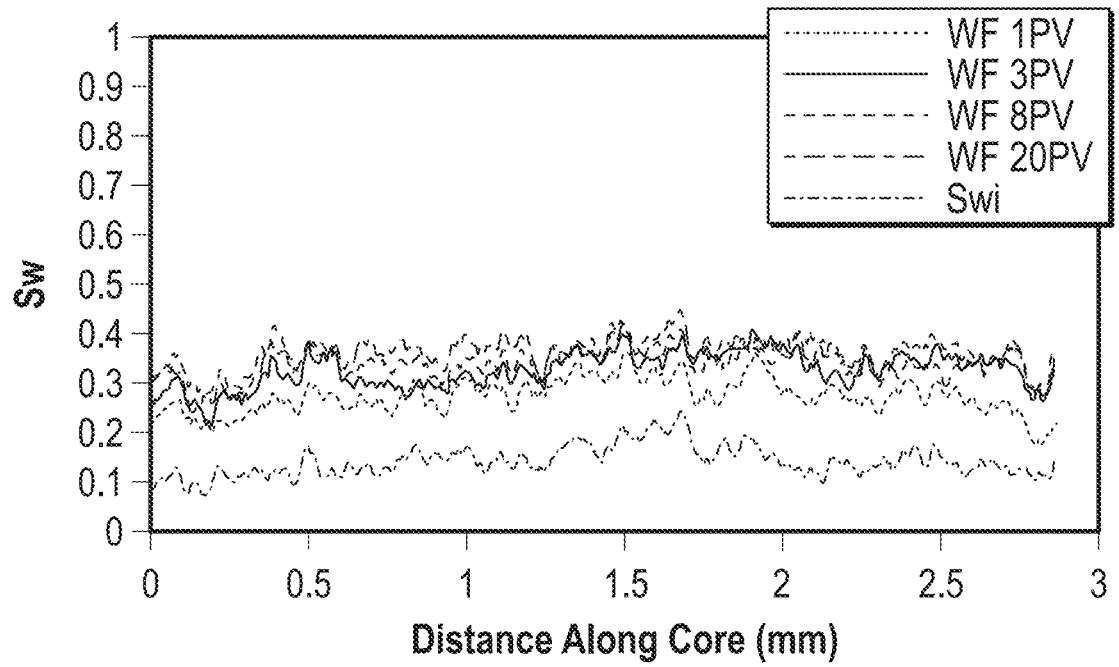
FIG. 17A shows the saturation profile for water flood.
Figure 17B:
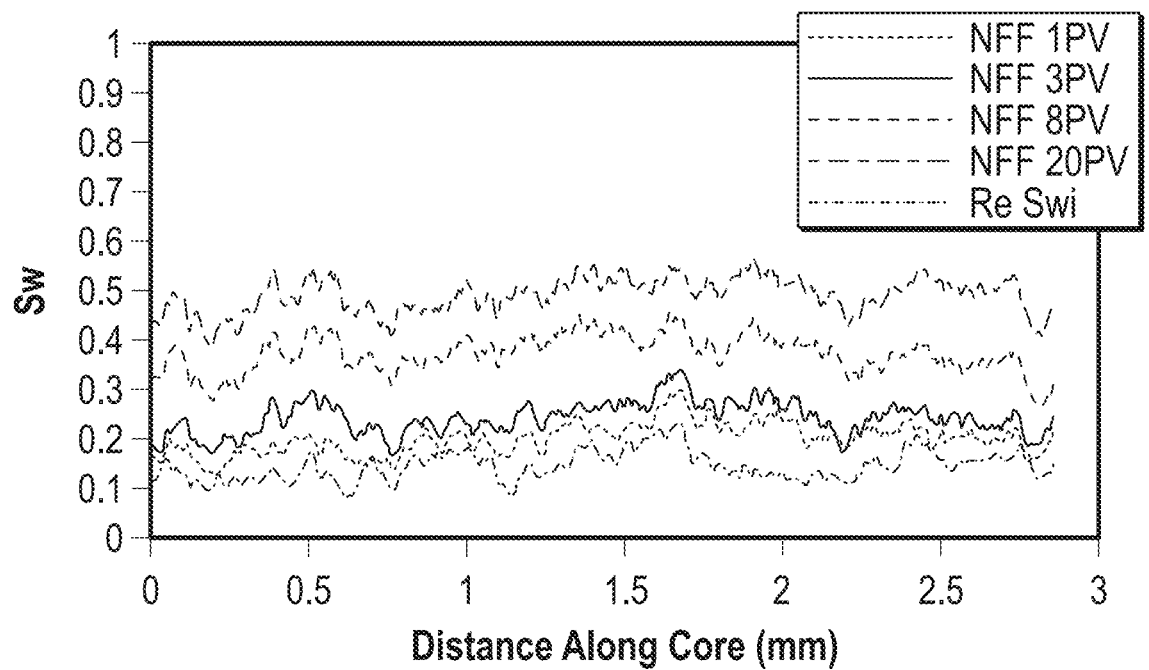
FIG. 17B shows the saturation profile for nanofluid flood.
Figure 18A:
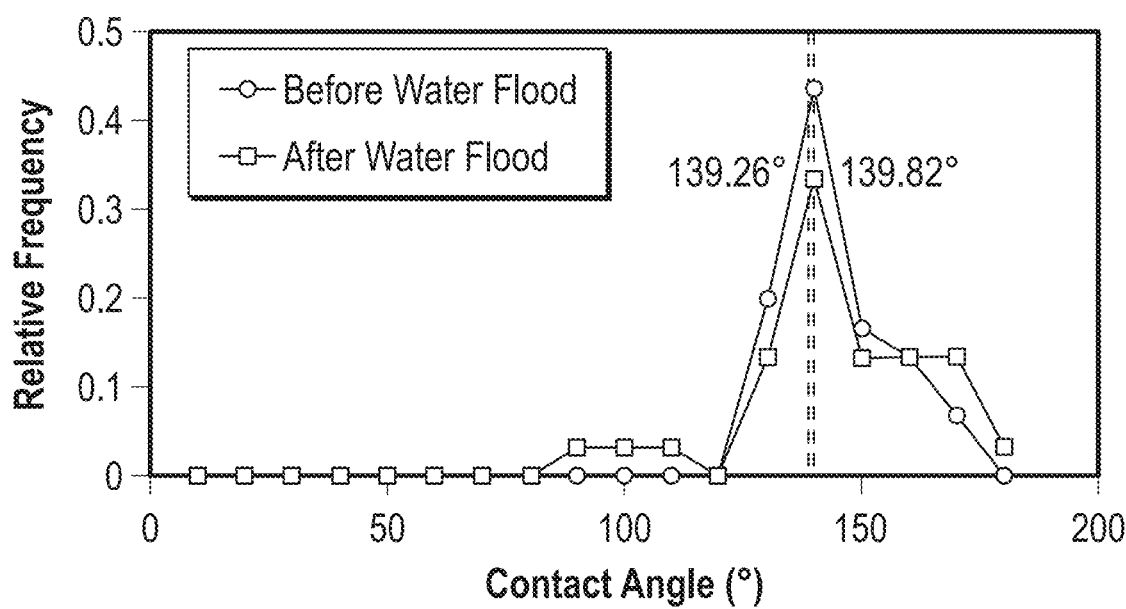
FIG. 18A shows the contact angle distribution on quartz before and after water flood.
Figure 18B:
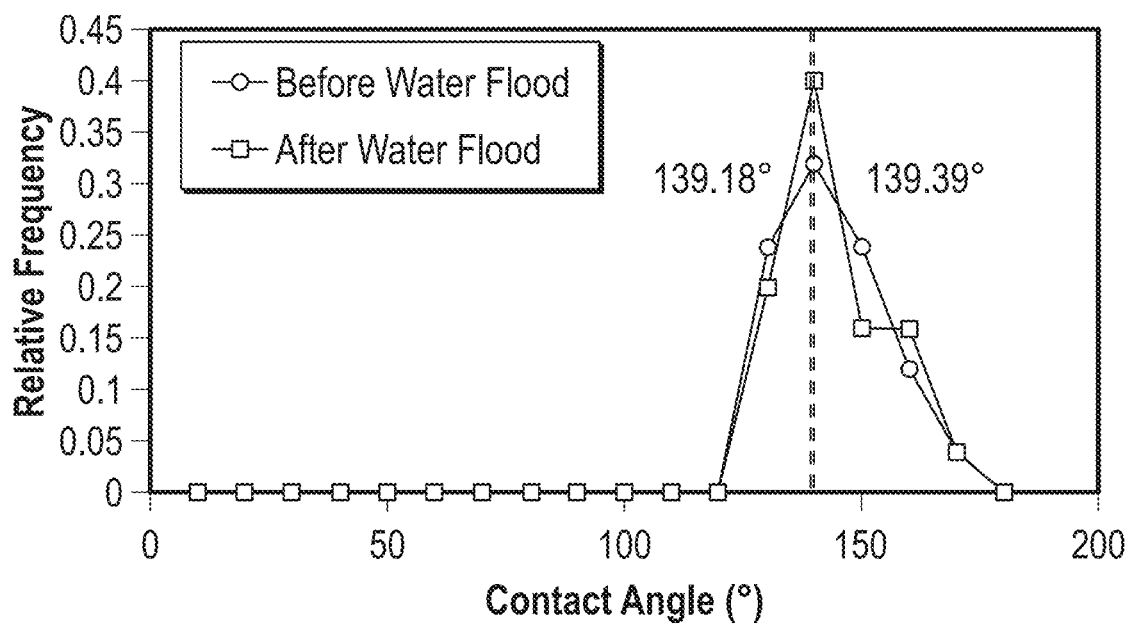
FIG. 18B shows the contact angle distribution on carbonate before and after water flood.
Figure 18C:
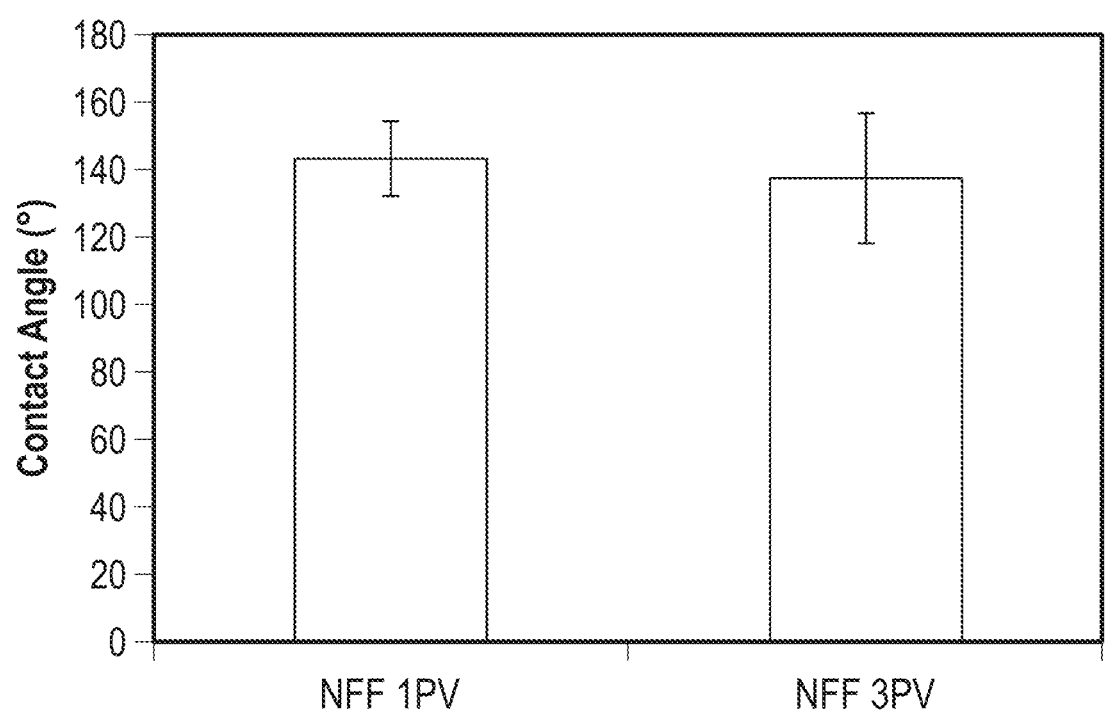
FIG. 18C shows the contact angle distribution on feldspar before and after water flood.
Figure 19A:
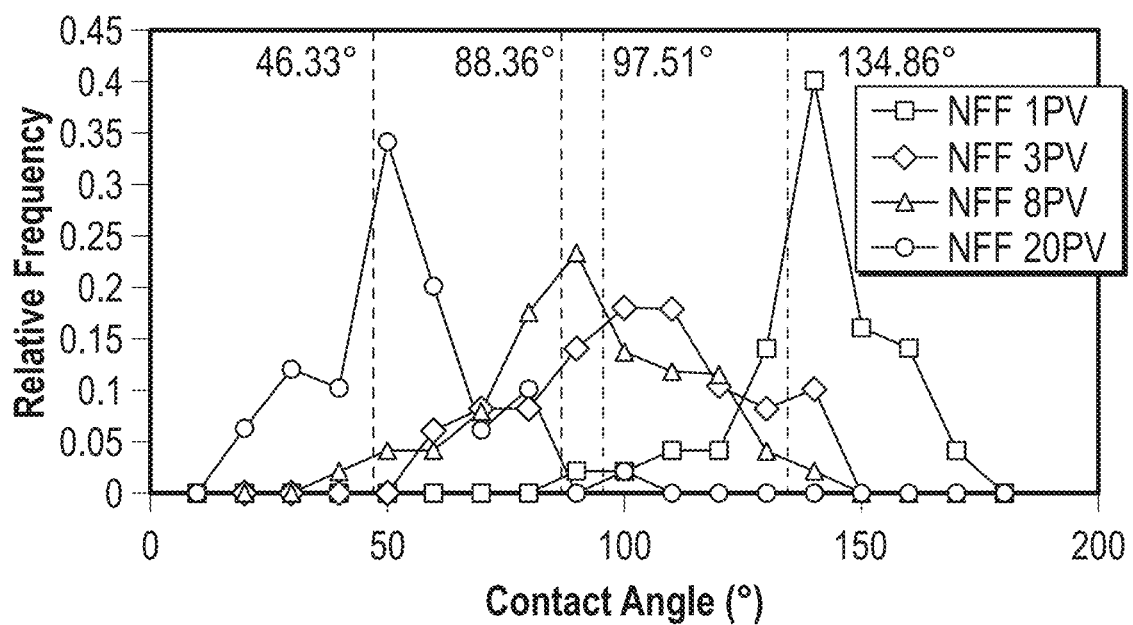
FIG. 19A shows the contact angle distribution on quartz before and after nanofluid flood.
Figure 19B:
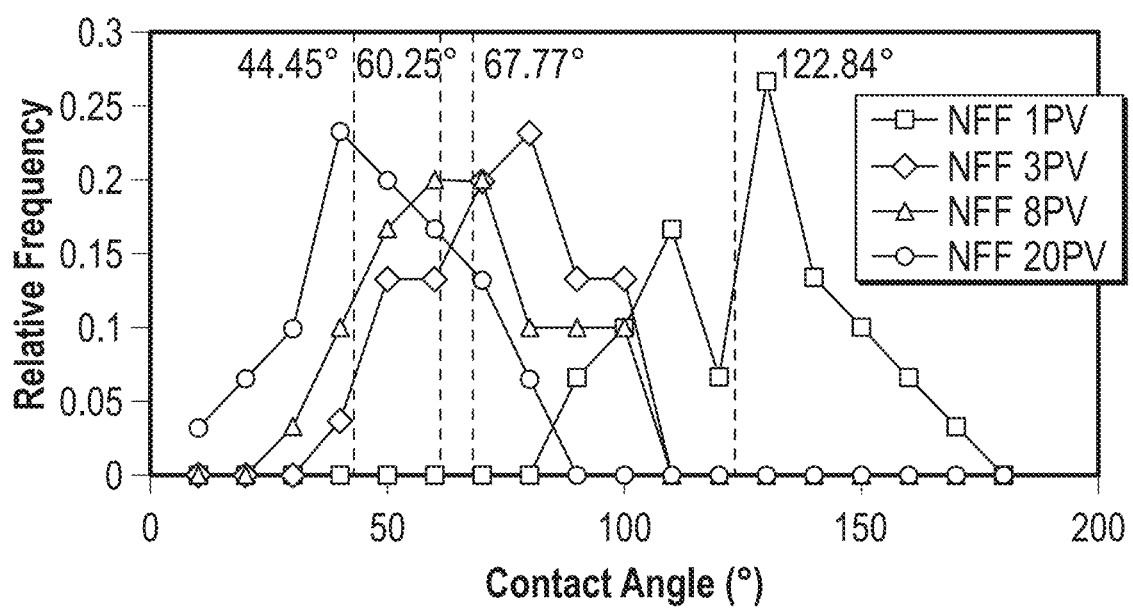
FIG. 19B shows the contact angle distribution on carbonate before and after nanofluid flood.
Figure 19C:
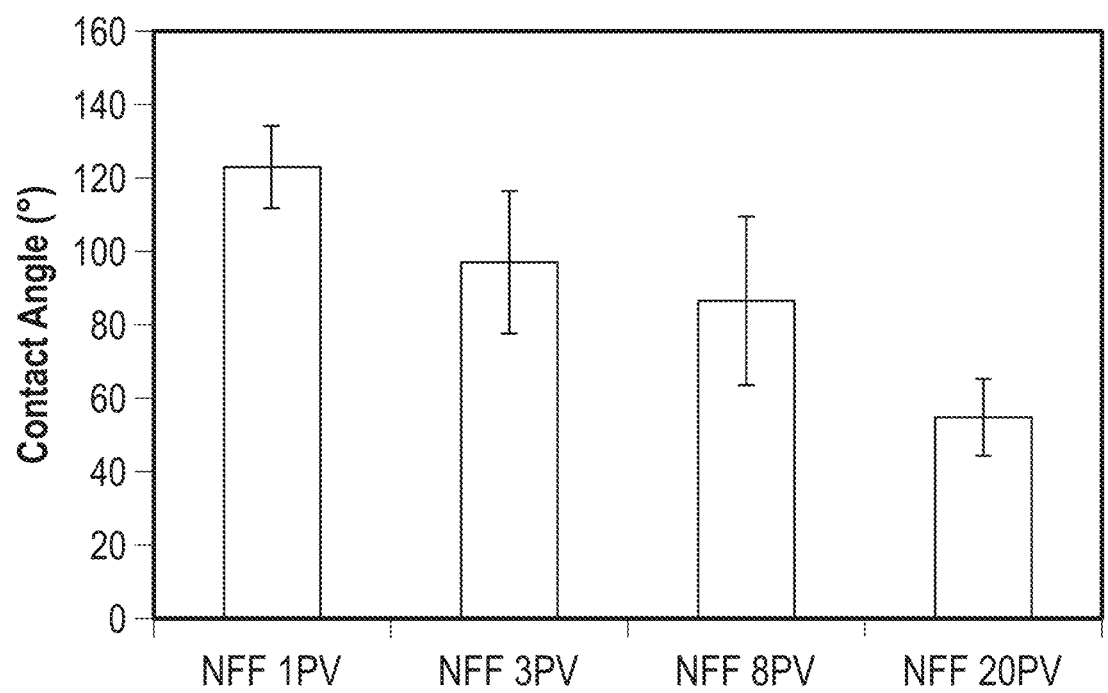
FIG. 19C shows the contact angle distribution on feldspar before and after nanofluid flood.

The results from micro-CT flooding show that the nanofluid can increase the oil recovery by 14% as compared to base brine. FIG. 17 illustrates the water saturation profiles along the core at different flooding stages. It is clear that the water saturation after nanofluid flooding is significantly higher than that after base brine flooding, thereby revealing the high efficiency of the nanofluid. FIG. 18 shows the measured contact angles on different minerals (quartz, carbonate, and feldspar) before and after water flooding. The brine showed no effect on wettability alteration while the contact angle noticeably changed towards water-wet conditions on all minerals at each stage of nanofluid injection, as shown in FIG. 19.

Displacement Mechanism

The mechanisms behind the increase in oil recovery due to the QD-based nanofluid are wettability alteration and IFT reduction. The nanoparticles (QD and EQD) may prefer to migrate to the 3-phase region between oil, rock, and water at the initial stages of the experiment as compared to the oil-water interface. This phenomenon led to faster wettability alteration during the initial stages, as seen in Table 6. Afterward, the nanoparticles migrated to the oil-water interface affecting the IFT. This preferential behavior of the nanoparticles slows down the recovery at the initial stages of nanofluid injection. The rate of oil recovery is increased when the nanofluid migrates to the 2-phase region between oil and water.

TABLE 6

Reduction in average contact angle (in degrees) per PV of nanofluid injection at different flooding stages.

| | Quartz | Carbonate | Feldspar |
| --- | --- | --- | --- |
| 1 PV to 3 PV | 18.68 | 27.53 | 12.92 |
| 3 PV to 8 PV | 1.83 | 1.50 | 2.09 |
| 8 PV to 20 PV | 3.50 | 1.32 | 2.64 |

Example 3—Interfacial Activity of the Aqueous Nanofluid at the Foam Lamella

Figure 20:
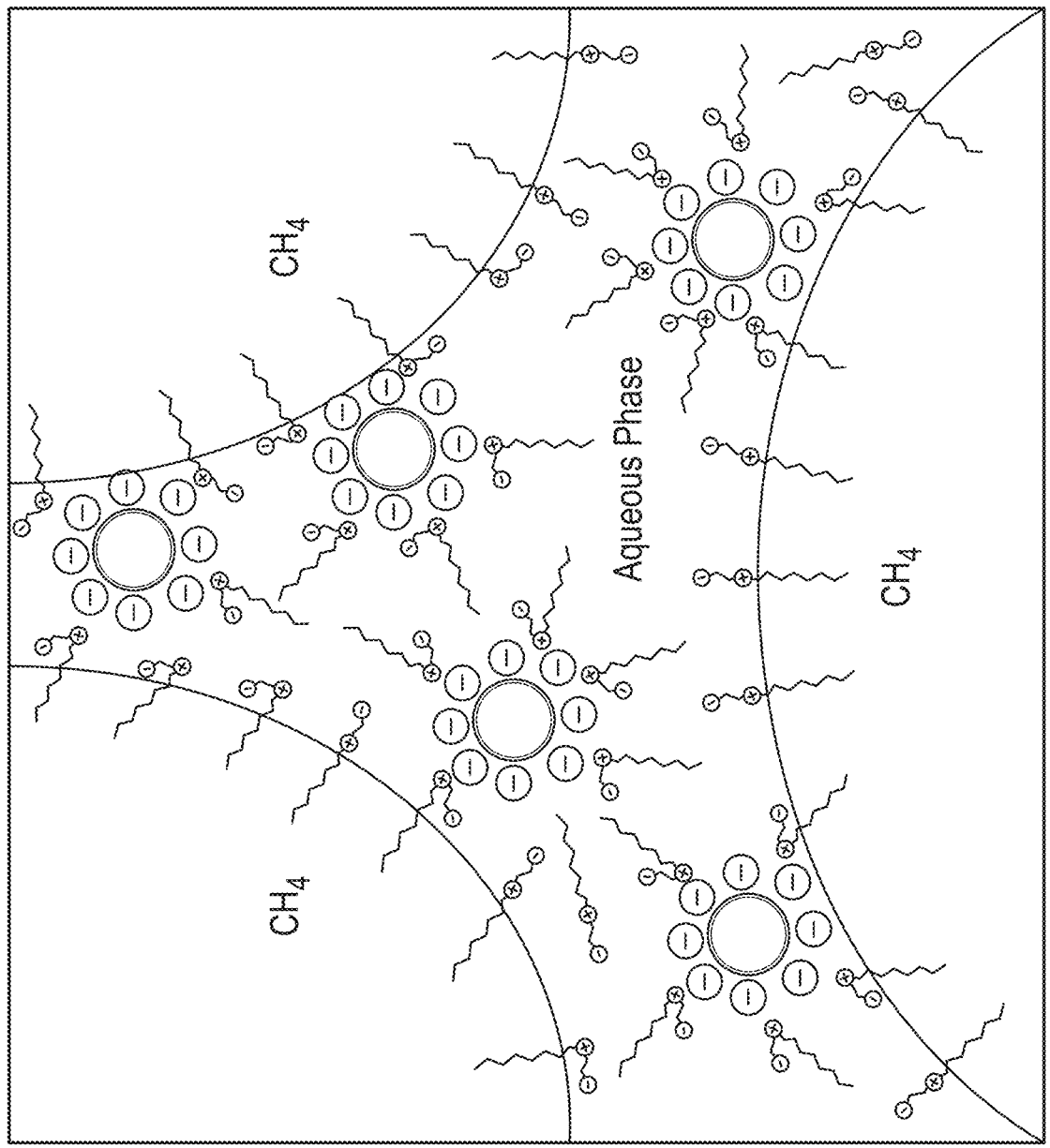
FIG. 20 illustrates a schematic of the QD-surfactant nanofluid at the foam lamella.

The interfacial activity of the QDs was tested with foaming surfactants such as cocamidopropyl hydroxysultaine and cocoamidopropyl betaine. Here, we report the results with a synthetic amphoteric surfactant from Stepan, Amphosol CS-50 (ACS). A schematic for the interaction between the nanoparticles and surfactant is shown in FIG. 20. At the methane-water interface, the surfactant molecules assemble themselves with the hydrophobic tail in the gas phase and the hydrophilic head in the aqueous phase. When the QDs in the aqueous phase arrange themselves at the lamella, they act as a barrier between the two gas bubbles. In addition, the negatively charged head of the surfactants on adjacent bubbles are electrostatically repelled by the negative charge of the QD, thus preventing the bubbles from coalescing.

The surfactant Amphosol CS-50 was procured from Stepan Company. The brine used was 200,000 ppm, and the oil used was Bakken oil. The gas used was industrial-grade methane from Airgas. The performance of the QD to improve foam strength and stability was tested using methane as gas phase and at high temperature (115° C.) and high pressure (3500 psi) conditions. The foam was generated using both water-wet and oil-wet sand packs. The sand used was a mixture of 89% 40/70-mesh and 11% 20/40-mesh. During the tests, the sand pack (40 inches in length) was filled with sand to a permeability of about 63 Darcy. For water-wet conditions, the sand pack was vacuumed overnight and completely saturated with 200,000 ppm brine. For the oil-wet tests, the sand was aged in Bakken oil for 5 weeks at 115° C. and 200 psi. The sand pack was filled with the oil-wet sand and vacuumed for one hour. Methane was then injected into the sand pack to push out the air and the sand pack was vacuumed overnight. The sand pack was saturated with oil at 500 psi to completely saturate the sand packs and dissolve any trapped methane in the pore space. A higher pressure was used to ensure the complete dissolution of any entrapped methane. The oil was then displaced with brine until no more oil came out to establish initial oil saturation. Initial oil saturation of about 10% was established in the sand-packs prior to foam generation. The pressure drop across the sand pack was measured to estimate the apparent viscosity of the foam. Once the pressure stabilized (steady-state), the foam was directed to a pressure cell maintained at 115° C. and 3500 psi to measure the half-life of the foam. Half-lives and apparent viscosity of the formulation were used to determine the efficiency of the foam.

Figure 21:
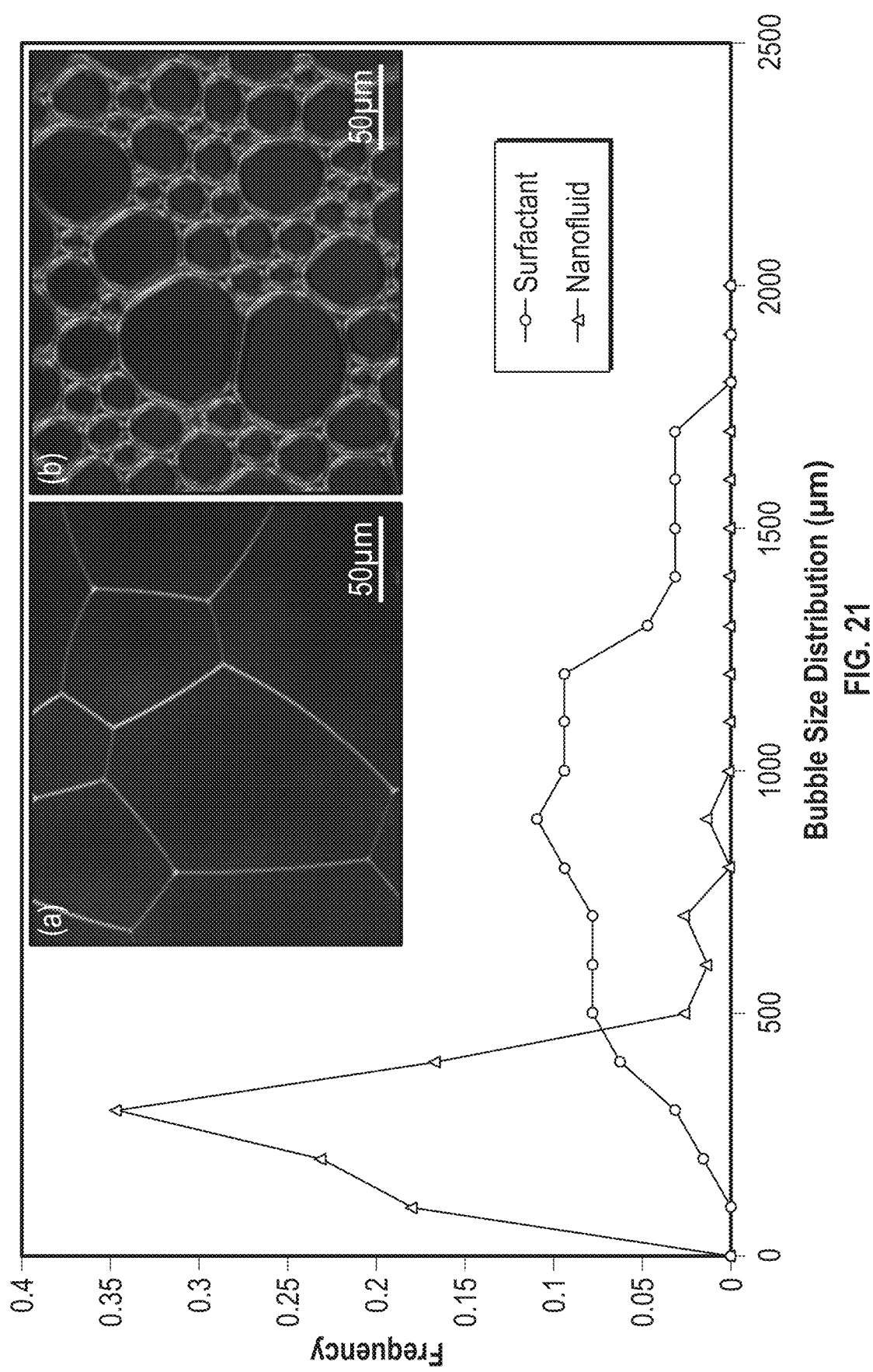
FIG. 21 is a bubble size distribution for foam formed by pure surfactant and nanofluid. (Inset: Optical microscope image for foam formed by surfactant (a) and nanofluid (b)).
Figure 22A:
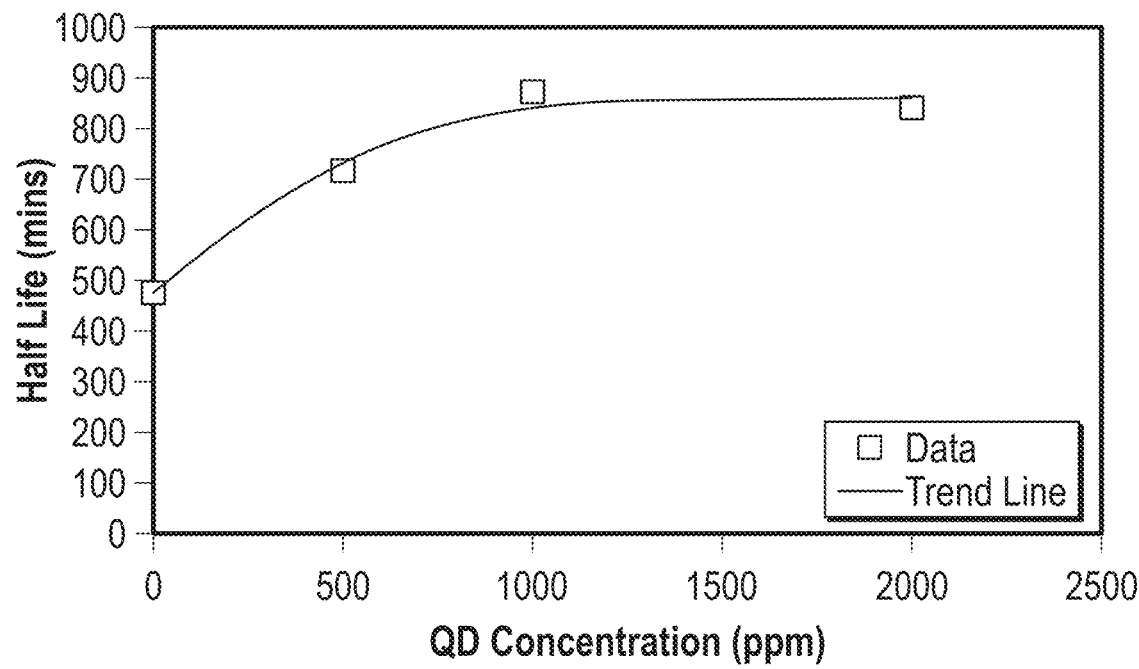
FIG. 22A shows the half-lives for foam generated using varying QD concentrations in a water-wet system.
Figure 22B:
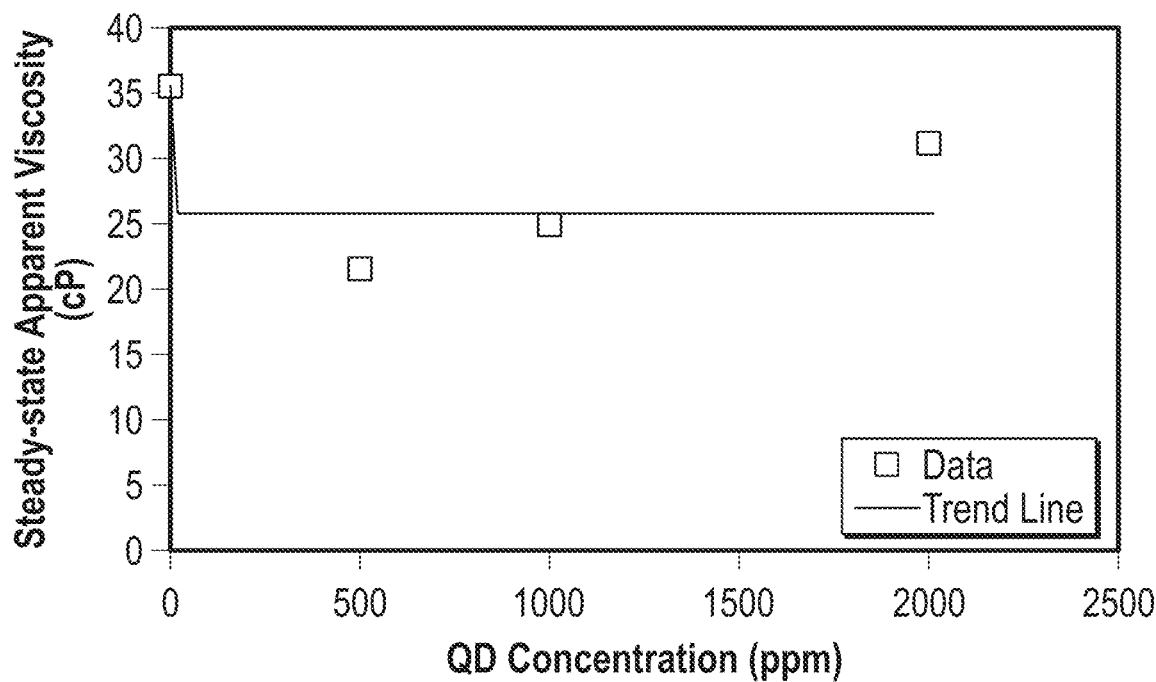
FIG. 22B shows the steady-state apparent viscosities for foam generated using varying QD concentrations in a water-wet system.
Figure 23A:
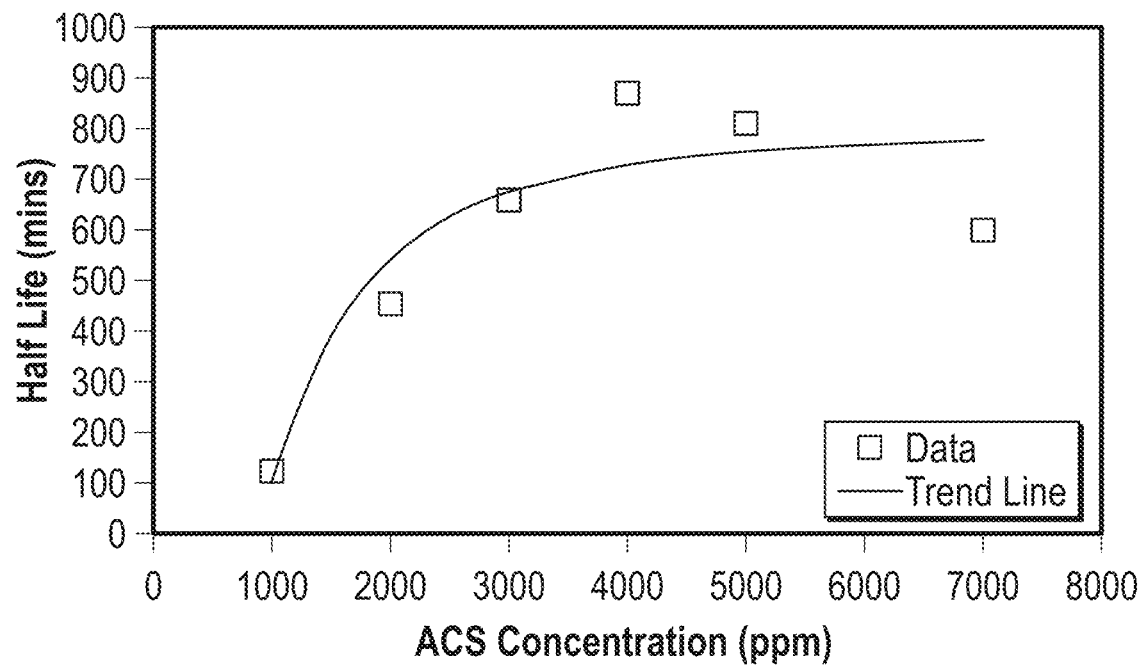
FIG. 23A shows the half-lives for foam generated using varying surfactant (ACS) concentrations in a water-wet system.
Figure 23B:
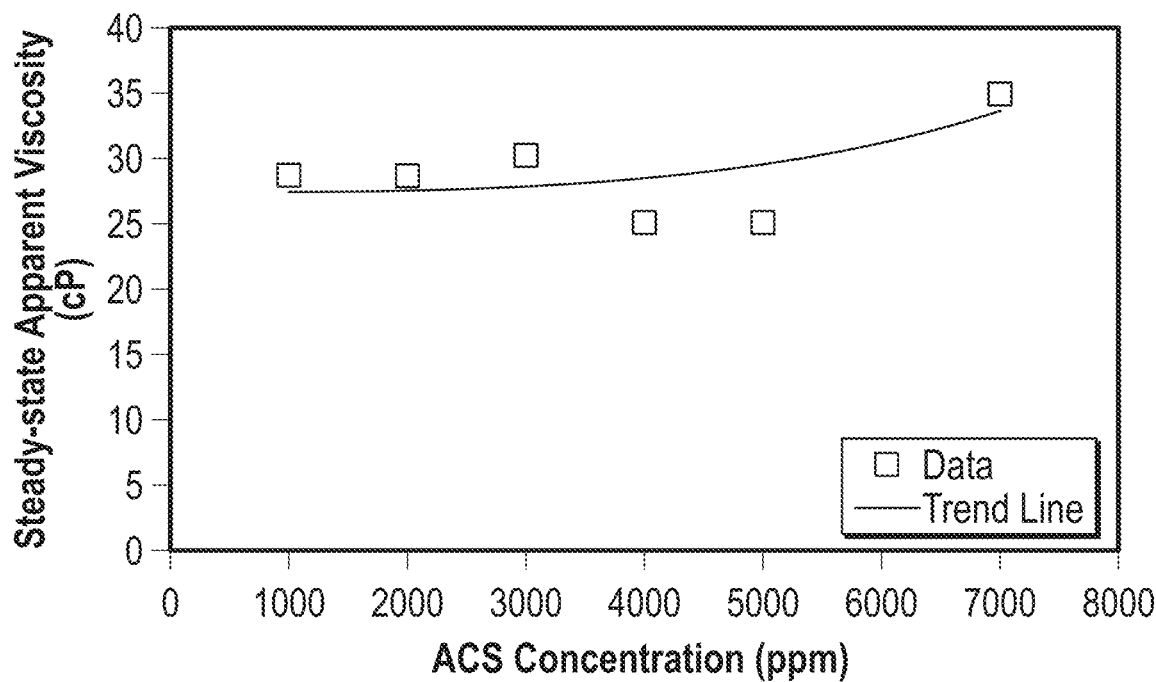
FIG. 23B shows the steady-state apparent viscosities for foam generated using varying surfactant (ACS) concentrations in a water-wet system.
Figure 24A:
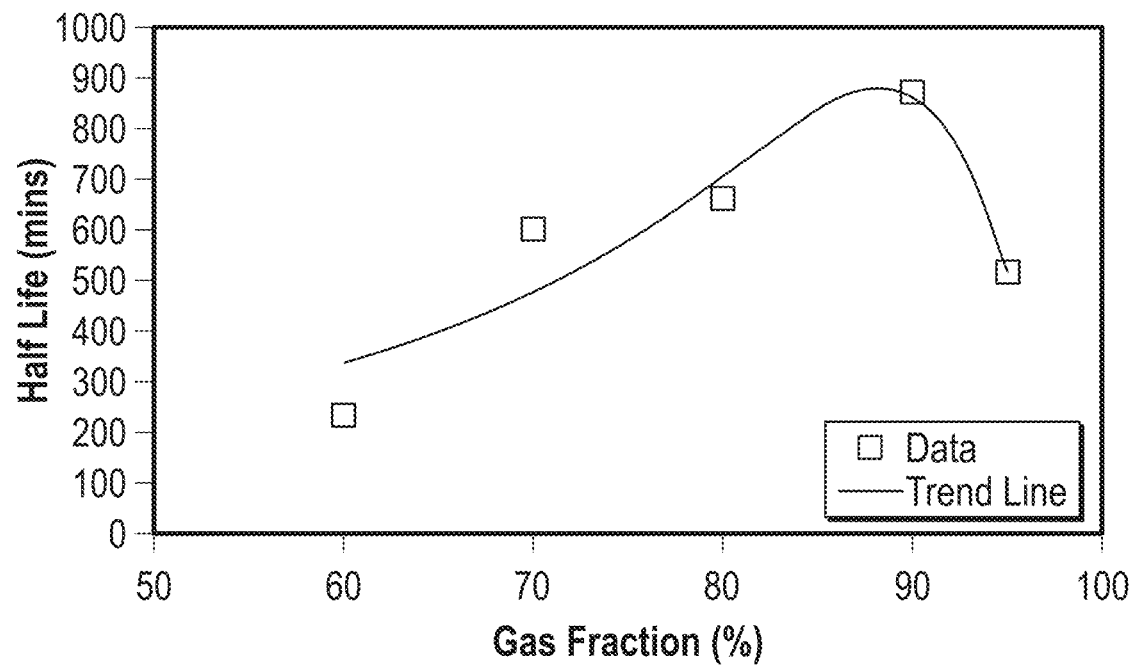
FIG. 24A shows the half-lives for foam generated using varying gas fractions in a water-wet system.
Figure 24B:
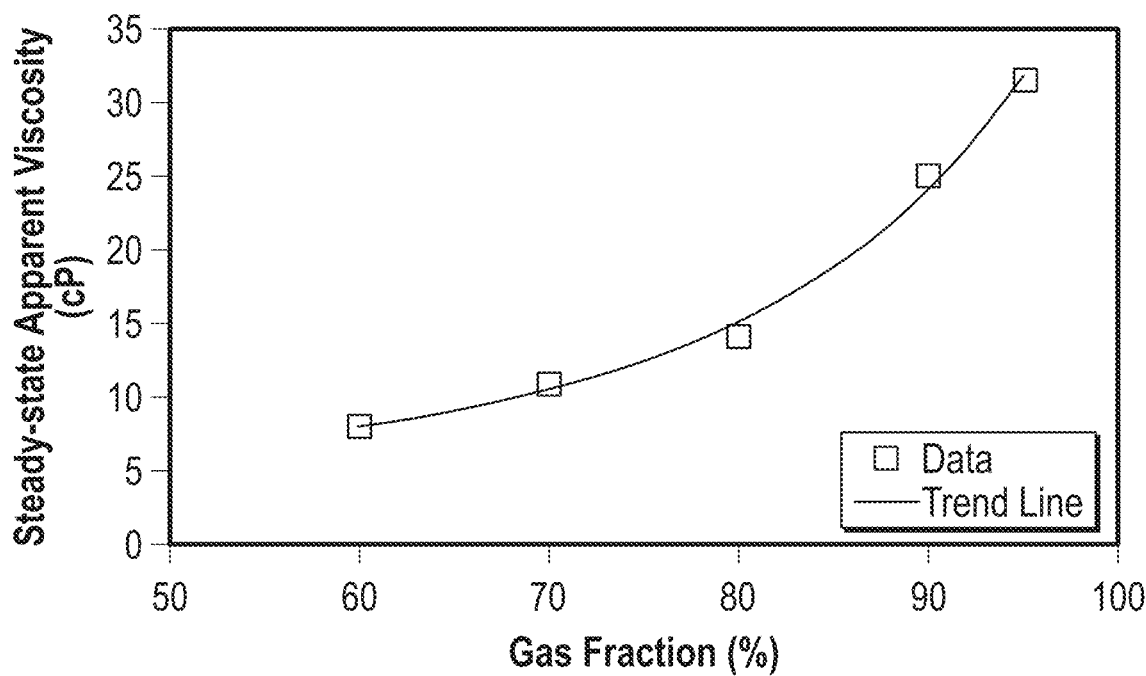
FIG. 24B shows the steady-state apparent viscosities for foam generated using varying gas fractions in a water-wet system.
Figure 25A:
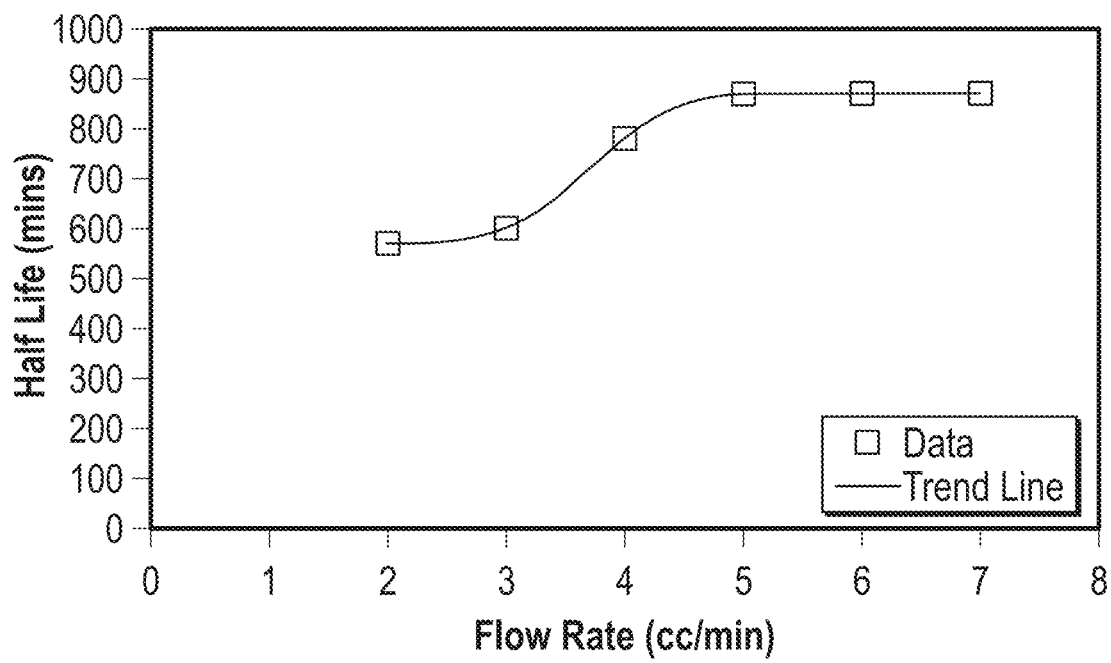
FIG. 25A shows the half-lives for foam generated using varying flow rates in a water-wet system.
Figure 25B:
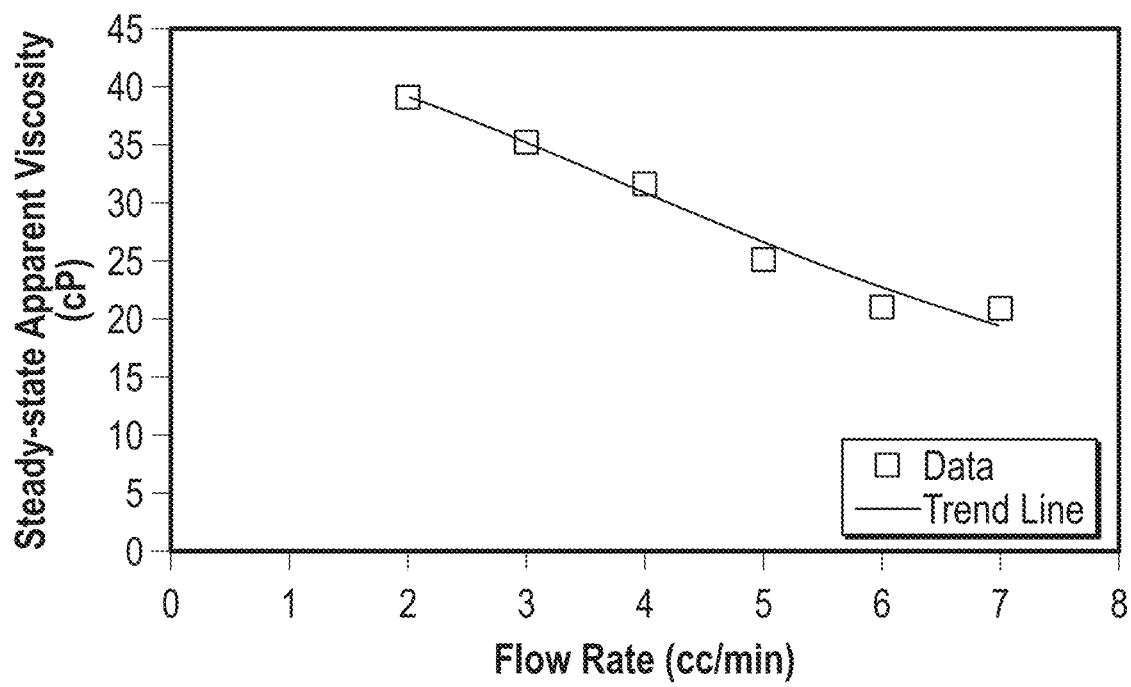
FIG. 25B shows the steady-state apparent viscosities for foam generated using varying flow rates in a water-wet system.
Figure 26A:
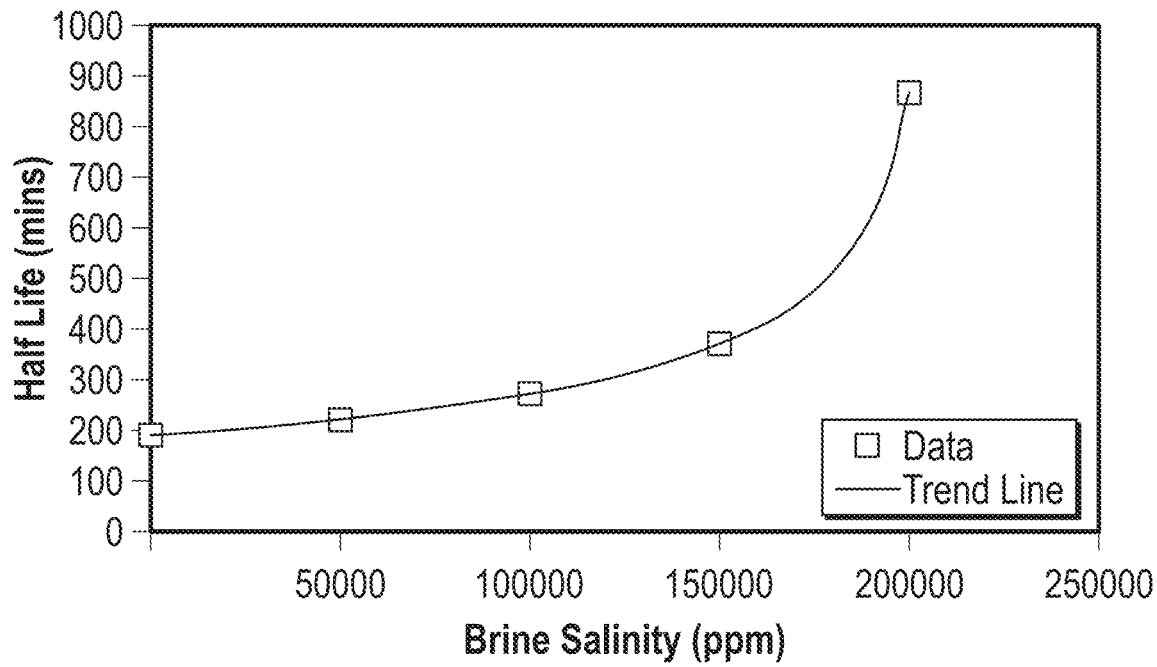
FIG. 26A shows the half-lives for foam generated using varying brine salinities in a water-wet system.
Figure 26B:
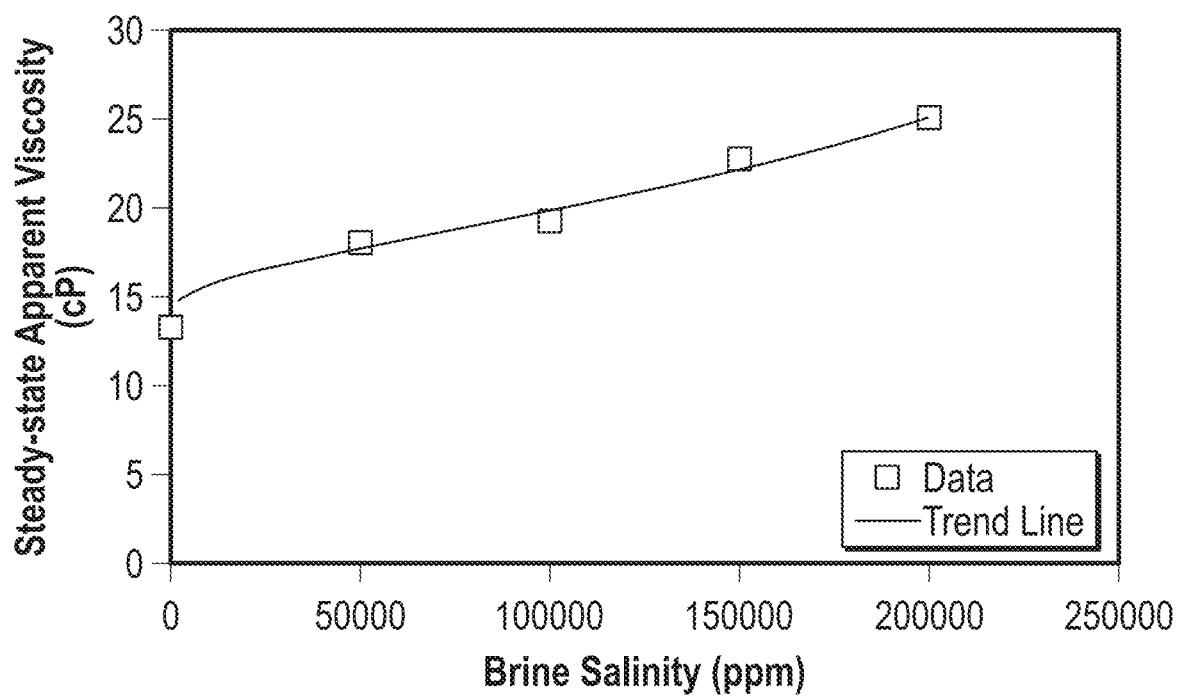
FIG. 26B shows the steady-state apparent viscosities for foam generated using varying brine salinities in a water-wet system.

The half-life represents the stability of the foam, and the apparent viscosity is a measure of the strength of the foam in porous media. The foam formed by pure surfactant can collapse quickly, leading to a low half-life. The addition of the QD can improve the stability of the foam by adsorbing at the gas-water interface, thus preventing foam coalescence and reducing the drainage of the aqueous phase. As seen in FIG. 21, the foam bubbles formed by the surfactant are large with a polyhedral shape and a thin lamella. On the other hand, the nanofluid bubbles are smaller with a thick, uniformly shaped lamella. In a water-wet system, the addition of the QD to the surfactant may increase the half-lives of the foam as compared to the pure surfactant, as seen in FIG. 22A. The addition of QD to surfactant helps to create a layer of QD at the lamella, thus preventing the adjacent gas bubbles from coalescing. However, the apparent viscosity of the surfactant foam was higher than the nanofluid (FIG. 21B). In other embodiments, the apparent viscosity of the surfactant foam may be matched to the QD nanofluid via the addition of more QD. When the surfactant concentration was increased from 1000 ppm, the half-life initially increased up to 4000 ppm and then decreased, as shown in FIG. 23A. The apparent viscosity, on the other hand, did not indicate any clear trend with regard to changes in surfactant concentration (FIG. 23B). In addition, the ratio of gas to the aqueous phase (the gas fraction) also affected the quality of the foam. As the gas fraction was increased from 60%, the foam half and apparent viscosities also increased up to 90% gas quality (FIG. 24). At 95% gas fraction, the foam formed was unstable with rapid foam production and collapse cycles. This leads to poor quality foam. When the flow rate of fluid injection was varied, the foam half-life increased up to 5 cc/min and then plateaued (FIG. 25A), whereas the apparent viscosities decreased with increasing flow rates (FIG. 25B). The variation in brine salinity led to increase in both half-lives and steady-state apparent viscosities with an increase in brine salinity (FIGS. 26 A & B). The presence of oil in the porous media can adversely affect the foam quality and stability.

Figure 27A:
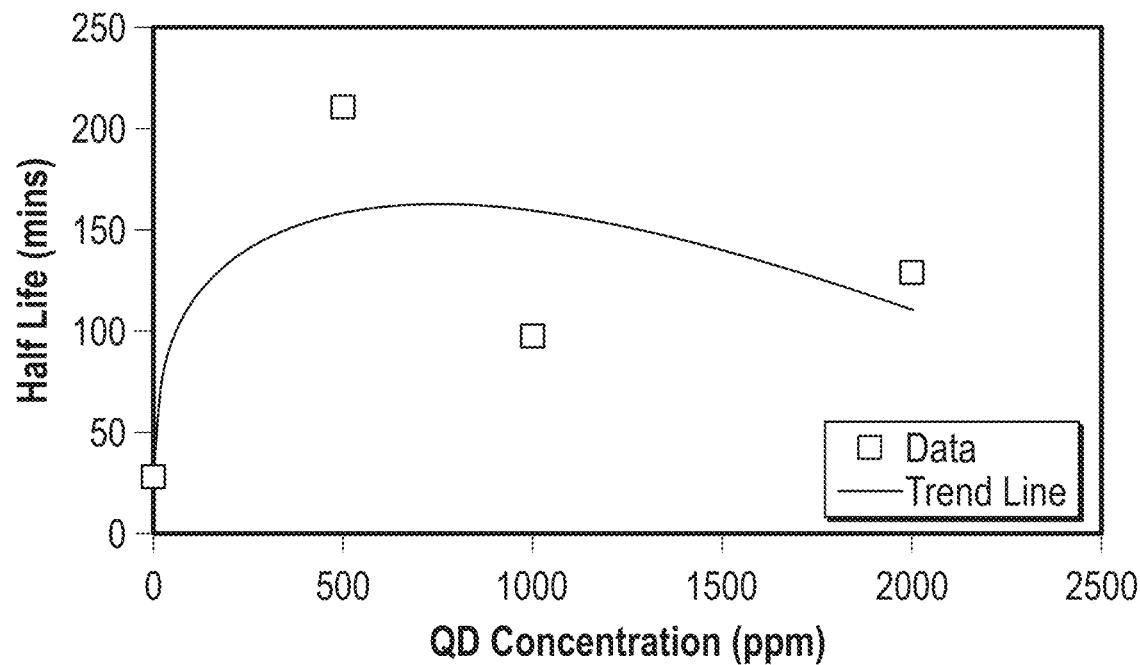
FIG. 27A shows the half-lives for foam generated using varying QD concentrations in an oil-wet system.
Figure 27B:
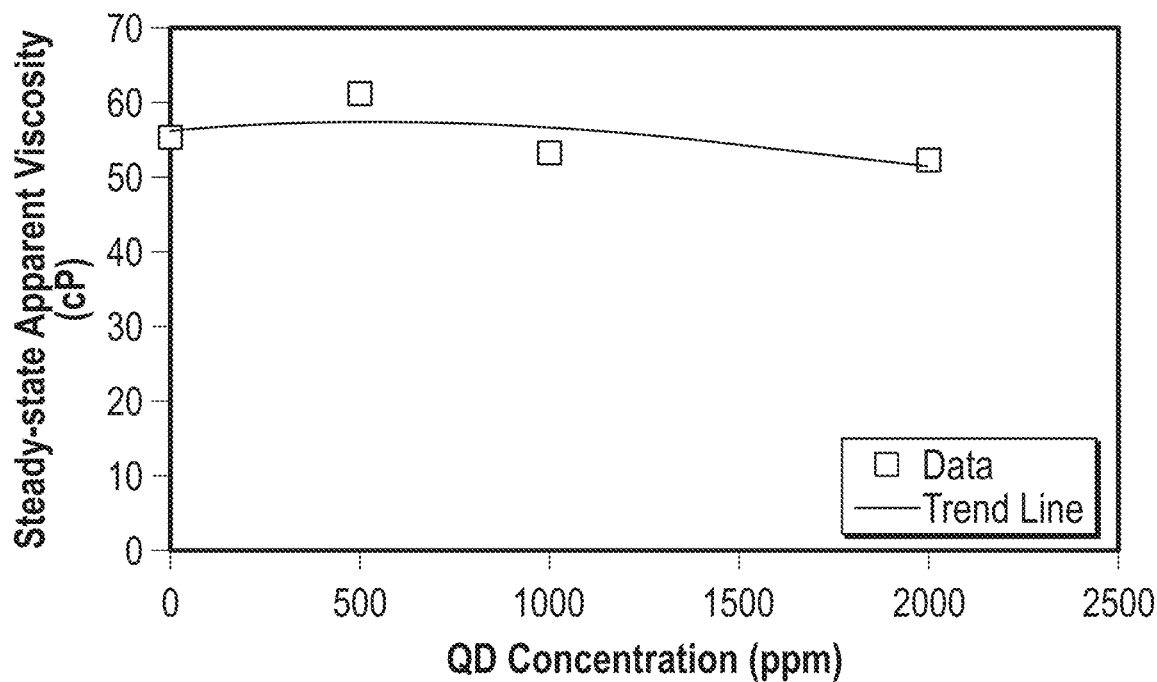
FIG. 27B shows the steady-state apparent viscosities for foam generated using varying QD concentrations in an oil-wet system.
Figure 28A:
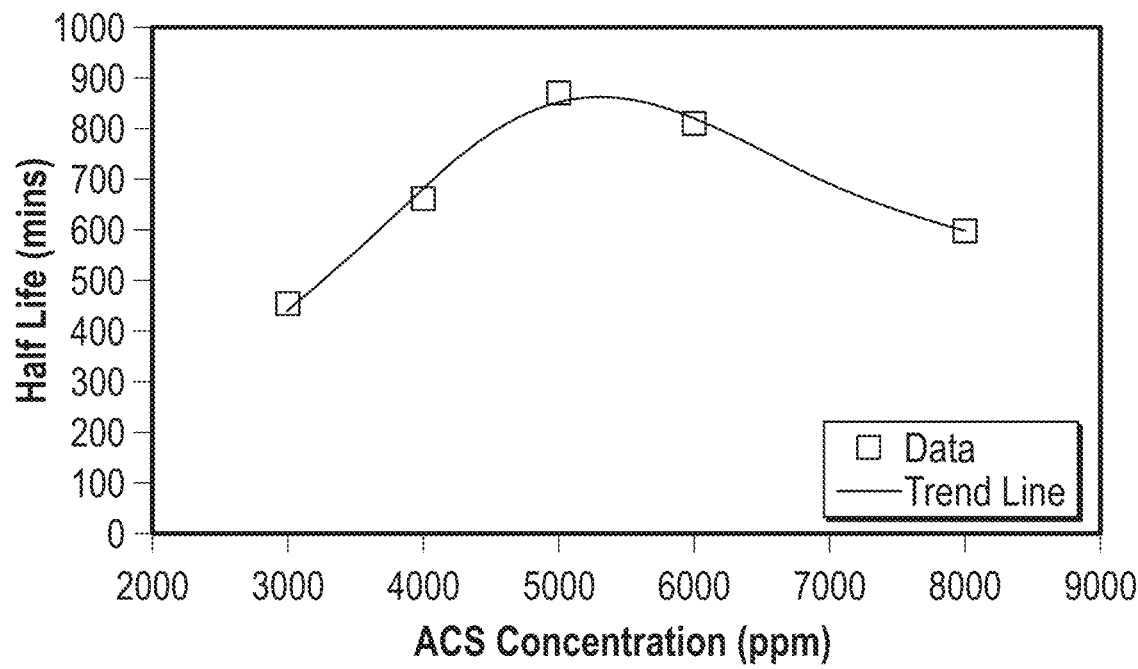
FIG. 28A shows the half-lives for foam generated using varying surfactant (ACS) concentrations in an oil-wet system.
Figure 28B:
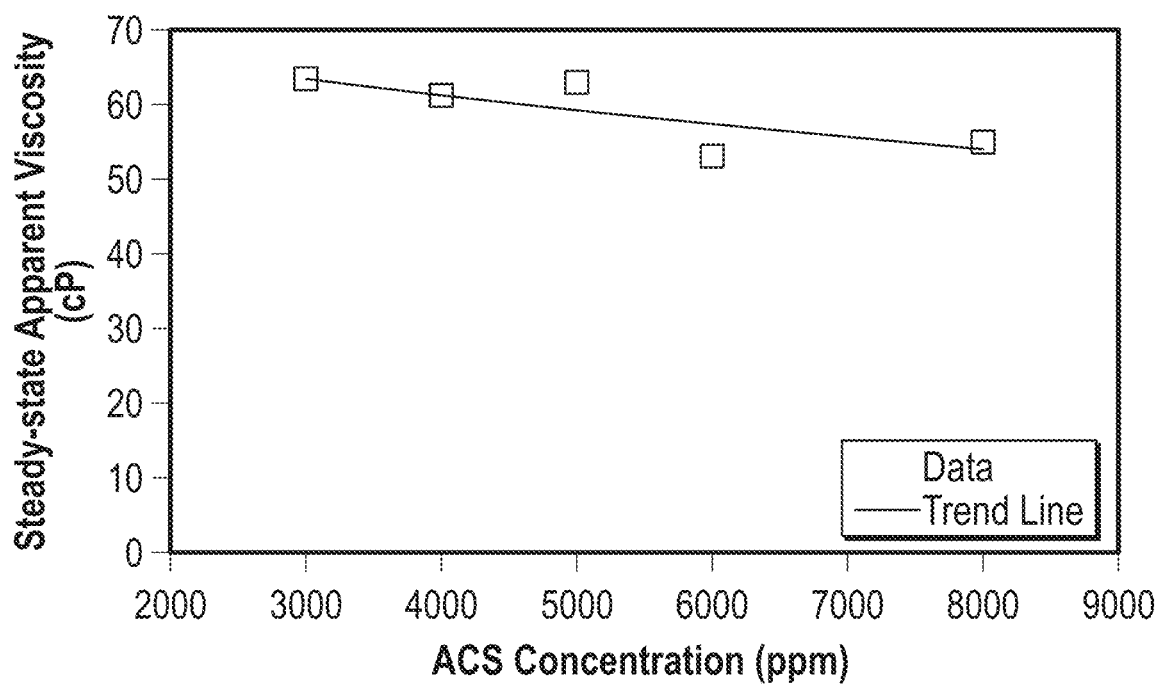
FIG. 28B shows the steady-state apparent viscosities for foam generated using varying surfactant (ACS) concentrations in an oil-wet system.
Figure 29A:
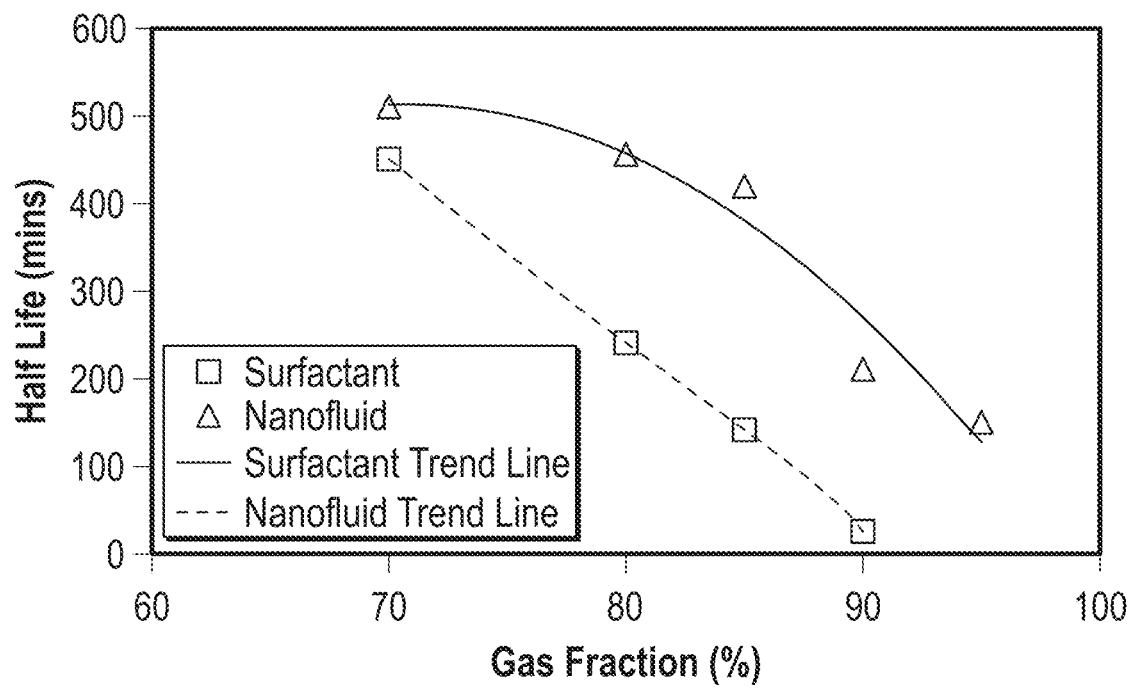
FIG. 29A shows the half-lives for foam generated using varying gas fractions in an oil-wet system.
Figure 29B:
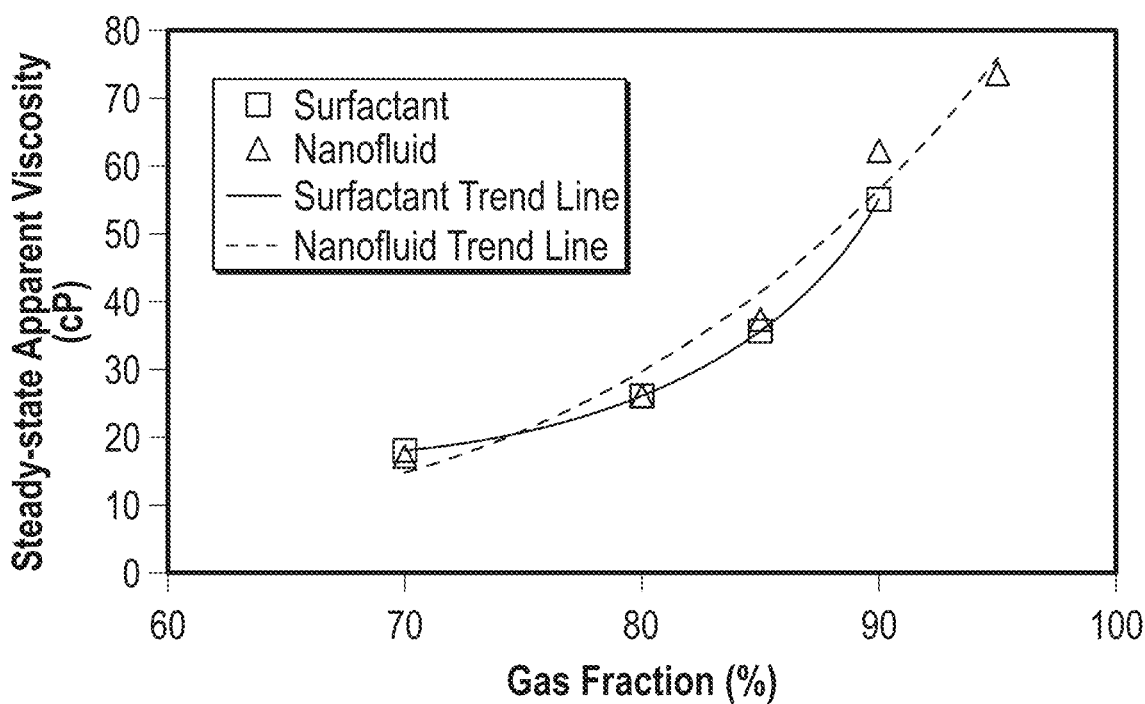
FIG. 29B shows the steady-state apparent viscosities for foam generated using varying gas fractions in an oil-wet system.
Figure 30A:
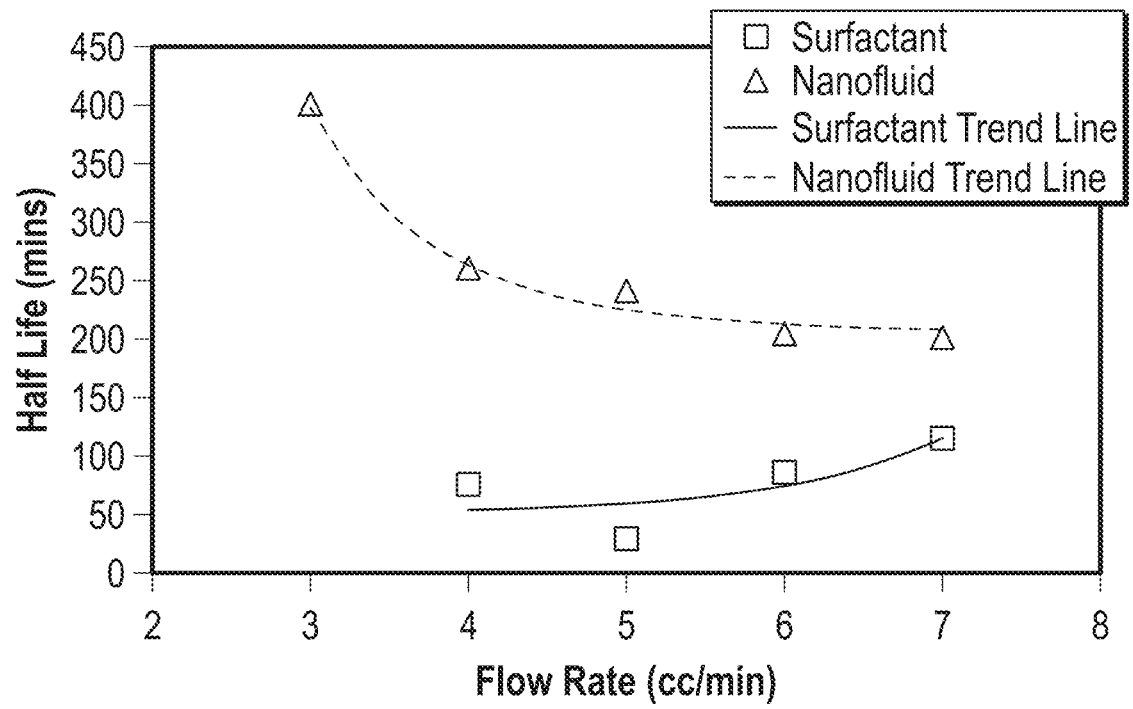
FIG. 30A shows the half-lives for foam generated using varying flow rates in an oil-wet system.
Figure 30B:
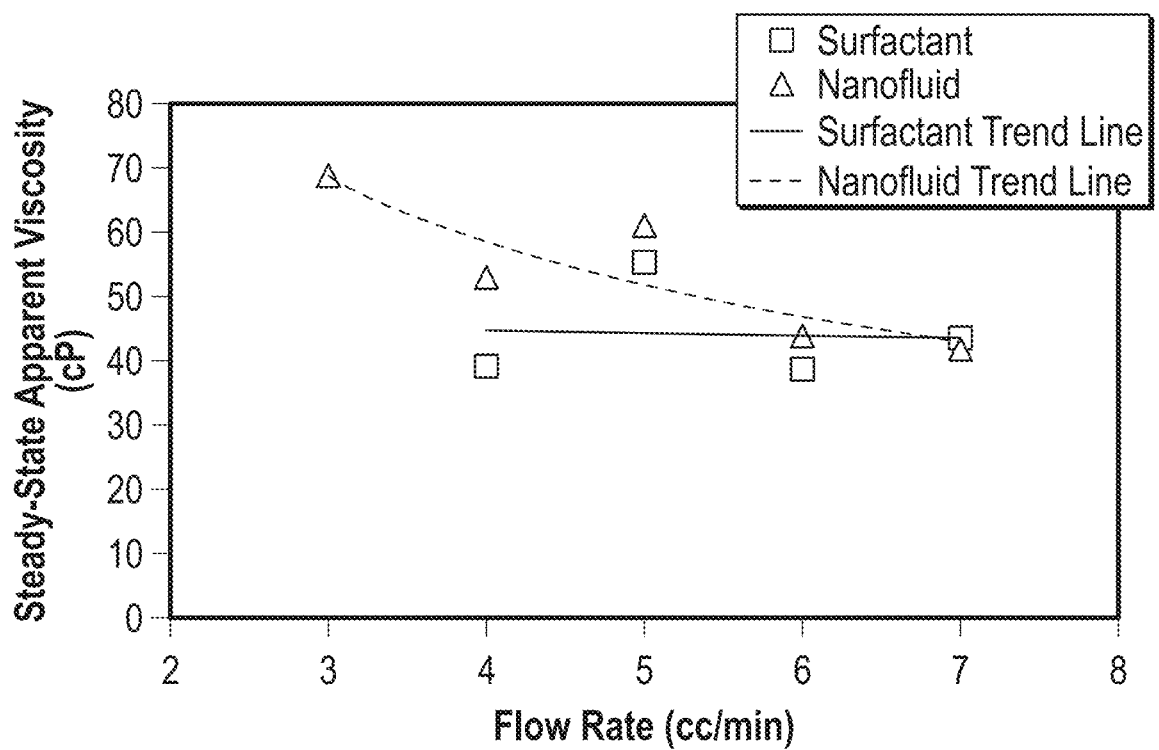
FIG. 30B shows the steady-state apparent viscosities for foam generated using varying flow rates in an oil-wet system.
Figure 31A:
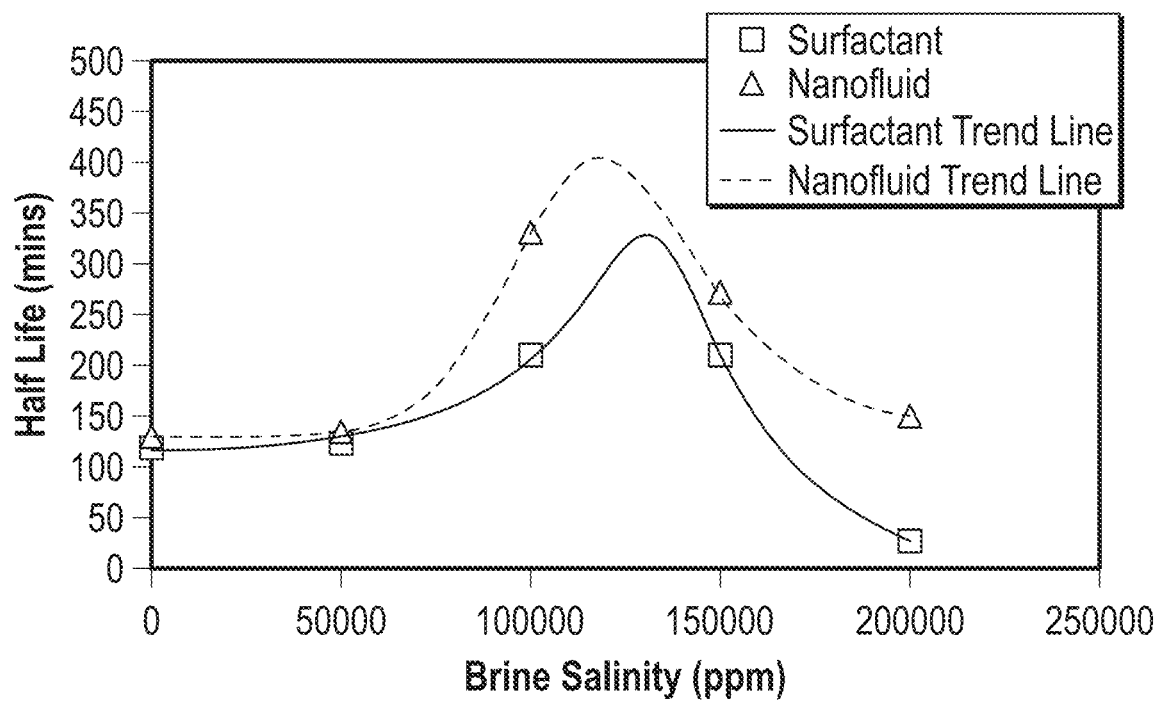
FIG. 31A shows the half-lives for foam generated using varying brine salinities in an oil-wet system.
Figure 31B:
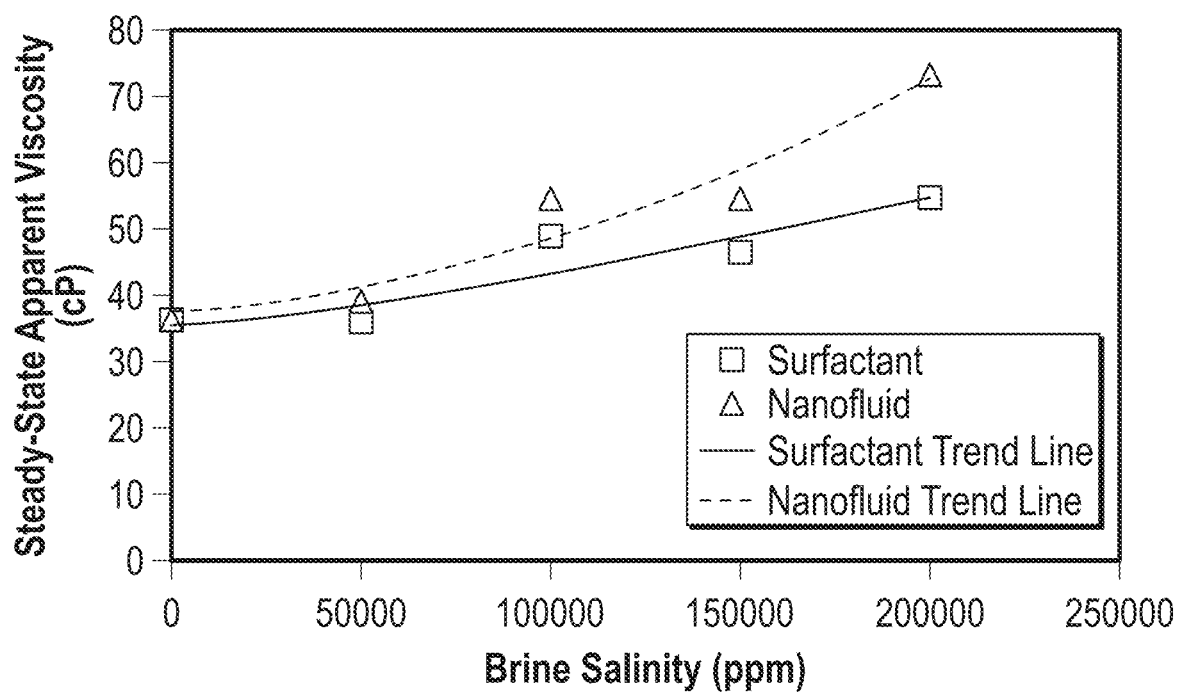
FIG. 31B shows the steady-state apparent viscosities for foam generated using varying brine salinites in an oil-wet system.

To assess the impact of oil on the foam, the foam half-life and foam apparent viscosities were measured in oil-wet systems. In the case of oil-wet conditions, the addition of QD to the surfactant increased the half-life at least more than 3 times (FIG. 27A). In particular, 500 ppm QD increased the half-life by more than 7 times than that of the surfactant itself. This shows that the ability of the QD to stabilize foam bubbles and prevent them from coalescing is more pronounced in oil-wet conditions. Also, the 500 ppm QD was able to exceed the apparent viscosity of the base surfactant (FIG. 27B). When the surfactant concentration was varied, concentrations below 3000 ppm did not generate any foam. The half-life of the foam was highest for 5000 ppm surfactant concentration, and it dropped at higher concentrations (FIG. 28A). On the other hand, the apparent viscosities were almost constant for concentrations from 3000-5000 ppm at a value of about 62 cP and then dropped with an increase in concentration (FIG. 28B). When the gas fraction was increased from 70% to 95%, the half-life of the foam for both surfactant and nanofluid decreased linearly (FIG. 29A). This is due to the fact that at higher gas fractions, the foam consists of lower active material in the aqueous solution. On the contrary, the increase in gas fraction generated stronger foam leading to higher apparent foam viscosities (FIG. 29B). The half-life of the foam initially decreased for the nanofluid while it increased for the surfactant with an increase in total injection flow rate and then stabilized (FIG. 30A). The steady-state apparent viscosity was constant for surfactant while it decreased for the nanofluid with an increase in the total injection rate (FIG. 30B). In the case of brine salinity sensitivity, the foam half-life initially increased and then decreased with an increase in brine salinity, as seen in FIG. 31A. The steady-state apparent viscosity of the foam showed an overall increase with an increase in brine salinity (FIG. 31B).

Figure 32B:
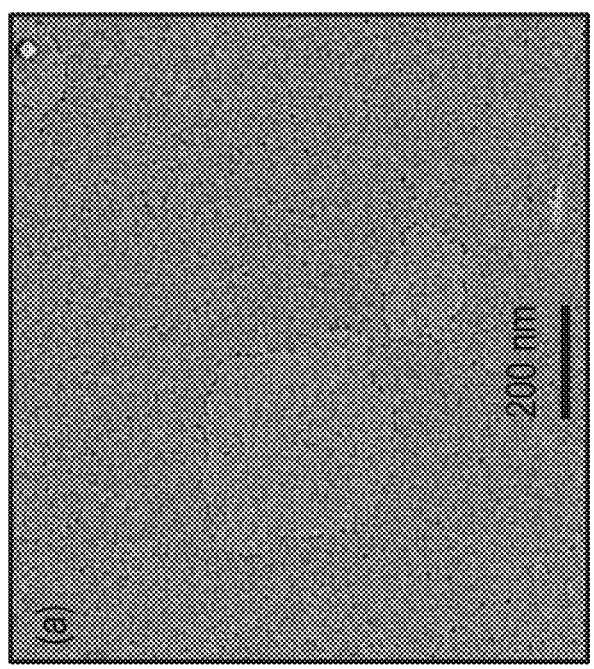
FIG. 32B shows a TEM micrograph for an emulsion of surfactant with oil.
Figure 32A:
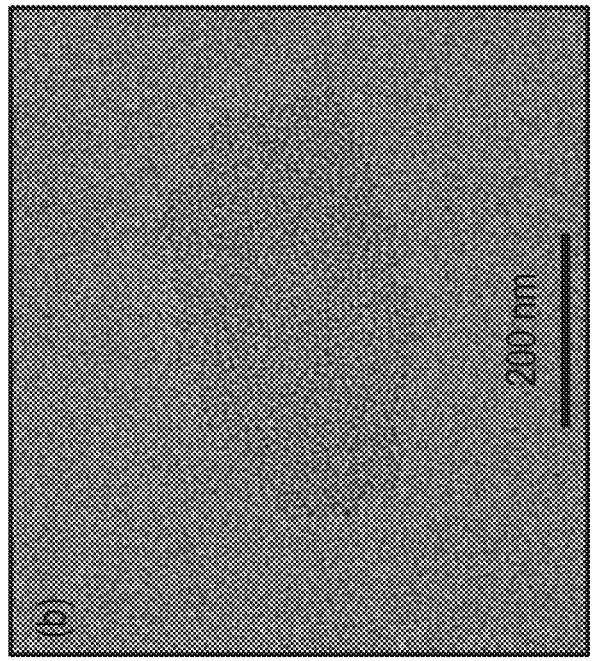
FIG. 32A shows a TEM micrograph for an emulsion of oil with surfactant and QD.
Figure 33:
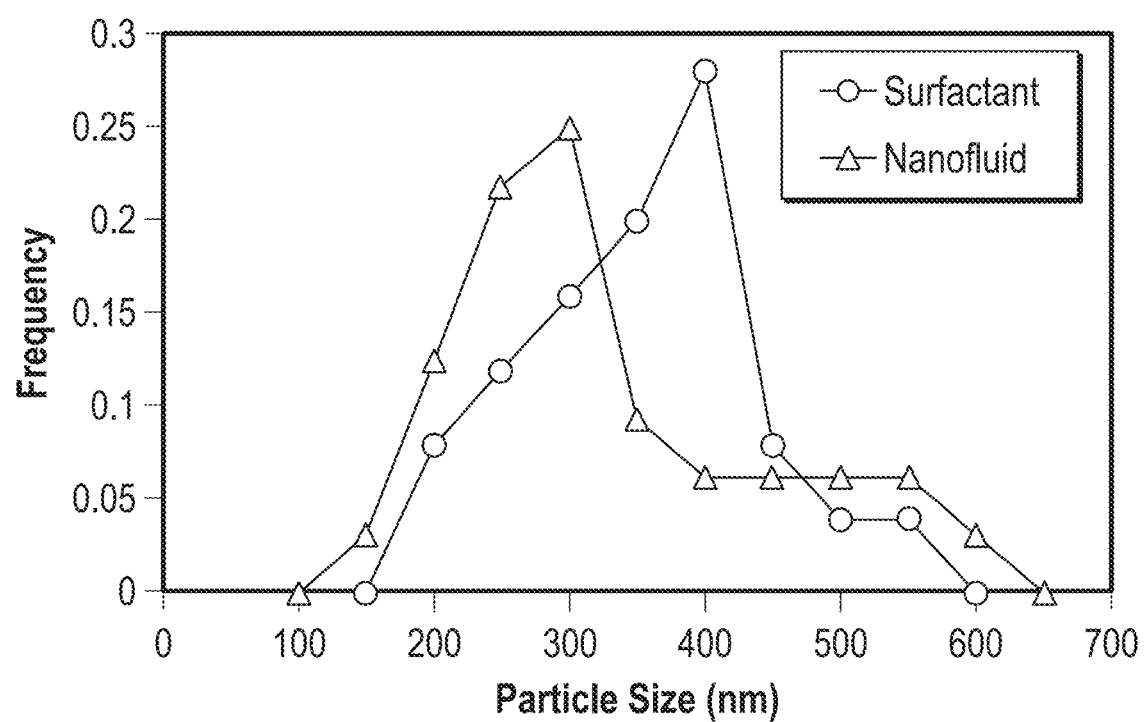
FIG. 33 shows the size distribution of particles in an emulsion of surfactant with oil compared with particles in an emulsion of surfactant with oil and QD.
Figure 34C:
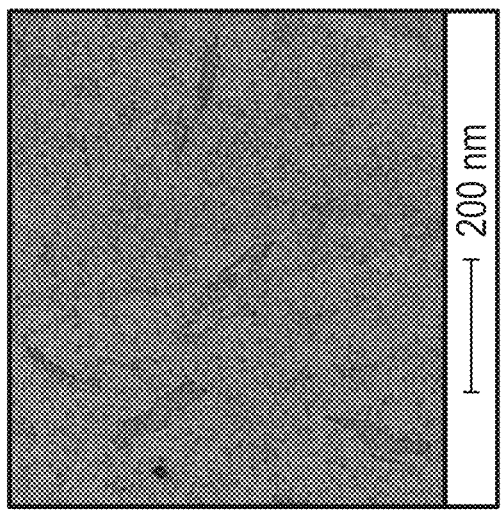
FIG. 34C is a TEM micrograph illustrating peapod-like structures in surfactant and QD.
Figure 34B:
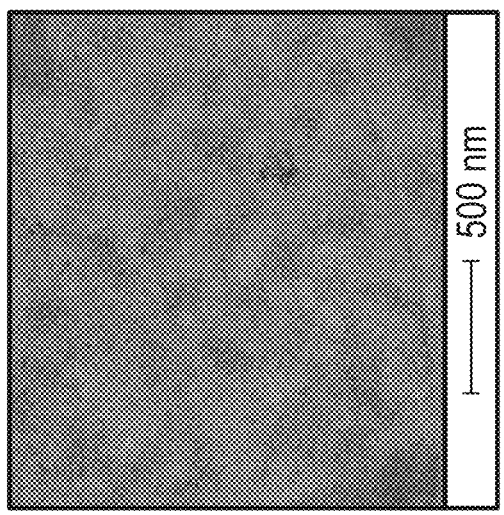
FIG. 34B is a TEM micrograph illustrating spherical micelle structures in surfactant+QD.
Figure 34A:
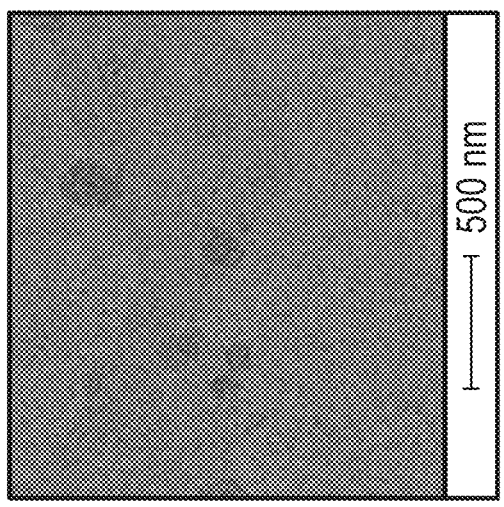
FIG. 34A is a TEM micrograph illustrating spherical micelle structures in pure surfactant and water.
Figure 34E:
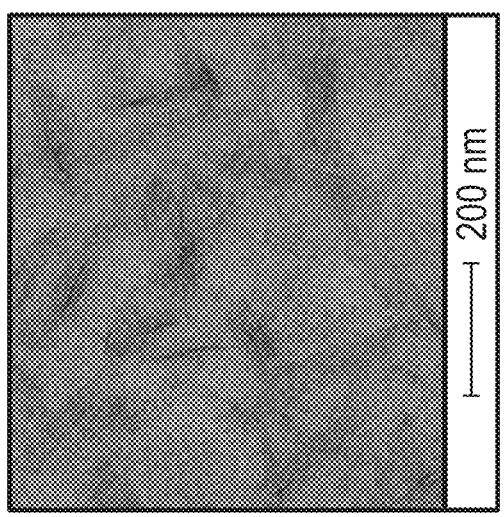
FIG. 34E is a TEM micrograph illustrating eyebrow-like structures in surfactant, oil, and QD.
Figure 34D:
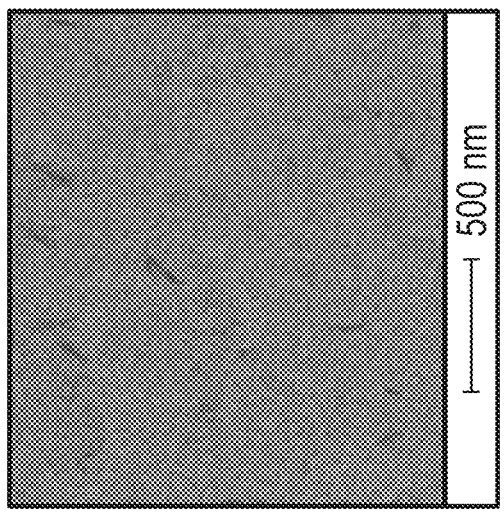
FIG. 34D is a TEM micrograph illustrating eyebrow-like structures in surfactant and oil.

FIGS. 32A-B show the TEM micrographs for the emulsions formed by the surfactant and surfactant-nanofluid formulation with oil (non-aqueous phase). The emulsions formed by the surfactant itself are oval-shaped (FIG. 32A). In the case of the nanofluid, the emulsions are spherical, with the QDs forming a ring around the edges of the emulsion (FIG. 32B). The existence of the QDs ring at the interface verifies their high interfacial activity at the oil/water interface. In addition, the absence of QDs in the center of the oil droplet and the presence of nanofluid all over the water phase are also strong evidence of the fact that the nanofluid comprises hydrophilic nanoparticles with high interfacial activity. FIG. 33 shows the size distribution of the emulsions formed using both the surfactant and the formulation. Thus, the addition of nanofluid decreased the oil droplet size in the emulsion, thereby increasing the emulsion stability.

Figure 35A:
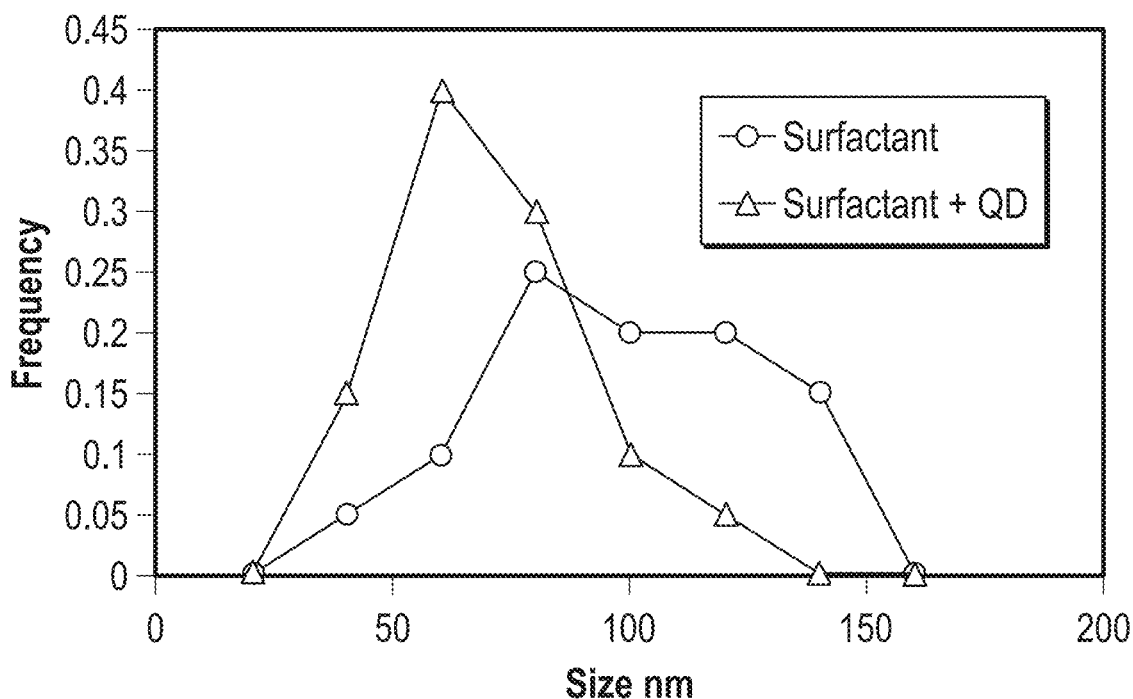
FIG. 35A shows the size distribution of spherical micelles.
Figure 35B:
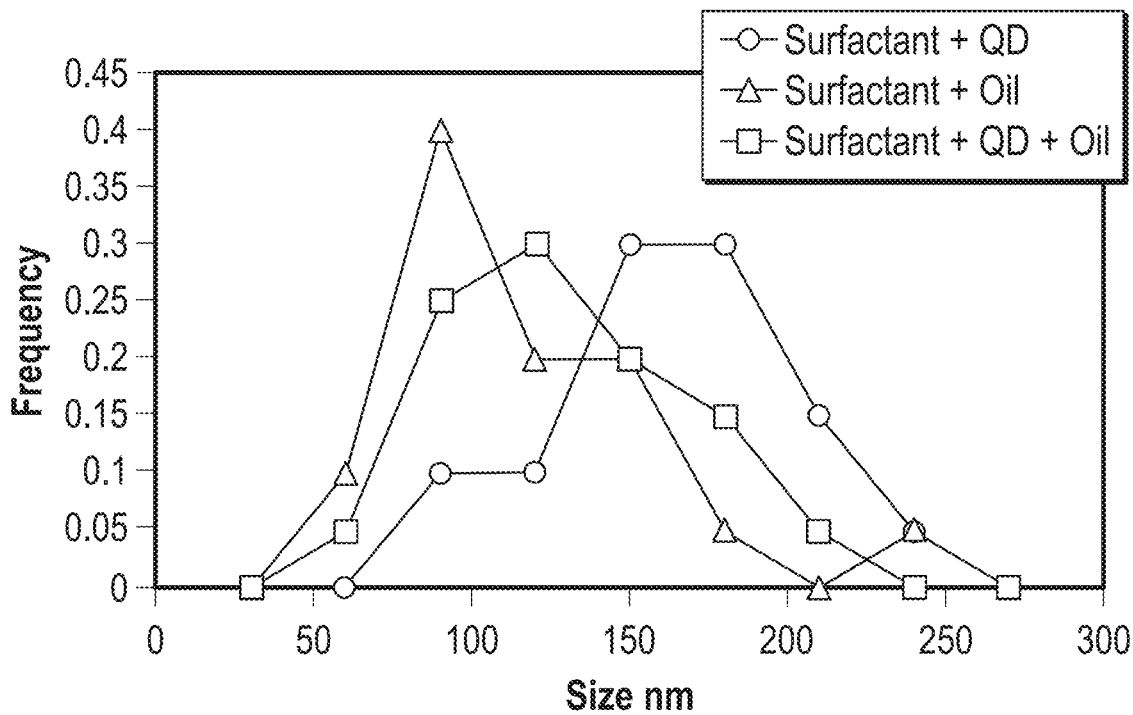
FIG. 35B shows the size distribution of peapod-like micelles.
Figure 36B:
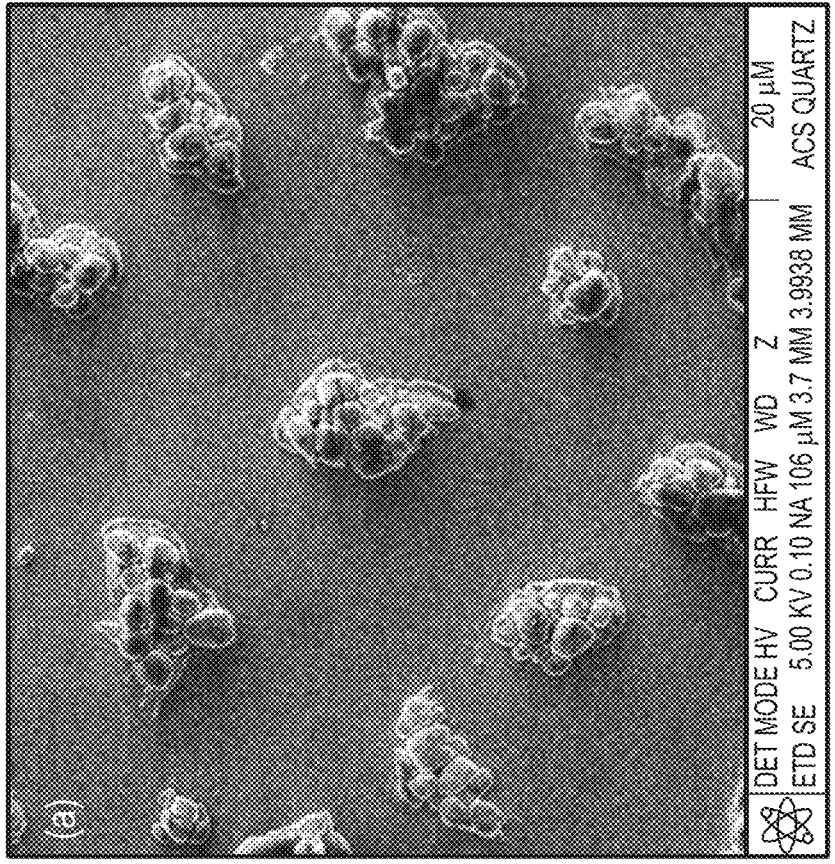
FIG. 36B shows the adsorption of nanofluid on silica surface. The spherical aggregates represent surfactant micelles.
Figure 36A:
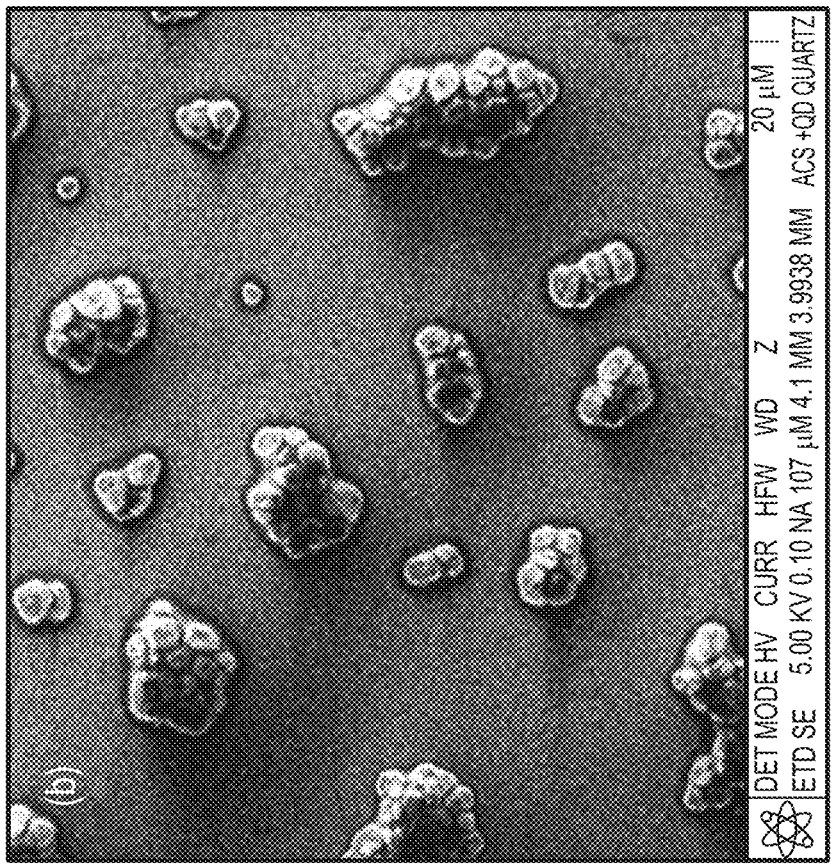
FIG. 36A shows the adsorption of surfactant on silica surface. The spherical aggregates represent surfactant micelles.

The TEM micrographs of the surfactant micelles under different conditions are presented in FIG. 34, and the size distribution of these micelles are shown in FIG. 35. Two types of micelle structures are recognized: the spherical type and the peapod-like shape. The spherical type of micelle structures was found in the pure surfactant solution and the surfactant with QD dispersion, while the peapod-like structures were found in surfactant with QD, surfactant with oil, and surfactant with oil and QD. For the spherical structures, the addition of QD reduced their average size from 83 nm to 58 nm. For the peapod-like type of structures, the largest micelles size was found in QD with oil emulsion, followed by surfactant and oil with QD, and surfactant with oil. The micelle size decrease after adding nanofluid might be caused by the hydrophilic nature and the negative surface charge of nanofluid. The decrease of peapod-shaped micelle size after adding oil might be due to the transport of surfactant molecules to the oil/water interface, which decreased the available amount of surfactant molecules in the water phase for possible micelle assembling.

While the examples above employed AMPHOSOL CS-50 as the surfactant, it will be appreciated that the quantum dot nanoparticles of the present disclosure could be added to any gas foaming surfactant in brine in order to stabilize the resulting foam.

STATEMENTS REGARDING INCORPORATION BY REFERENCE AND VARIATIONS

All references throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the disclosure claimed. Thus, it should be understood that although the present disclosure has been specifically disclosed by preferred embodiments, exemplary embodiments and optional features, modification and variation of the concepts herein disclosed may be resorted to by those skilled in the art, and that such modifications and variations are considered to be within the scope of this disclosure as defined by the appended claims. The specific embodiments provided herein are examples of useful embodiments of the present disclosure and it will be apparent to one skilled in the art that the present disclosure may be carried out using a large number of variations of the devices, device components, methods steps set forth in the present description. As will be obvious to one of skill in the art, methods and devices useful for the present methods can include a large number of optional composition and processing elements and steps.

As used herein and in the appended claims, the singular forms "a", "an", and "the" include plural reference unless the context clearly dictates otherwise. Thus, for example, reference to "a cell" includes a plurality of such cells and equivalents thereof known to those skilled in the art. As well, the terms "a" (or "an"), "one or more" and "at least one" can be used interchangeably herein. It is also to be noted that the terms "comprising", "including", and "having" can be used interchangeably. The expression "of any of claims XX-YY" (wherein XX and YY refer to claim numbers) is intended to provide a multiple dependent claim in the alternative form, and in some embodiments is interchangeable with the expression "as in any one of claims XX-YY."

When a group of substituents is disclosed herein, it is understood that all individual members of that group and all subgroups, including any isomers, enantiomers, and diastereomers of the group members, are disclosed separately. When a Markush group or other grouping is used herein, all individual members of the group and all combinations and subcombinations possible of the group are intended to be individually included in the disclosure. When a compound is described herein such that a particular isomer, enantiomer or diastereomer of the compound is not specified, for example, in a formula or in a chemical name, that description is intended to include each isomers and enantiomer of the compound described individual or in any combination. Additionally, unless otherwise specified, all isotopic variants of compounds disclosed herein are intended to be encompassed by the disclosure. For example, it will be understood that any one or more hydrogens in a molecule disclosed can be replaced with deuterium or tritium. Isotopic variants of a molecule are generally useful as standards in assays for the molecule and in chemical and biological research related to the molecule or its use. Methods for making such isotopic variants are known in the art. Specific names of compounds are intended to be exemplary, as it is known that one of ordinary skill in the art can name the same compounds differently.

Certain molecules disclosed herein may contain one or more ionizable groups [groups from which a proton can be removed (e.g., —COOH) or added (e.g., amines) or which can be quaternized (e.g., amines)]. All possible ionic forms of such molecules and salts thereof are intended to be included individually in the disclosure herein. With regard to salts of the compounds herein, one of ordinary skill in the art can select from among a wide variety of available counterions those that are appropriate for preparation of salts of this disclosure for a given application. In specific applications, the selection of a given anion or cation for preparation of a salt may result in increased or decreased solubility of that salt.

Every device, system, formulation, combination of components, or method described or exemplified herein can be used to practice the disclosure, unless otherwise stated.

Whenever a range is given in the specification, for example, a temperature range, a time range, or a composition or concentration range, all intermediate ranges and subranges, as well as all individual values included in the ranges given are intended to be included in the disclosure. It will be understood that any subranges or individual values in a range or subrange that are included in the description herein can be excluded from the claims herein.

One of ordinary skill in the art will appreciate that starting materials, biological materials, reagents, synthetic methods, purification methods, analytical methods, assay methods, and biological methods other than those specifically exemplified can be employed in the practice of the disclosure without resort to undue experimentation. All art-known functional equivalents, of any such materials and methods are intended to be included in this disclosure. The terms and expressions which have been employed are used as terms of description and not of limitation, and there is no intention that in the use of such terms and expressions of excluding any equivalents of the features shown and described or portions thereof, but it is recognized that various modifications are possible within the scope of the disclosure claimed. Thus, it should be understood that although the present disclosure has been specifically disclosed by preferred embodiments and optional features, modification and variation of the concepts herein disclosed may be resorted to by those skilled in the art, and that such modifications and variations are considered to be within the scope of this disclosure as defined by the appended claims.

We claim:

1. A method for recovery of oil, the method comprising:
forming a stabilized foam comprising:
an aqueous nanofluid comprising graphene quantum dot nanoparticles adapted to stabilize the foam, the graphene quantum dot nanoparticles comprising non-functionalized hydrophilic graphene quantum dot nanoparticles and amphiphilic graphene quantum dot nanoparticles, the graphene quantum dot nanoparticles derived from coal, coal by-products, or graphite; and
a dispersion of gas bubbles in a surfactant, the stabilized foam having a gas fraction of about 70% to about 90%;
contacting a porous medium with the stabilized foam;
in response to the contacting the porous medium with the aqueous nanofluid, mobilizing oil from the porous medium via the graphene quantum dot nanoparticles and forming a dispersion comprising the oil and the foam; and
collecting at least some of the dispersion.

2. The method of claim 1, wherein each amphiphilic graphene quantum dot nanoparticle of the amphiphilic graphene quantum dot nanoparticles comprises at least one hydrophobic functional group.

3. The method of claim 2, wherein the at least one hydrophobic functional group comprises a hydrocarbon chain.

4. The method of claim 3, wherein the hydrocarbon chain has 3 to 30 carbons.

5. The method of claim 2, wherein the at least one hydrophobic functional group comprises an alkylamine.

6. The method of claim 2, wherein:
the non-functionalized hydrophilic graphene quantum dot nanoparticles and the amphiphilic graphene quantum dot nanoparticles have a specific surface area of about 10,000 $m^2/g$ to about 40,000 $m^2/g$; and
wherein the non-functionalized hydrophilic graphene quantum dot nanoparticles and the amphiphilic graphene quantum dot nanoparticles have a molecular weight of from about 700 amu to about 900 amu.

7. The method of claim 2, wherein at least 90% of the non-functionalized hydrophilic graphene quantum dot nanoparticles and the amphiphilic graphene quantum dot nanoparticles have a diameter between about 1.5 nm and about 5.5 nm.

8. The method claim 2, wherein the aqueous nanofluid contains from about 0.001 wt % to about 10 wt % of the non-functionalized hydrophilic graphene quantum dot nanoparticles and the amphiphilic graphene quantum dot nanoparticles.

9. The method of claim 1, wherein the surfactant comprises an amphoteric surfactant.

10. The method of claim 1, wherein:
the forming the dispersion comprises creating a closely-packed interfacial layer around each of a plurality of oil droplets, wherein each closely-packed interfacial layer comprises the non-functionalized hydrophilic graphene quantum dot nanoparticles interspersed with the amphiphilic graphene quantum dot nanoparticles.

11. The method of claim 10, wherein the graphene quantum dot nanoparticles in the aqueous nanofluid comprise:
20 to 80 wt % of the non-functionalized hydrophilic graphene quantum dot nanoparticles; and
20 to 80 wt % of the amphiphilic graphene quantum dot nanoparticles.

12. The method of claim 1, further comprising: modifying a wettability of the porous medium in response to the contacting the porous medium with the stabilized foam.

13. The method of claim 1, wherein the contacting the porous medium with the stabilized foam comprises flowing the stabilized foam through the porous medium.

14. The method of claim 1, further comprising mobilizing oil through pores and throats of the porous medium via reduction of interfacial tension between the oil and the aqueous nanofluid.

15. The method of claim 1, further comprising altering a wettability of surfaces of the porous medium from oil-wet to mixed wet or water-wet in response to the contacting the porous medium with the stabilized foam.

16. The method of claim 1, wherein the porous medium contacted with the stabilized foam is a silicate-rich rock or a carbonate-rich rock.

17. The method of claim 1, wherein the oil is crude oil.

18. The method claim 1, further comprising separating the oil from the dispersion.

* * * * *